(12) United States Patent
Lee et al.

(10) Patent No.: US 8,117,584 B2
(45) Date of Patent: Feb. 14, 2012

(54) METHOD OF IMPLEMENTING LOW ESL AND CONTROLLED ESR OF MULTILAYER CAPACITOR

(75) Inventors: Byoung Hwa Lee, Gyunggi-do (KR); Sung Kwon Wi, Seoul (KR); Hae Suk Chung, Seoul (KR); Dong Seok Park, Seoul (KR); Sang Soo Park, Gyunggi-do (KR); Min Cheol Park, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 665 days.

(21) Appl. No.: 12/155,805

(22) Filed: Jun. 10, 2008

(65) Prior Publication Data

US 2008/0310078 A1 Dec. 18, 2008

(30) Foreign Application Priority Data

Jun. 14, 2007 (KR) .................. 10-2007-0058596

(51) Int. Cl.
*G06F 17/50* (2006.01)
*H01G 4/30* (2006.01)
*H01G 4/055* (2006.01)
*H01G 4/288* (2006.01)

(52) U.S. Cl. ........ 716/137; 716/103; 716/105; 716/107; 716/115; 716/132; 716/138; 361/301.4; 361/303; 361/306.2; 361/306.3

(58) Field of Classification Search .................. 716/103, 716/105, 107, 115, 137, 138; 361/301.4, 361/306.2, 306.3, 306.4
See application file for complete search history.

(56) References Cited

U.S. PATENT DOCUMENTS

| | | | |
|---|---|---|---|
| 5,880,925 A | 3/1999 | DuPre et al. | |
| 6,072,687 A | 6/2000 | Naito et al. | |
| 6,370,010 B1 * | 4/2002 | Kuroda et al. | 361/306.1 |
| 6,441,459 B1 | 8/2002 | Togashi et al. | |
| 7,003,744 B2 * | 2/2006 | Weller et al. | 716/103 |
| 7,046,500 B2 * | 5/2006 | Lee et al. | 361/303 |
| 7,092,236 B2 * | 8/2006 | Lee et al. | 361/311 |
| 7,262,952 B2 * | 8/2007 | Lee et al. | 361/306.3 |
| 7,269,810 B1 * | 9/2007 | Weller et al. | 716/115 |
| 7,388,738 B1 * | 6/2008 | Togashi et al. | 361/306.3 |
| 7,433,172 B2 * | 10/2008 | Togashi | 361/306.1 |
| 7,502,213 B2 * | 3/2009 | Matsuoka et al. | 361/117 |
| 7,502,216 B2 * | 3/2009 | Lee et al. | 361/306.3 |
| 7,558,049 B1 * | 7/2009 | Togashi et al. | 361/306.3 |
| 7,595,973 B1 * | 9/2009 | Lee et al. | 361/306.3 |
| 7,599,166 B2 * | 10/2009 | Lee et al. | 361/306.3 |
| 7,630,208 B2 * | 12/2009 | Lee et al. | 361/766 |

(Continued)

FOREIGN PATENT DOCUMENTS

JP 2001-185441 A 7/2001

(Continued)

*Primary Examiner* — Helen Rossoshek
(74) *Attorney, Agent, or Firm* — McDermott Will & Emery LLP

(57) ABSTRACT

Disclosed is a method of implementing controlled equivalent series resistance (ESR) having low equivalent series inductance (ESL) of a multi-layer chip capacitor which includes a plurality of internal electrodes each having first polarity or second polarity which is opposite to the first polarity, and dielectric layers each disposed between the internal electrodes of the first polarity and the second polarity, wherein the internal electrodes having the first polarity and the internal electrodes having the second polarity are alternated at least once to form one or more blocks being stacked.

16 Claims, 59 Drawing Sheets

U.S. PATENT DOCUMENTS

| | | | |
|---|---|---|---|
| 7,675,733 B2 * | 3/2010 | Lee et al. | 361/306.3 |
| 7,974,072 B2 * | 7/2011 | Lee et al. | 361/303 |
| 2004/0150941 A1 | 8/2004 | Kuroda et al. | |
| 2009/0086406 A1 * | 4/2009 | Lee et al. | 361/306.3 |
| 2009/0139757 A1 * | 6/2009 | Lee et al. | 174/260 |
| 2009/0147440 A1 * | 6/2009 | Cygan et al. | 361/306.3 |
| 2009/0213525 A1 * | 8/2009 | Lee et al. | 361/303 |
| 2009/0244803 A1 * | 10/2009 | Lee et al. | 361/301.4 |
| 2009/0244807 A1 * | 10/2009 | Lee et al. | 361/306.2 |
| 2010/0238605 A1 * | 9/2010 | Lee et al. | 361/306.3 |

FOREIGN PATENT DOCUMENTS

| | | |
|---|---|---|
| JP | 2004-235556 A | 8/2004 |

\* cited by examiner

METHOD OF IMPLEMENTING LOW ESL AND CONTROLLED ESR OF MULTILAYER CAPACITOR

CROSS-REFERENCE TO RELATED APPLICATIONS

This application claims the priority of Korean Patent Application No. 2007-0058596 filed on Jun. 14, 2007, in the Korean Intellectual Property Office, the disclosure of which is incorporated herein by reference.

BACKGROUND OF THE INVENTION

1. Field of the Invention

The present invention relates to a method of implementing low equivalent series inductance (ESL) and controlled equivalent series resistance (ESR) of a multi-layer chip capacitor, and more particularly, to a method of implementing low ESL of a multilayer chip capacitor, which can realize low ESL of the multilayer chip capacitor as well as equivalent series resistance (ESR) controllable up to a high level.

2. Description of the Related Art

In general, a multilayer chip capacitor is used as a capacitive element in a large-scale-integration (LSI) power circuit. Particularly, the multilayer chip capacitor is being widely used as a decoupling capacitor for improving a power transfer characteristic in a power distribution network (PDN) of a microprocessor. To stabilize a power circuit, the decoupling capacitor must have low equivalent series inductance (ESL). Also, development of higher speed microprocessors increases the demands for the lower ESL. Thus, many researches have been conducted to reduce the ESL.

The decoupling capacitor is also required to have controllable equivalent series resistance (ESR) in order to implement more stable power transfer characteristic in the PDN. That is, the decoupling capacitor used in the PDN must have various ESR characteristics that PDN architects can choose from according to their needs. Using a multilayer chip capacitor having ESR lower than a desired level as the decoupling capacitor causes a high impedance peak at a parallel resonant frequency generated by the ESL of the multilayer chip capacitor and plane capacitance of a microprocessor package, and too low impedance at a series resonant frequency of the multilayer chip capacitor. Thus, the low ESR makes it difficult to build the stable PDN.

To lower the ESL, U.S. Pat. No. 5,880,925 discloses a method in which leads of a first-polarity internal electrode and a second internal electrode having opposite polarities are disposed adjacent to each other in an interdigitated arrangement. FIG. 1A is an exploded perspective view illustrating an internal electrode structure of a related art multilayer chip capacitor, and, FIG. 1B is a perspective view illustrating an exterior of a multilayer chip capacitor 10 of FIG. 1A.

Referring to FIG. 1A, internal electrodes 14 are formed on dielectric layers 11a and 11b, respectively. A capacitor body 20 is formed by alternately stacking the dielectric layers 11a and 11b. The internal electrodes 14 are classified into first internal electrodes 12 and second internal electrodes 13. One first internal electrode 12 and one second internal electrode 13 constitute one block, and such blocks are stacked on top of each other. The first internal electrode 12 and the second internal electrode 13 are connected to external electrodes 31 and 32 of FIG. 1B through leads 16 and 17, respectively. The lead 16 of the first internal electrode 12 is disposed adjacent to the lead 17 of the second internal electrode 13 in the interdigitated arrangement. Since voltages of opposite polarities are provided to the adjacent leads 16 and 17, the magnetic flux generated by the high frequency current flowing from the external electrodes 31 and 32 is cancelled between the adjacent leads 16 and 17. Thus, the ESL is lowered.

As shown in FIG. 1A, the first internal electrode 12 has four leads 16 and the second internal electrode 13 also has four leads 17. The resistance generated from the four leads 16 or 17 is connected in parallel, and thus the resistance of the entire multilayer chip capacitor 10 is significantly lowered. The insufficient ESR makes it difficult to meet target impedance and thus makes a power circuit unstable.

In order to prevent the insufficient ESR, U.S. Pat. No. 6,441,459 discloses a method of using only one lead for each internal electrode. However, the current flows in the same direction at some vertically adjacent internal electrodes. Thus, the magnetic flux cannot be cancelled between these adjacent internal electrodes, causing the ESL to increase. Moreover, only using one lead is not enough to meet various demands for ESR characteristics by PDN architects according to their needs.

The multi-terminal multilayer chip capacitor used in the PDN, particularly, for high frequency decoupling must have both very low ESL and controllable ESR up to a high level to stabilize a power circuit. A decoupling capacitor used in a computer central processing unit (CPU) which is one of representative high-speed microprocessors is sometimes required to have ESR of a few ohms ($\Omega$), but it is not easy to implement the ESR of such a high level.

SUMMARY OF THE INVENTION

An aspect of the present invention provides a method of implementing low equivalent series inductance (ESL) and controlled equivalent series resistance (ESR) of a multilayer chip capacitor, which can realize low ESL and controllable equivalent series resistance (ESR) of the multilayer chip capacitor.

According to an aspect of the present invention, there is provided a method of implementing low equivalent series inductance (ESL) and controlled equivalent series resistance (ESR) of a multi-layer chip capacitor including a plurality of internal electrodes each having first polarity or second polarity which is opposite to the first polarity, and dielectric layers each disposed between the internal electrodes of the first polarity and the second polarity, wherein the internal electrodes having the first polarity and the internal electrodes having the second polarity are alternated at least once to form one or more blocks being stacked, the method including: setting an average value of the total number of leads that are to be included in two adjacently disposed internal electrodes facing each other within the block; determining the number of leads of each of the internal electrodes within the block on the basis of the average value; and determining a lead location of each of the internal electrodes for which the number of leads has been determined, such that leads of adjacently disposed internal electrodes facing each other and respectively having the first polarity and the second polarity are disposed adjacent to one another.

For the multilayer chip capacitor including an additional block different from the block, the method may further include: setting an average value of the total number of leads of two adjacently disposed internal electrodes facing each other and having opposite polarities within the additional block; determining the number of leads of each of the internal electrodes within the additional block; and determining a lead location of each of the internal electrodes for which the number of leads has been determined, such that leads of adjacently disposed internal electrodes facing each other within the additional block are disposed adjacent to one another.

The multilayer chip capacitor may further include at least six external electrodes connected to the internal electrodes through the leads. The multilayer chip capacitor may be an eight-terminal multilayer chip capacitor comprising four external electrodes on each of two facing sides thereof.

In the multilayer chip capacitor, four successively disposed internal electrodes may form the block. In this case, the block may include three electrode patterns.

In the multilayer chip capacitor, six successively disposed internal electrodes may form the block. In this case, the block may include four or six electrode patterns.

In the multilayer chip capacitor, eight successively disposed internal electrodes may form the block. In this case, the block may include four, five, six, seven or eight electrode patterns.

In the multilayer chip capacitor, twelve successively disposed internal electrodes may form the block. The block may include seven electrode patterns.

The method may further include selecting a resistive conducting material having specific conductivity, the resistive conducting material being used for an external electrode of the multilayer chip capacitor. The resistive conducting material may be used as an inner layer of the external electrode contacting the internal electrode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1A:
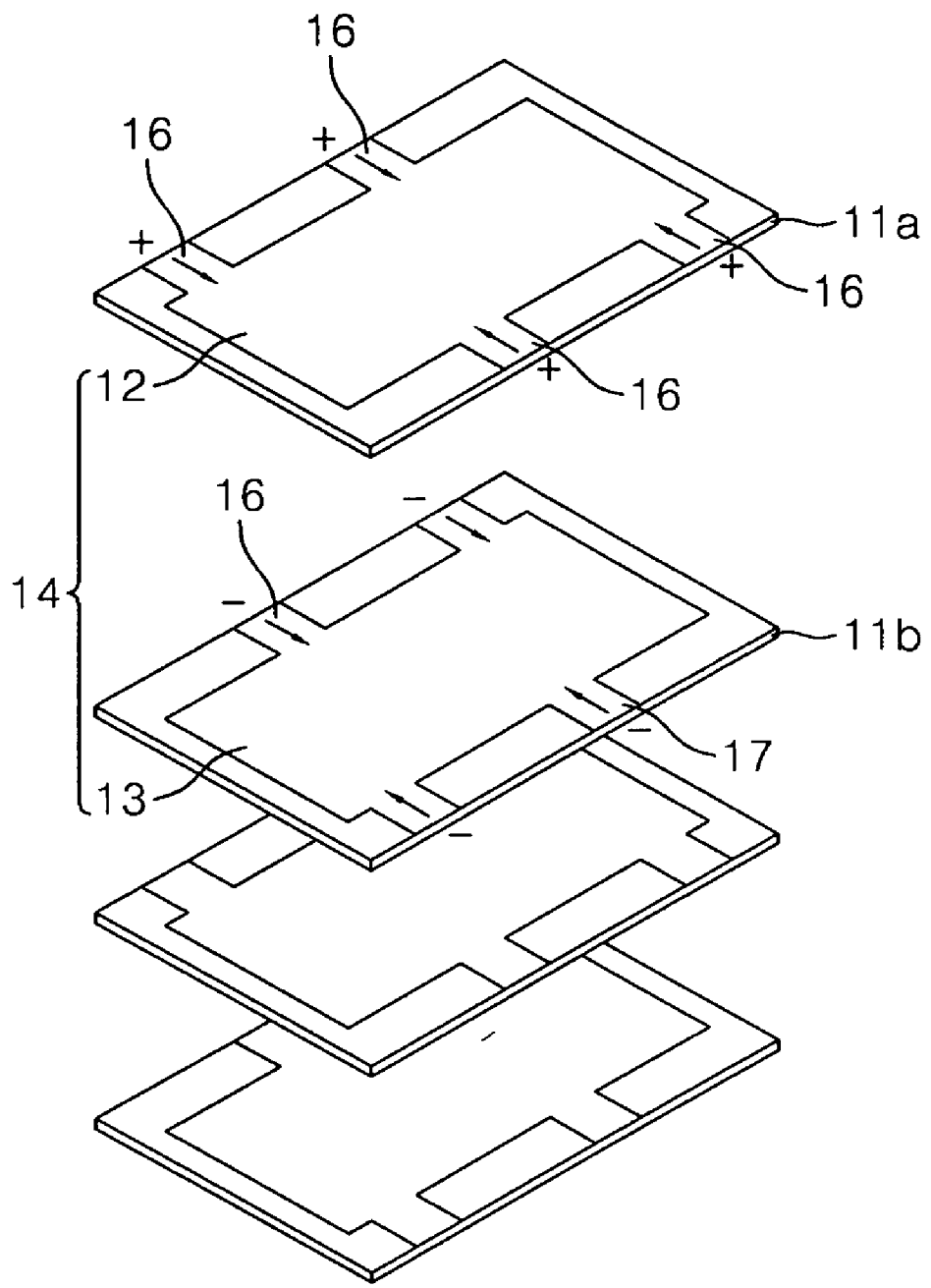
FIG. 1A is an exploded perspective view illustrating an internal electrode structure of a related art multilayer chip capacitor.
Figure 1B:
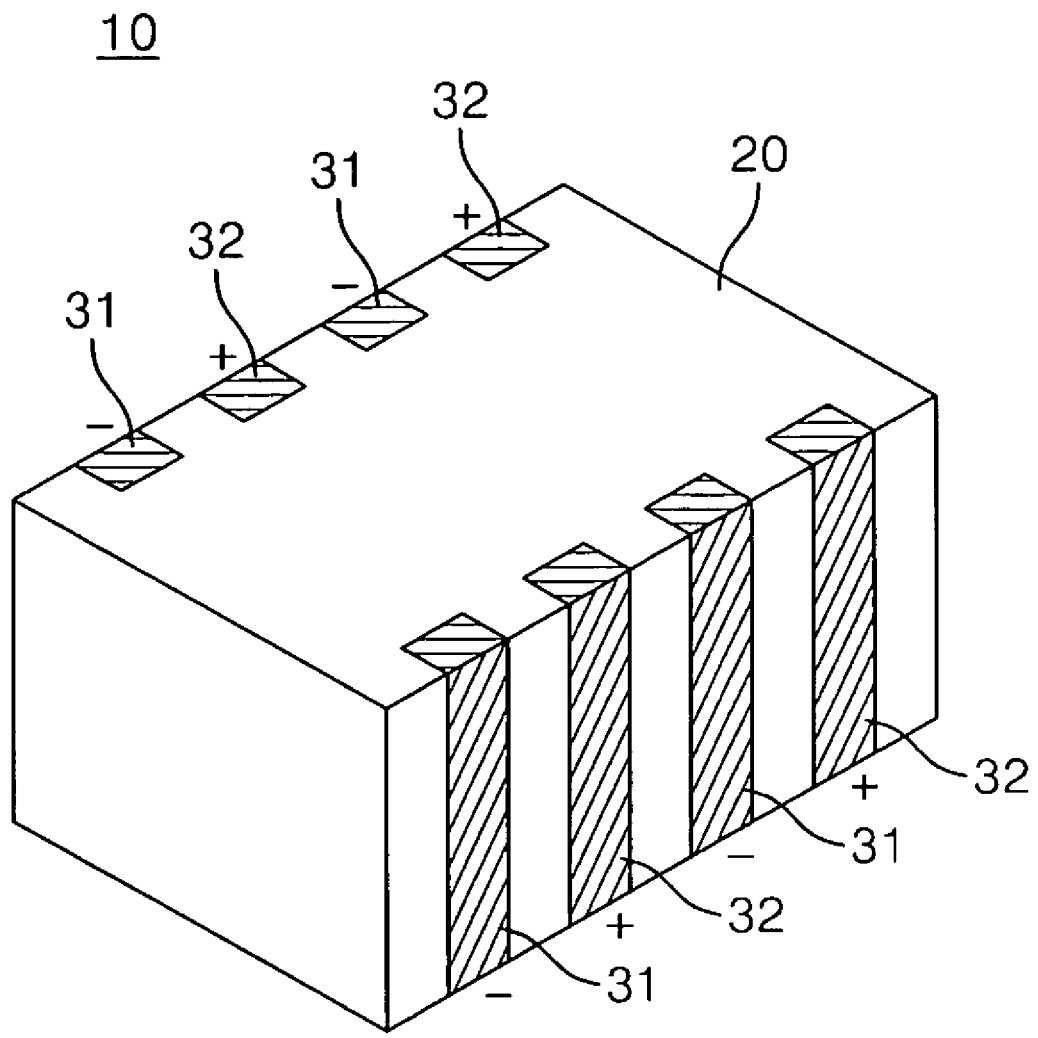
FIG. 1B is a perspective view illustrating an exterior of the multilayer chip capacitor of FIG. 1A.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. In the figures, the dimensions and shapes of layers and regions are exaggerated for clarity of illustration. Like reference numerals refer to like elements throughout.

According to an embodiment of the present invention, the number of leads of each internal electrode that greatly affects equivalent series resistance (ESR) is controlled in order to implement ESR to a desired level. Also, in order to keep equivalent series inductance (ESL) as low as possible, leads of vertically adjacent internal electrodes of opposite polarities are disposed as adjacent as possible to each other.

By controlling the number of leads and locations thereof, the ESR can be effectively and relatively precisely controlled even up to a high level, and an ESL increase which necessarily occurs due to a decrease in number of leads can be minimized.

The total number of leads of two adjacent internal electrodes may be determined variously as shown in Table 1 below, according to the number of leads of an internal electrode of a first polarity which is one of positive and negative polarities, and the number of leads of an internal electrode of a second polarity which is the other one of the positive and negative polarities.

TABLE 1

| num_leads ($E_{i1}$)\ num_leads ($E_{i2}$) | 1 | 2 | 3 | 4 |
|---|---|---|---|---|
| 1 | 2 | 3 | 4 | 5 |
| 2 | 3 | 4 | 5 | 6 |
| 3 | 4 | 5 | 6 | 7 |
| 4 | 5 | 6 | 7 | 8 |

In Table 1 above, $E_{i1}$ denotes an internal electrode having the first polarity (hereinafter, also referred to as a first-polarity internal electrode), and $E_{i2}$ denotes an internal electrode having the second polarity (hereinafter, also referred to as a second-polarity internal electrode). In Table 1 above, numbers in the first row, i.e., 1, 2, 3 and 4 each represent the number of leads of the first-polarity internal electrode, and numbers in the first column, i.e., 1, 2, 3 and 4 each represent the number of leads of the second-polarity internal electrode. The total number of leads of the two adjacent internal electrodes is determined within a range of two to eight according to a combination of the numbers of leads of the internal electrodes of the opposite polarities.

If the total number of leads of two adjacent internal electrodes is not constant within one block, an average value is taken into account. As the total number of leads of two adjacent internal electrodes increases, the ESR of the multilayer chip capacitor decreases. This is because the increase in total number of leads increases the number of resistances connected in parallel to a main electrode plate of the internal electrode, i.e., parallel resistances generated by leads.

Figure 2:
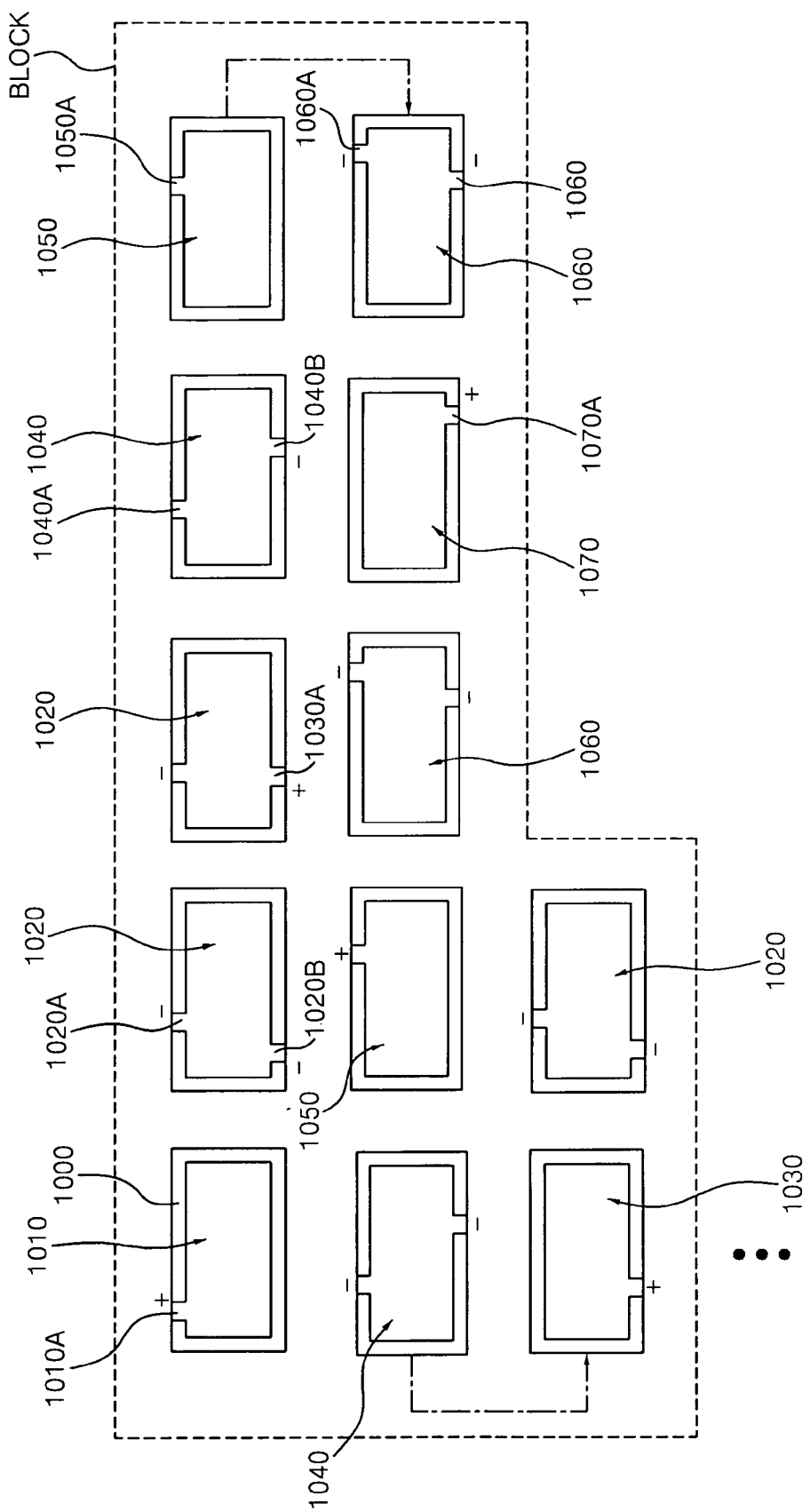
FIG. 2 illustrates an example of an internal electrode structure of a multilayer chip capacitor implemented by a method according to an embodiment of the present invention.

For example, referring to FIG. 2, every twelve internal electrodes successively disposed on top of each other may form a block, and such blocks may be stacked on top of each other within a capacitor body. As illustrated in FIG. 2, positive (+) internal electrodes 1010, 1030, 1050 and 1070 each include only one lead, i.e., leads 1010*a*, 1030*a*, 1050*a*, and 1070*a*, respectively. Negative (−) internal electrodes 1020, 1040 and 1060 each include two leads, i.e., leads 1020*a* and 1020*b*, leads 1040*a* and 1040*b*, and leads 1060*a* and 1060*b*, respectively. The total number (average) of leads of two adjacent internal electrodes is three. When the total number of leads of 'two vertically adjacent internal electrodes' is three, the ESR considerably increases as compared to the related art multilayer chip capacitor in which the total number of leads of two adjacent internal electrodes is eight (see FIG. 1A). By controlling the total number of leads of the two vertically adjacent internal electrodes, the ESR can be controlled within a wide range including a high level. In this case, the number of leads of each internal electrode may be controlled under conditions that a first-polarity internal electrode or a second-polarity internal electrode includes at least two leads, and the total number of leads of two vertically adjacent internal electrodes' may be smaller than the total number of external electrodes. By controlling the number of leads and lead location of each internal electrode under such conditions, insufficient ESR and excessive ESL can be prevented.

Also, as shown in FIG. 2, to prevent an increase in ESL and lower the ESL, leads of vertically adjacent internal electrodes having opposite polarities, e.g., leads 1010a and 1020a of the internal electrodes 1010 and 1020 are disposed as adjacent as possible to each other, thereby making a current path short. The control of the total number of leads and the lead location facilitates implementation of low ESL and controlled ESR.

A method for implementing low ESL and controlled ESR according to an embodiment of the present invention will now be described with reference to FIG. 2.

First, it is assumed that every twelve successive internal electrodes constitute one block and such blocks are stacked on top of one another in a multi-terminal capacitor. Thereafter, the total number of leads of one positive internal electrode and one negative internal electrode that are adjacently disposed to face each other is set to three, which is a factor that affects the ESR. Since the number 'three' is smaller than 'eight' of the related art multilayer chip capacitor, the ESR can be increased.

After the total number of leads is set to three, the number of leads of each internal electrode is determined to correspond with the total number "three". For example, as shown in FIG. 2, the number of leads of each of the positive internal electrodes 1010, 1030, 1050 and 1070 may be set to one, and the number of leads of each of the negative internal electrode 1020, 1040 and 1060 may be set to two.

After the number of leads of each internal electrode is set, the lead location of each internal electrode is determined according to the set number of leads such that leads of internal electrodes having opposite polarities are disposed as adjacent as possible to each other in order to suppress ESL increase. For example, the locations of the leads 1010a, 1020a, 1020b, 1030a, 1040a, 1040b, 1050a, 1060a, 1060b and 1070a may be determined as illustrated in FIG. 2. By the internal-electrode structure as illustrated in FIG. 2, the twelve internal electrodes within one block are successively disposed with total seven electrode patterns. Such a multilayer chip capacitor can achieve low ESL, and ESR that is controlled to a sufficient value.

Figure 3:
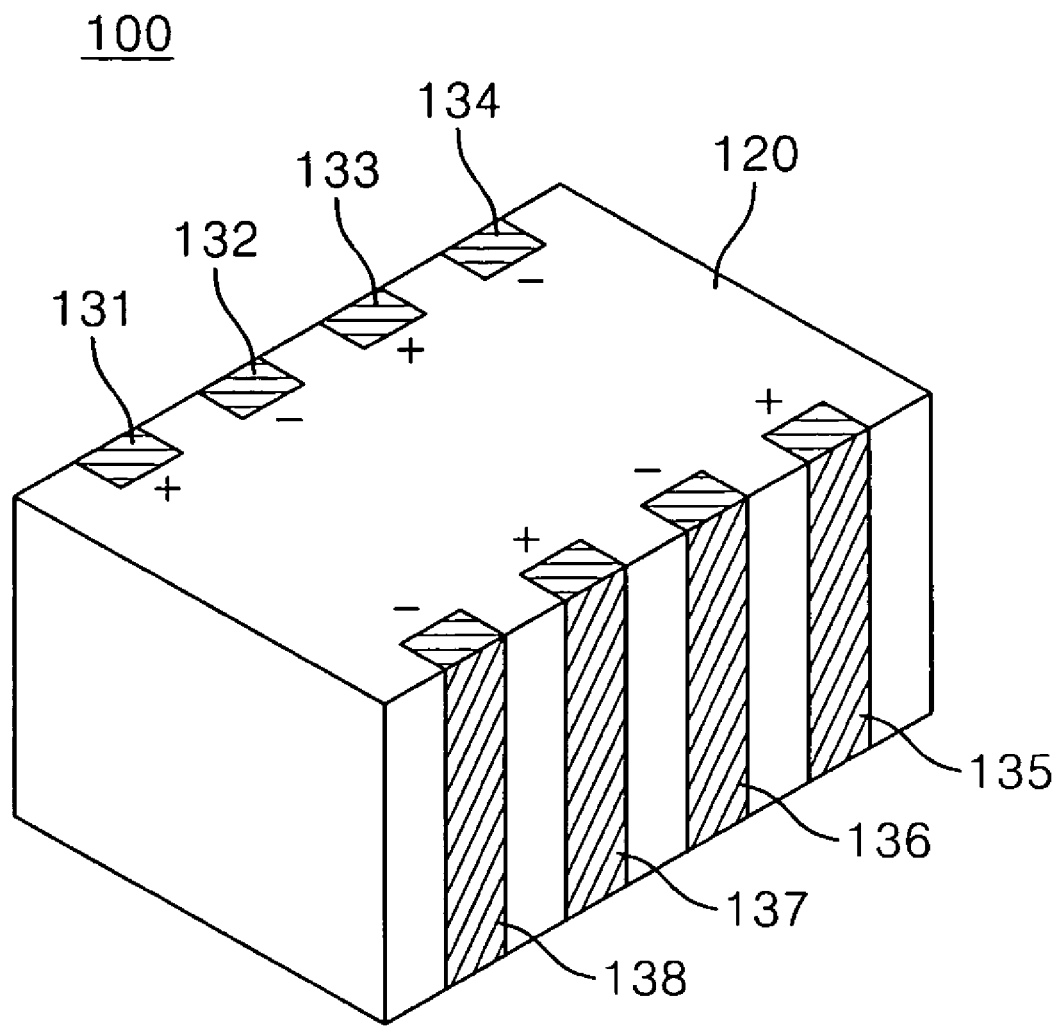
FIG. 3 is a perspective view of an exterior of the multilayer chip capacitor of FIG. 2.

FIG. 3 is a perspective view of an exterior of a multilayer chip capacitor 100 having the internal electrode structure illustrated in FIG. 2. In a capacitor body 120, the internal electrodes 1010 through 1070 are stacked on top of each other, having dielectric layers therebetween, and leads of the internal electrodes 1010 through 1070 are connected to respective corresponding external electrodes 131 through 138, thereby forming an eight-terminal multilayer chip capacitor.

Figure 4:
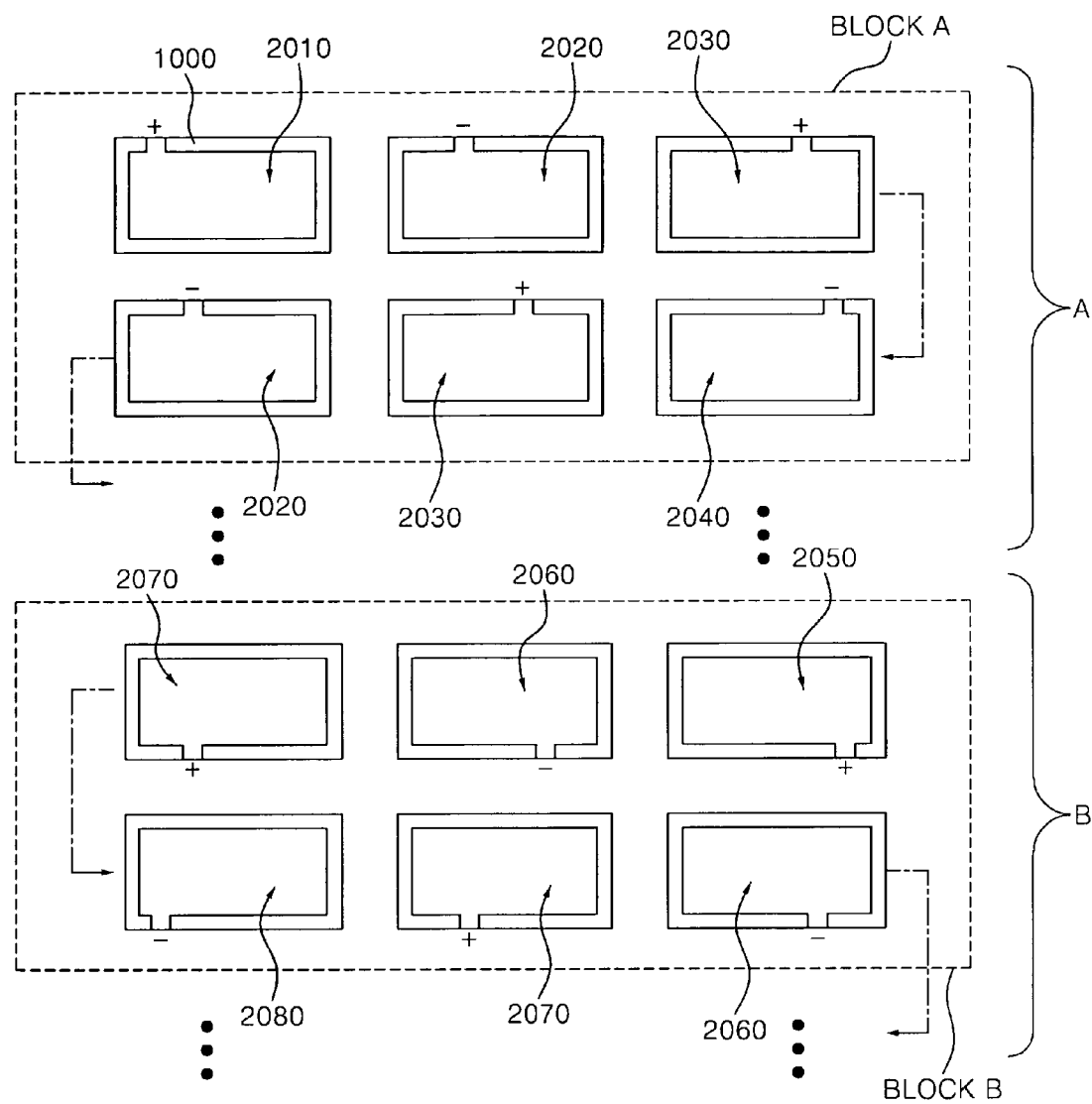
FIG. 4 illustrates another example of an internal electrode structure of a multilayer chip capacitor implemented by a method according to an embodiment of the present invention.

FIG. 4 illustrates another example of an internal electrode structure of a multilayer chip capacitor implemented by the method according to an embodiment of the present invention. In FIG. 4, two different types of blocks are present in a capacitor body. That is, in FIG. 4, besides blocks 'a', additional blocks 'b' are stacked on top of each other in the capacitor body, and a stack structure A of the blocks 'a' and a stack structure B of the blocks 'b' are also stacked.

To implement the internal electrode structure of FIG. 4, the total number of leads of two vertically adjacent internal electrodes' is set (1+1=2) for the block 'a' including six successively disposed internal electrodes 2010, 2020, 2030 and 2040 and then the number of leads of each internal electrode is determined. That is, the positive internal electrodes 2010 and 2030 each include one lead, and the negative internal electrodes 2020 and 2040 each also include one lead. Thereafter, the lead location of each internal electrode is determined such that the leads of vertically adjacent internal electrodes are disposed as adjacent as possible to each other. According to the embodiment of FIG. 4, the six internal electrodes 2010, 2020, 2030 and 2040 successively disposed in the block 'a' have four different electrode patterns, and the electrode pattern of each of the internal electrodes 2020 and 2030 is implemented twice in the block 'a'.

Likewise, for the block 'b' including six successively disposed internal electrodes 2050, 2060, 2070 and 2080, the total number of leads of 'two vertically adjacent internal electrodes' is set (1+1=2), and then the number of leads of each internal electrode is determined. The positive internal electrodes 2050 and 2070 each include one lead, and the negative internal electrodes 2060 and 2080 each include one lead. Thereafter, the lead location of each internal electrode is determined such that the leads of vertically adjacent internal electrodes are disposed as adjacent as possible to each other. According to the embodiment of FIG. 4, the six internal electrodes 2050, 2060, 2070 and 2080 of the block 'b' have four different electrode patterns, i.e., patterns of the electrodes 2050 through 2080, and the electrode pattern of each of the internal electrodes 2060 and 2070 is implemented twice in the block 'b'.

According to the embodiment of FIG. 4, since the total number of leads of two vertically adjacent internal electrodes is two, sufficiently high ESR is achieved as compared to the case where the total number of leads is eight in the related art. Furthermore, the leads of the vertically adjacent internal electrodes having opposite polarities are disposed as close as possible within each of the stack structures A and B, so that the low ESL can be also achieved. The internal electrode structure of FIG. 4 can achieve higher ESR that the internal electrode structure of FIG. 2, provided that other conditions including the capacitor size, the number of stacks, a ceramic dielectric and an electrode material are identical. This is because the total number of leads of two vertically adjacent internal electrodes is just two according to the embodiment of FIG. 4, whereas the total number of leads of two vertically adjacent electrodes is three according to the embodiment of FIG. 2 (i.e., because the ESR increases as the number of leads decreases).

According to the embodiments of FIGS. 2 and 4, the total number of leads of every two internal electrodes adjacently disposed to face each other is constant within one block. However, the present invention is not limited thereto. The total number of leads of every two vertically adjacent internal electrodes may be varied within one block. In this case, an average value of the total number of leads may be considered as a factor that affects the ESR.

As shown in Table 2 below, the average value of the total number of leads of two vertically adjacent internal electrodes according to the number of leads of a first-polarity internal electrode and the number of leads of a second-polarity internal electrode may be determined variously for various cases including the case where the total number of leads of every two vertically adjacent internal electrodes is not constant within one block. As is seen from Tables 1 and 2, examples of average values of the total number of leads shown in Table 1 include examples shown in Table 1 above. Accordingly, Table 2 is more comprehensive than Table 1.

TABLE 2

| Num_leads $(E_{i1})$\ Num_leads $(E_{i2})$ | | 1 1 | 1 2 | 1 3 | 1 4 | 2 1 | 2 2 | 2 3 | 2 4 | 3 1 | 3 2 | 3 3 | 3 4 | 4 1 | 4 2 | 4 3 | 4 4 |
|---|---|---|---|---|---|---|---|---|---|---|---|---|---|---|---|---|---|
| 1 | 1 | 2   | 2.5 | 3   | 3.5 | 2.5 | 3   | 3.5 | 4   | 3   | 3.5 | 4   | 4.5 | 3.5 | 4   | 4.5 | 5   |
| 1 | 2 | 2.5 | 3   | 3.5 | 4   | 3   | 3.5 | 4   | 4.5 | 3.5 | 4   | 4.5 | 5   | 4   | 4.5 | 5   | 5.5 |
| 1 | 3 | 3   | 3.5 | 4   | 4.5 | 3.5 | 4   | 4.5 | 5   | 4   | 4.5 | 5   | 5.5 | 4.5 | 5   | 5.5 | 6   |
| 1 | 4 | 3.5 | 4   | 4.5 | 5   | 4   | 4.5 | 5   | 5.5 | 4.5 | 5   | 5.5 | 6   | 5   | 5.5 | 6   | 6.5 |
| 2 | 1 | 2.5 | 3   | 3.5 | 4   | 3   | 3.5 | 4   | 4.5 | 3.5 | 4   | 4.5 | 5   | 4   | 4.5 | 5   | 5.5 |
| 2 | 2 | 3   | 3.5 | 4   | 4.5 | 3.5 | 4   | 4.5 | 5   | 4   | 4.5 | 5   | 5.5 | 4.5 | 5   | 5.5 | 6   |
| 2 | 3 | 3.5 | 4   | 4.5 | 5   | 4   | 4.5 | 5   | 5.5 | 4.5 | 5   | 5.5 | 6   | 5   | 5.5 | 6   | 6.5 |
| 2 | 4 | 4   | 4.5 | 5   | 5.5 | 4.5 | 5   | 5.5 | 6   | 5   | 5.5 | 6   | 6.5 | 5.5 | 6   | 6.5 | 7   |
| 3 | 1 | 3   | 3.5 | 4   | 4.5 | 3.5 | 4   | 4.5 | 5   | 4   | 4.5 | 5   | 5.5 | 4.5 | 5   | 5.5 | 6   |
| 3 | 2 | 3.5 | 4   | 4.5 | 5   | 4   | 4.5 | 5   | 5.5 | 4.5 | 5   | 5.5 | 6   | 5   | 5.5 | 6   | 6.5 |
| 3 | 3 | 4   | 4.5 | 5   | 5.5 | 4.5 | 5   | 5.5 | 6   | 5   | 5.5 | 6   | 6.5 | 5.5 | 6   | 6.5 | 7   |
| 3 | 4 | 4.5 | 5   | 5.5 | 6   | 5   | 5.5 | 4.5 | 6.5 | 5.5 | 6   | 6.5 | 7   | 6   | 6.5 | 7   | 7.5 |
| 4 | 1 | 3.5 | 4   | 4.5 | 5   | 4   | 4.5 | 5   | 5.5 | 4.5 | 5   | 5.5 | 6   | 5   | 5.5 | 6   | 6.5 |
| 4 | 2 | 4   | 4.5 | 5   | 5.5 | 4.5 | 5   | 5.5 | 6   | 5   | 5.5 | 6   | 6.5 | 5.5 | 6   | 6.5 | 7   |
| 4 | 3 | 4.5 | 5   | 5.5 | 6   | 5   | 5.5 | 6   | 6.5 | 5.5 | 6   | 6.5 | 7   | 6   | 6.5 | 7   | 7.5 |
| 4 | 4 | 5   | 5.5 | 6   | 6.5 | 5.5 | 6   | 6.5 | 7   | 6   | 6.5 | 7   | 7.5 | 6.5 | 7   | 7.5 | 8   |

In Table 2 above, $E_{i1}$ denotes a first-polarity internal electrode, and $E_{i2}$ denotes a second-polarity internal electrode. In Table 2 above, numbers of the first row and the second row each denote the number of leads of a first-polarity internal electrode. For example, (1, 1) corresponding to the very left column in the first and second rows represents the case where every first-polarity internal electrode in one block has one lead. Also, (1, 2) corresponding to the second left column in the first and second rows represents the case where a first-polarity internal electrode having one lead and a first-polarity internal electrode having two leads are present in one block at a ratio of 1:1. Likewise, numbers in the first and second columns each denote the number of leads of a second-polarity internal electrode.

For example, in an internal electrode structure corresponding to (1, 2) of the second highest row in the first and second columns and to (1, 2) of the second left column in the first and second rows, a first-polarity internal electrode with one lead, a first-polarity internal electrode with two leads, a second-polarity internal electrode with one lead and a second-polarity internal electrode with two leads are disposed at the ratio of 1:1:1:1. The average value of the total number of leads of two vertically adjacent internal electrodes in the case corresponding to (1, 2) of the second row of the first and second columns and to (1, 2) of the second column of the first and second rows of Table 2 is (1+2)/2+(1+2)/2=3. That is, in this case, the average value of the total number of leads of two vertically adjacent internal electrodes is three. The average value of the total number of leads of two vertically adjacent internal electrodes is set according to a combination of the numbers of leads of adjacent internal electrodes of opposite polarities.

The present invention is not limited to Tables 1 and 2 above, and the average value of the total number of leads of two adjacent internal electrodes may be determined variously. For example, first or second-polarity internal electrodes within one block may have three different numbers of leads or more.

Figure 5:
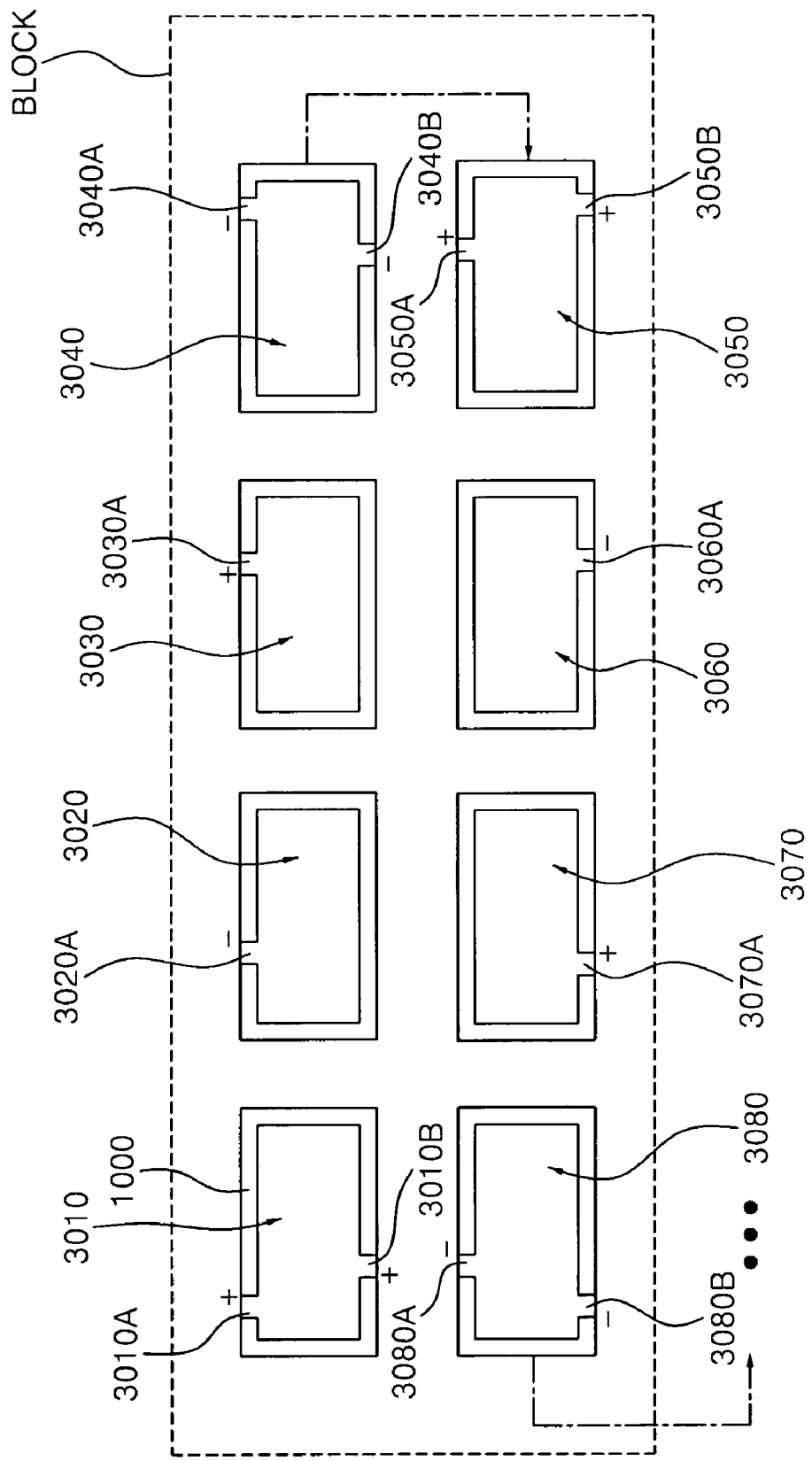
FIGS. 5 through 10 illustrate various examples of an internal electrode structure of a multilayer chip capacitor implemented by a method according to an embodiment of the present invention.

FIG. 5 illustrates another example of an internal electrode structure of a multilayer chip capacitor implemented by the method according to an embodiment of the present invention. In the internal electrode structure of FIG. 5, the number of leads of each polarity internal electrodes is not constant within one block, but alternates between 1 and 2 along a stack direction. For example, positive internal electrodes 3010 and 3050 each having two leads and positive internal electrodes 3030 and 3060 each having one lead may be alternately disposed in the stack direction. In this case, the average number of leads of the positive internal electrode is (1+2)/2=1.5. Likewise, the numbers of leads of negative internal electrodes 3020, 3040, 3060 and 3080 alternate between 1 and 2, and the average number of leads of the negative internal electrode is (1+2)/2=1.5. Accordingly, the average value of the total number of leads of two adjacent internal electrodes of opposite polarities is 1.5+1.5=3.

To implement the internal electrode structure of FIG. 5, it is assumed that every eight successive internal electrodes constitute one block, and such blocks are stacked on top of each other in a multi-terminal capacitor. Thereafter, the average value of the total number of leads of two vertically adjacent internal electrodes is set to three. Thereafter, the number of each internal electrode is determined to correspond with the average value 'three'. Various methods may be used to determine the number of leads of each internal electrode, corresponding with the average value of the total number of leads. Among these various methods, as shown in FIG. 5, the number of leads of each of positive internal electrodes 3010 and 3050 may be set to two, and the number of leads of each of positive internal electrodes 3030 and 3070 may be set to one. Also, the number of leads of each of negative internal electrodes 3020 and 3060 may be set to one, and the number of leads of each of negative internal electrodes 3040 and 3080 may be set to two.

After the number of leads of each internal electrode is set, a lead location of each internal electrode is determined. To suppress ESL increase, the lead location is determined such that leads of internal electrodes of opposite polarities are disposed as adjacent as possible to each other. For example, the respective locations of the leads 3010a, 3010b, 3020a, 3030a, 3040a, 3040b, 3050a, 3050b, 3060a, 3070a, 3080a and 3080b may be determined as illustrated in FIG. 5. By the internal electrode structure shown in FIG. 5, the total eight internal electrodes are disposed in one block with total eight electrode patterns. The multilayer chip capacitor implemented in such a manner can achieve low ESL and controlled ESR.

Figure 6:
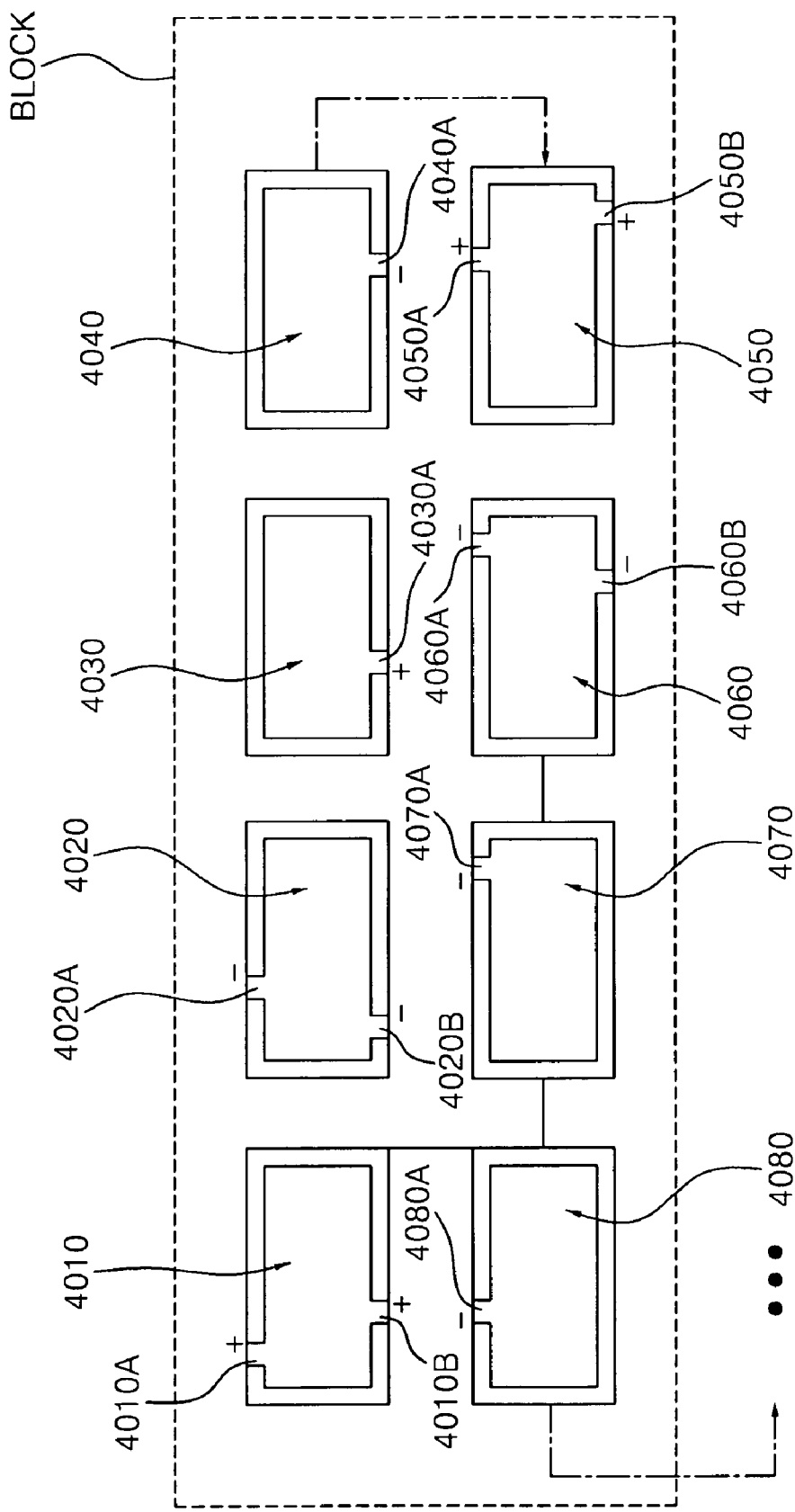

FIG. 6 illustrates another example of an internal electrode structure of a multilayer chip capacitor implemented by the method according to an embodiment of the present invention. In the internal electrode structure of FIG. 6, the number of leads of each polarity internal electrode is not constant within one block, and alternate between 1 and 2 in a stack direction.

To implement the internal electrode structure of FIG. 6, it is assumed that eight successive internal electrodes constitute one block, and such blocks are stacked on top of each other in a multi-terminal capacitor. Thereafter, an average value of the total number of leads of two vertically adjacent internal electrodes is set to three. Thereafter, the number of leads of each internal electrode is set to correspond with the average value 'three'. For example, the numbers of leads of the eight internal electrodes may be determined to be 2, 2, 1, 1, 2, 2, 1 and 1, respectively. That is, as illustrated in FIG. 6, it is determined that a positive internal electrode 4010 has two leads, a negative internal electrode 4020 has two leads, a positive internal electrode 4030 has one lead, a negative internal electrode 4040 has one lead, a positive internal electrode 4050 has two leads, a negative internal electrode 4060 has two leads, a positive internal electrode 4070 has one lead, and a negative internal electrode 4080 has one lead.

After the number of leads of each internal electrode is set, i.e., after a permutation (i.e., 2, 2, 1, 1, 2, 2, 1, 1 in the current embodiment) of the numbers of leads of the respective internal electrodes arranged in a stack order is determined, a lead location of each internal electrode is determined. The locations of leads 4010a, 4010b, 4020a, 4020b, 4030a, 4040a, 4050a, 4050b, 4060a, 4060b, 4070a and 4080a are determined such that the leads of internal electrodes of opposite polarities are disposed as adjacent as possible to each other. One example of the determination of the lead locations is illustrated in FIG. 6.

Figure 7:
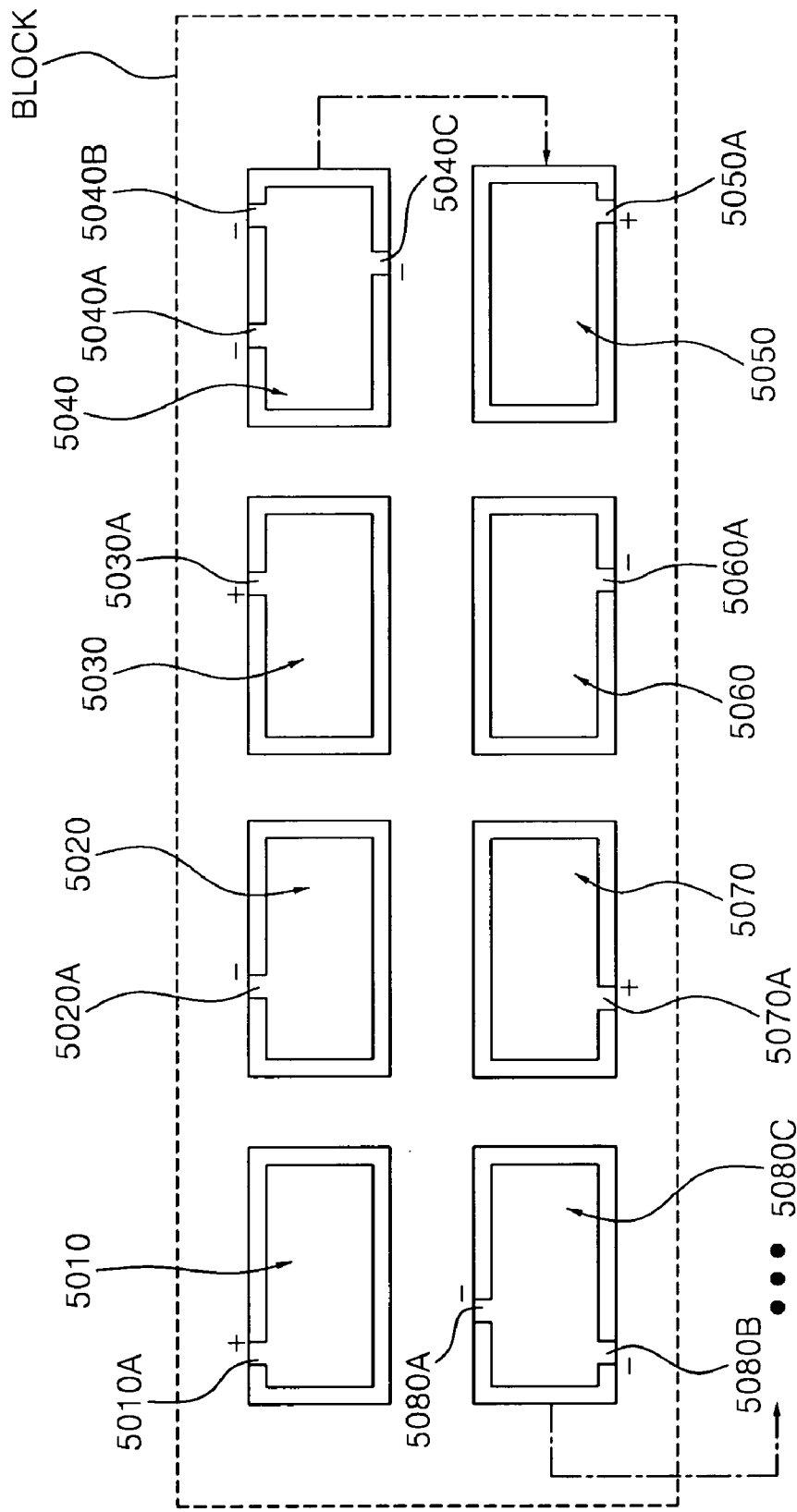

FIG. 7 illustrates another example of an internal electrode structure of a multilayer chip capacitor implemented by the method according to an embodiment of the present invention. To implement the internal electrode structure of FIG. 7, it is assumed that every eight successive internal electrodes constitute one block, and such blocks are stacked on top of each other in a multi-terminal capacitor. Thereafter, an average value of the total number of leads of two vertically adjacent internal electrodes is set to three. Thereafter, the number of leads of each internal electrode is set to correspond with the average value 'three'. For example, the numbers of leads of the internal electrodes are set to be 1, 1, 1, 3, 1, 1, 1 and 3 in a stack direction, respectively. That is, as shown in FIG. 7, it is determined that a positive internal electrode 5010 has one lead, a negative internal electrode 5020 has one lead, a positive internal electrode 5030 has one lead, a negative internal electrode 5040 has three leads, a positive internal electrode 5050 has one lead, a negative internal electrode 5060 has one lead, a positive internal electrode 5070 has one lead a, and a negative internal electrode 5080 has three leads. By setting the number of leads of each internal electrode in the above manner, the average value of the total number of leads of two vertically adjacent internal electrodes is (1+1+1+3+1+1+1+3)/4=3.

After the number of leads of each internal electrode is set, a lead location of each internal electrode is determined. Locations of the leads 5010a, 5020a, 5030a, 5040a, 5040b, 5040c, 5050a, 5060a, 5070a, 5080a, 5080b and 5080c are determined such that the leads of vertically adjacent internal electrodes having opposite polarities are disposed as adjacent as possible to each other. An example of such lead locations is illustrated in FIG. 7.

Figure 8:
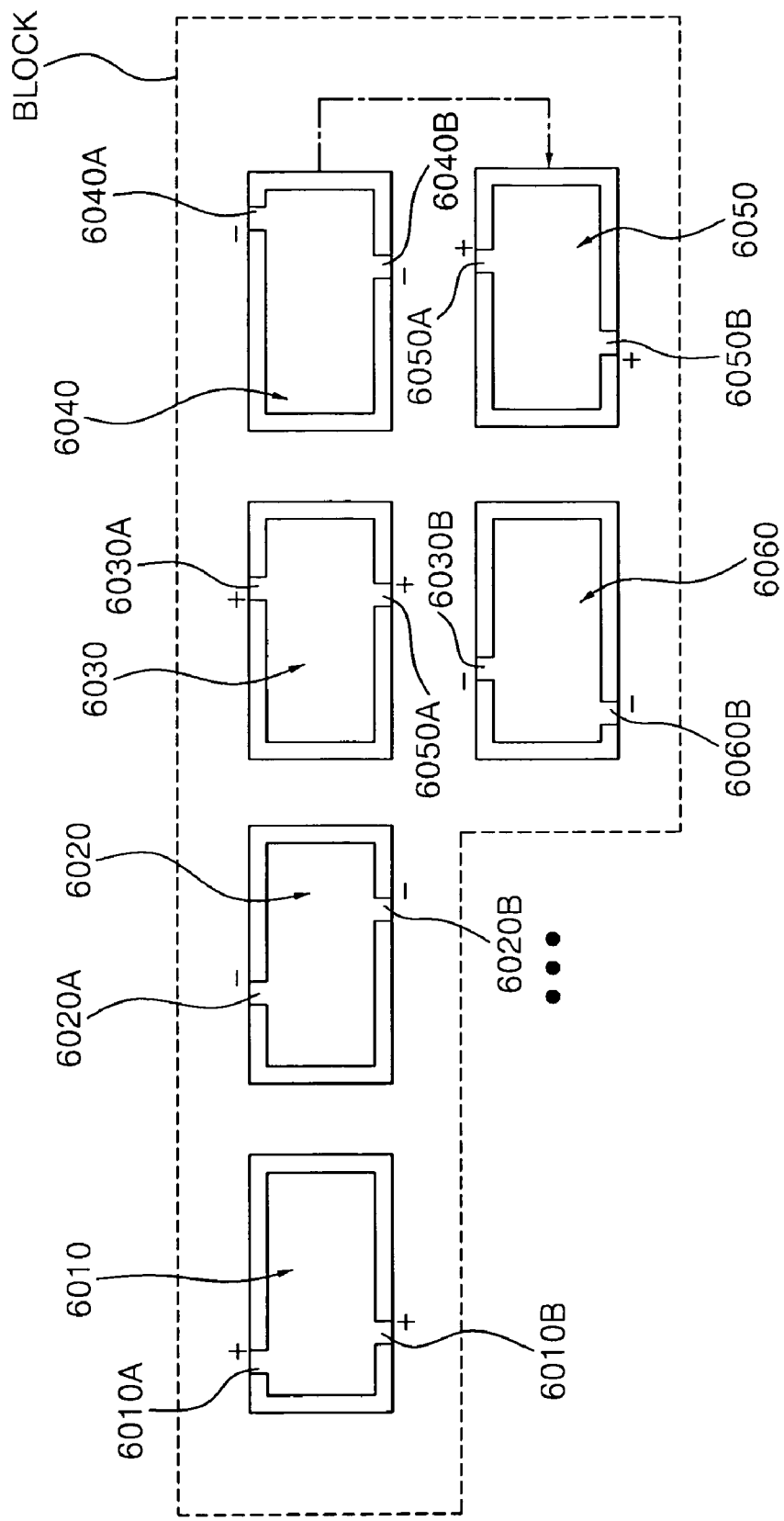

FIG. 8 illustrates another example of an internal electrode structure of a multilayer chip capacitor implemented by the method according to an embodiment of the present invention. To implement the internal electrode structure of FIG. 8, it is assumed that every six successive internal electrodes constitute one block, and such blocks are stacked on top of each other in a multi-terminal capacitor. Thereafter, an average value of the total number of leads of two vertically adjacent internal electrodes is set to four. Thereafter, the number of leads of each internal electrode is set to correspond with the average value 'four'. As one example, the numbers of the leads of the internal electrodes are respectively set to 2, 2, 2, 2, 2, and 2 in a stack direction. That is, as illustrated in FIG. 8, it may be determined that the internal electrodes 6010 through 6060 each have two leads.

After the number of leads of each internal electrode is set, a lead location of each internal electrode is determined. Locations of leads 6010a, 6010b, 6020a, 6020b, 6030a, 6030b, 6040a, 6040b, 6050a, 6050b, 6060a and 6060b are determined such that the leads of vertically adjacent internal electrodes of opposite polarities are disposed as adjacent as possible to each other. An example of this lead-location determination is illustrated in FIG. 8. By the internal electrode structure of FIG. 8, total six internal electrodes are successively disposed with total six electrode patterns.

Figure 9:
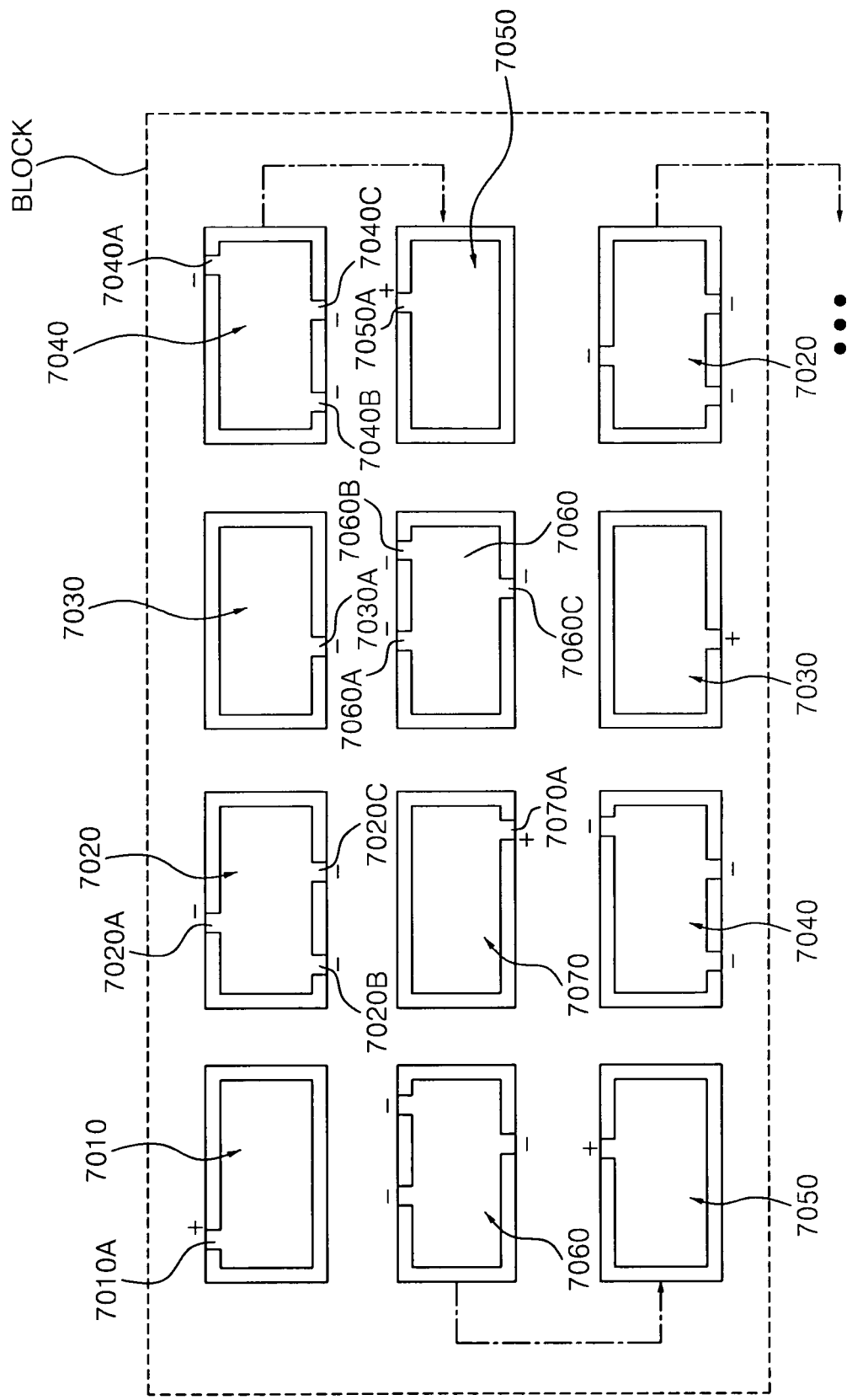

FIG. 9 illustrates another example of an internal electrode structure of a multilayer chip capacitor implemented by the method according to an embodiment of the present invention. To implement the internal electrode structure of FIG. 9, it is assumed that every twelve successive internal electrodes constitute one block, and such blocks are stacked on top of each other in a multi-terminal capacitor. Thereafter, an average value of the total number of leads of two vertically adjacent internal electrodes is set to four. Thereafter, the number of leads of each internal electrode is set to correspond with the average value 'four'. For example, it may be determined that the numbers of leads of the internal electrodes are 1, 3, 1, 3, 1, 3, 1, 3, 1, 3, 1 and 3 in a stack direction, respectively. That is, as illustrated in FIG. 9, the number of leads of each internal electrode is determined such that positive internal electrodes 7010, 7030, 7050 and 7070 each have one lead and negative internal electrodes 7020, 7040 and 7060 each have three leads.

After the number of leads of each internal electrode is set, a lead location of each internal electrode is determined. Locations of leads 7010a, 7020a, 7020b, 7020c, 7030a, 7040a, 7040b, 7040c, 7050a, 7060a, 7060b, 7060c and 7070a are determined such that the leads of vertically adjacent internal electrodes of opposite polarities are disposed as adjacent as possible to each other. An example of this lead-location determination is illustrated in FIG. 9. By the internal electrode structure of FIG. 9, the twelve internal electrodes within one block are successively disposed with total seven electrode patterns.

Figure 10:
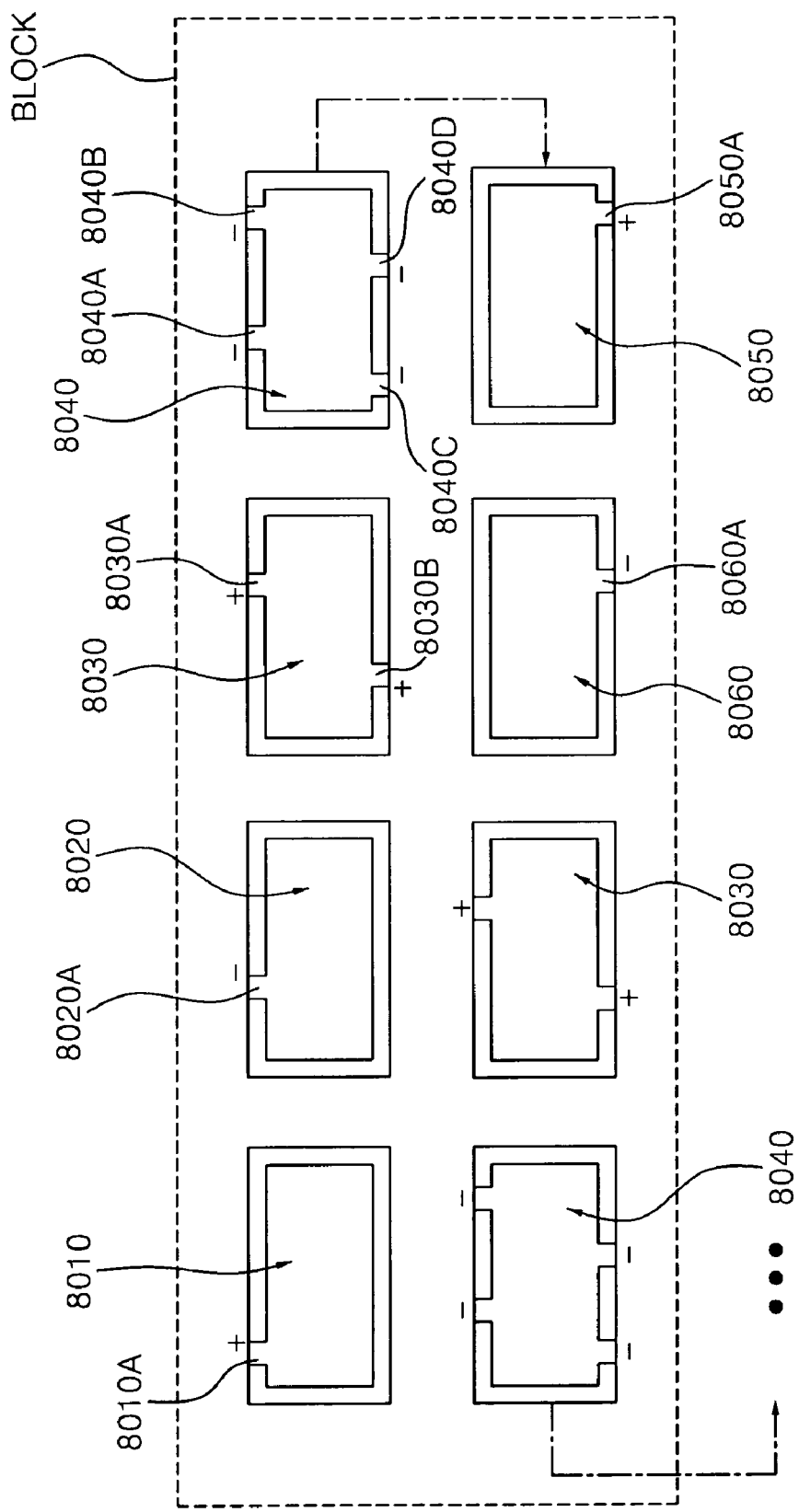

FIG. 10 illustrates another example of an internal electrode structure of a multilayer chip capacitor implemented by the method according to an embodiment of the present invention. To implement the internal electrode structure of FIG. 10, it is assumed that every eight successive internal electrodes constitute one block, and such blocks are stacked on top of each other in a multi-terminal capacitor. Thereafter, an average value of the total number of leads to vertically adjacent internal electrodes is set to four. Thereafter, the number of leads of each internal electrode is set to correspond with the average value 'four'. For example, it may be determined that the numbers of leads of the internal electrodes are 1, 1, 2, 4, 1, 1, 2 and 4 in a stack direction, respectively. That is, as illustrated in FIG. 10, positive internal electrodes 8010 and 8050 each have one lead, a positive internal electrode 8030 has two leads, negative internal electrodes 8020a and 8060a each have one lead, and a negative internal electrode 8040 has four leads. By setting the number of leads of each internal electrode in the above manner, the average value of the total number of leads of the two vertically adjacent internal electrodes is (1+1+2+4+1+1+2+4)/4=4.

After the number of leads of each internal electrode is set, a lead location of each internal electrode is determined. That is, locations of leads 8010a, 8020a, 8030a, 8030b, 8040a, 8040b, 8040c, 8040d, 8050a and 8060a are determined such that the leads of vertically adjacent internal electrodes of opposite polarities are disposed as adjacent as possible to each other. One example of such determination of the lead location is illustrated in FIG. 10. By the internal electrode structure of FIG. 10, the eight internal electrodes are successively disposed in one block with total six electrode patterns. The embodiments of FIGS. 4 through 10 may have an exterior of an eight-terminal capacitor illustrated in FIG. 3.

According to the embodiments of FIGS. 6 through 10, the ESR can be easily controlled to a sufficiently high level by controlling the average value of the total number of leads of two adjacent internal electrodes facing each other. Also, since the leads of the adjacent internal electrodes facing each other are disposed as adjacent as possible, a current path between the leads can be shortened. Thus, an effect of decreasing the ESL can be achieved.

Figure 11A:
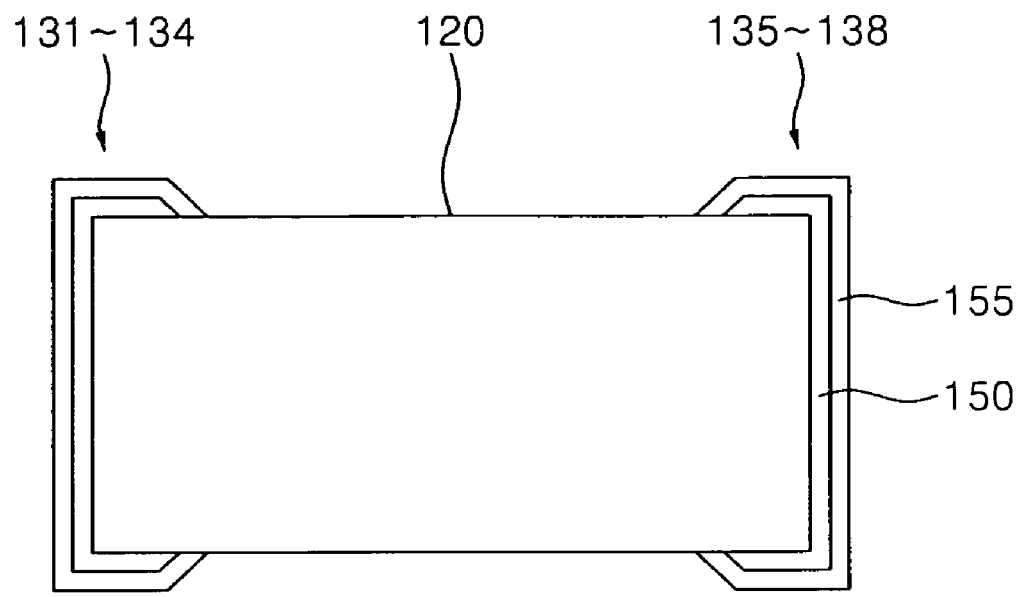
FIGS. 11A and 11B illustrate sectional structures of external electrodes applicable to the present invention, respectively.
Figure 11B:
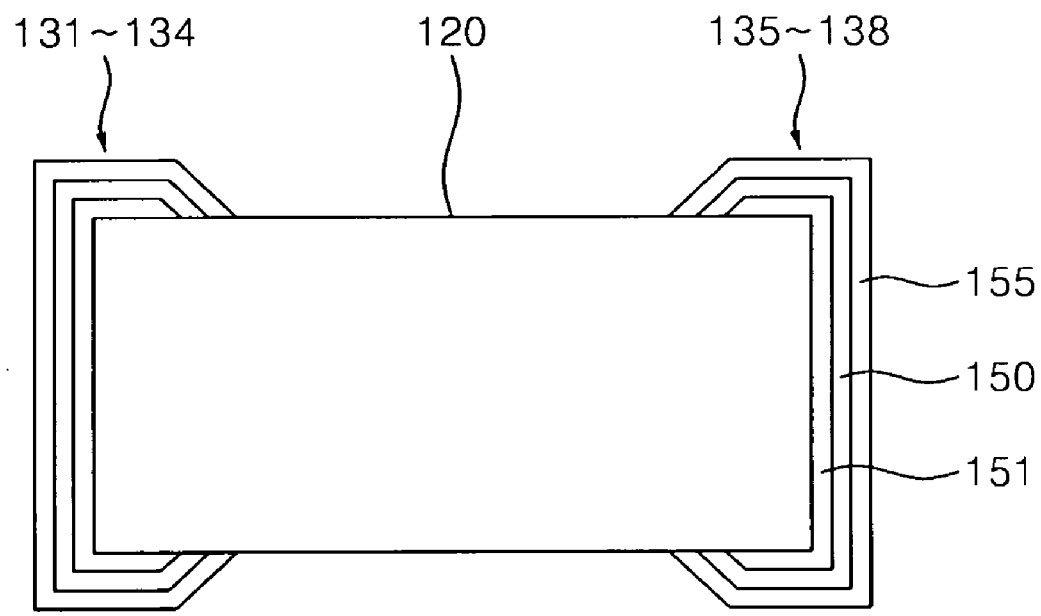

The ESR can be controlled within an even wider range by using a resistance layer or a resistive conducting layer formed at an external electrode, together with 'the average value of the total number of leads of two adjacently facing internal electrodes. That is, in addition to the method for implementing low ESL and controlled ESR according to the embodiments described above, a resistive conducting material of specific conductivity for an external electrode may be selected, and the selected resistive conducting material is used as a material of the external electrode or one layer of the external electrode. The resistive conducting material has conductivity lower than that of the conventional Cu or Ag of the external electrode. Examples of an external electrode structure using a resistive conducting material for the ESR control are illustrated in FIGS. 11A and 11B. For the convenience in description, an internal structure of a capacitor body 120 is omitted in the drawing.

Referring to FIGS. 3 and 11A, external electrodes 131 through 138 are formed on two facing sides of the capacitor body 120. The external electrodes 131 through 138 each include an inner layer 150 (hereinafter, also referred to as a resistive conducting layer) formed of a resistive conductor having relatively high resistivity, i.e., low conductivity, and a plating layer 155 formed on the resistive conducting layer 150. The ESR of the capacitor can be controlled within a wider range by selecting a resistive conducting material of appropriate conductivity and using it for the resistive conducting layer 150 of each external electrode. Particularly, the ESR can be effectively controlled when the resistive conducting layer 150 is used as an inner layer of the external electrode directly contacting an internal electrode. This is because current must pass through the inner layer contacting the internal electrode when flowing from the external electrode to the internal electrode. As the rate of current passing through the resistor of the inner layer is higher, the effect of increasing the ESR by the resistive conducting layer is improved. According to another example, the resistive conducting layer 150, as illustrated in FIG. 11B, may be interposed between an inner layer 151 formed of Cu or the like and an outermost plating layer 155.

For example, the ESR of the capacitor may be made to be 30 mΩ, 100 mΩ, 500 mΩ or 1Ω according to selection of a resistive conducting material for the external electrode. To more precisely control the ESR, e.g., to control the ESR to be lower than 20 mΩ, 'an average value of the total number of leads of two adjacent internal electrodes' may be controlled as mentioned in the above embodiments.

As the controlled ESR is lined up within a wide range, a capacitor user, particularly, a power distribution network (PDN) architect can easily select a capacitor with a desired ESR characteristic. One of advantages of the present invention is that user-selectable ESR can be effectively provided to the PDN architect.

The internal electrode structure that can be implemented according to the present invention is not limited to the above embodiments, and may be provided in various forms according to 'an average value of the total number of leads of two internal electrodes adjacently facing each other', the number of leads of each internal electrode, and the lead locations. The internal electrode structure implemented according to embodiments of the present invention has a lead disposition (electrode pattern shape) that achieves the lowest possible ESL with the fixed number of leads of each internal electrode.

FIGS. 12 through 58 illustrate various internal electrode structures of a capacitor implemented by the method of implementing low ESL of a multilayer chip capacitor according to an embodiment of the present invention. In FIGS. 12 through 58, only numbers are marked in respective internal electrodes in order to distinguish electrode patterns of internal electrodes for convenience in description, and each drawing illustrate only one block.

Figure 12:
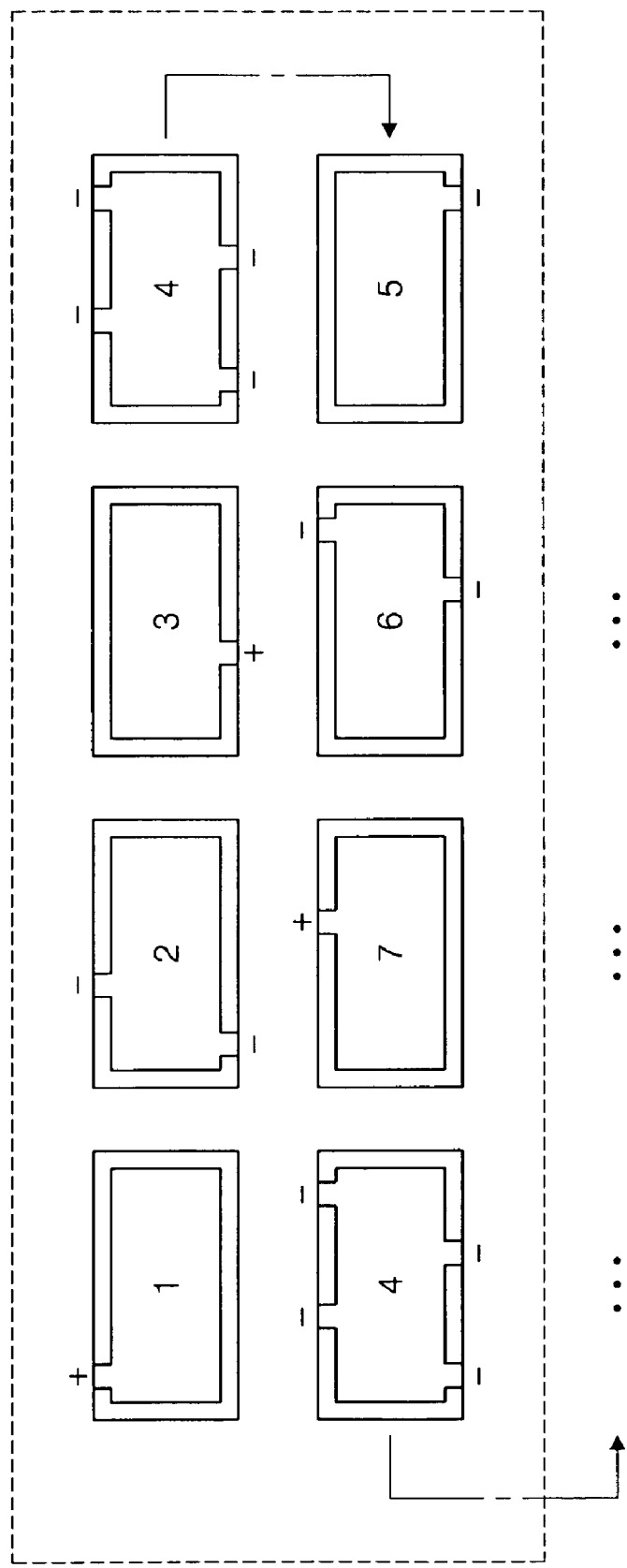
FIGS. 12 through 58 illustrate examples of an internal electrode structure of a multilayer chip capacitors implemented by a method according to an embodiment of the present invention.
Figure 13:
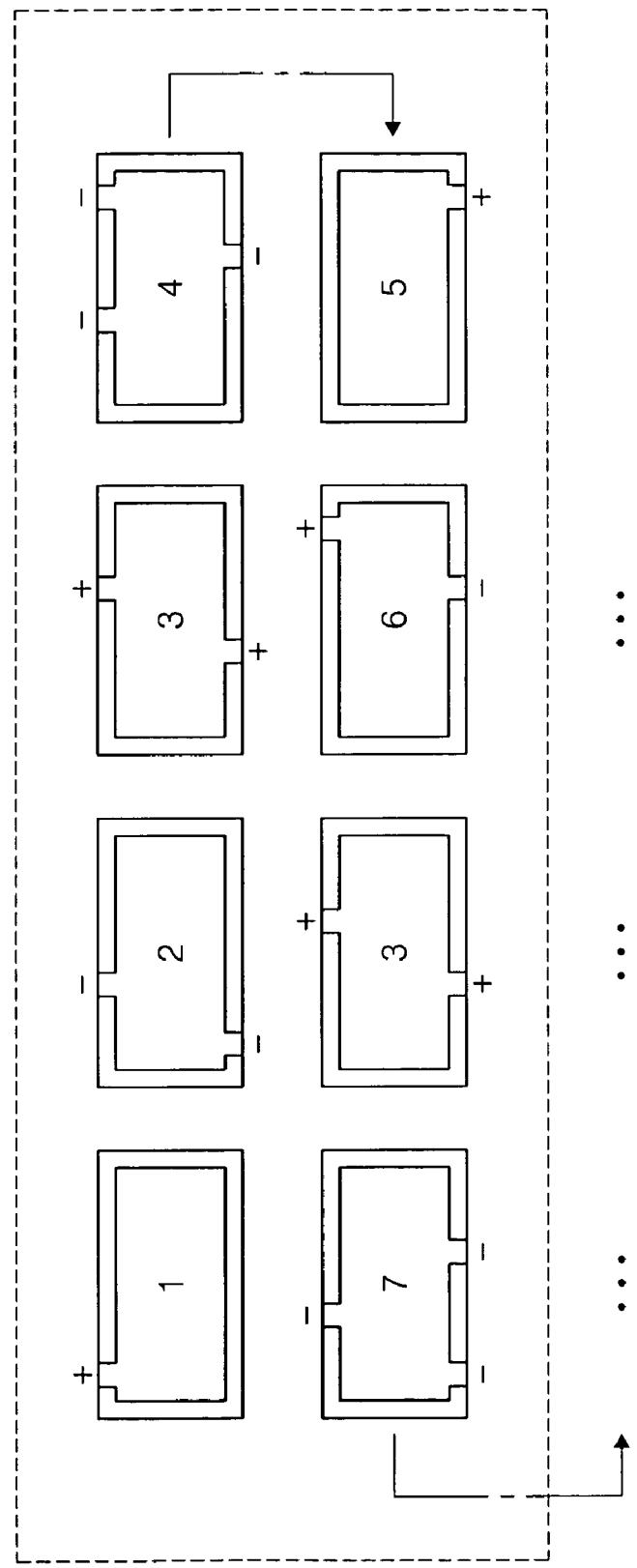
Figure 14:
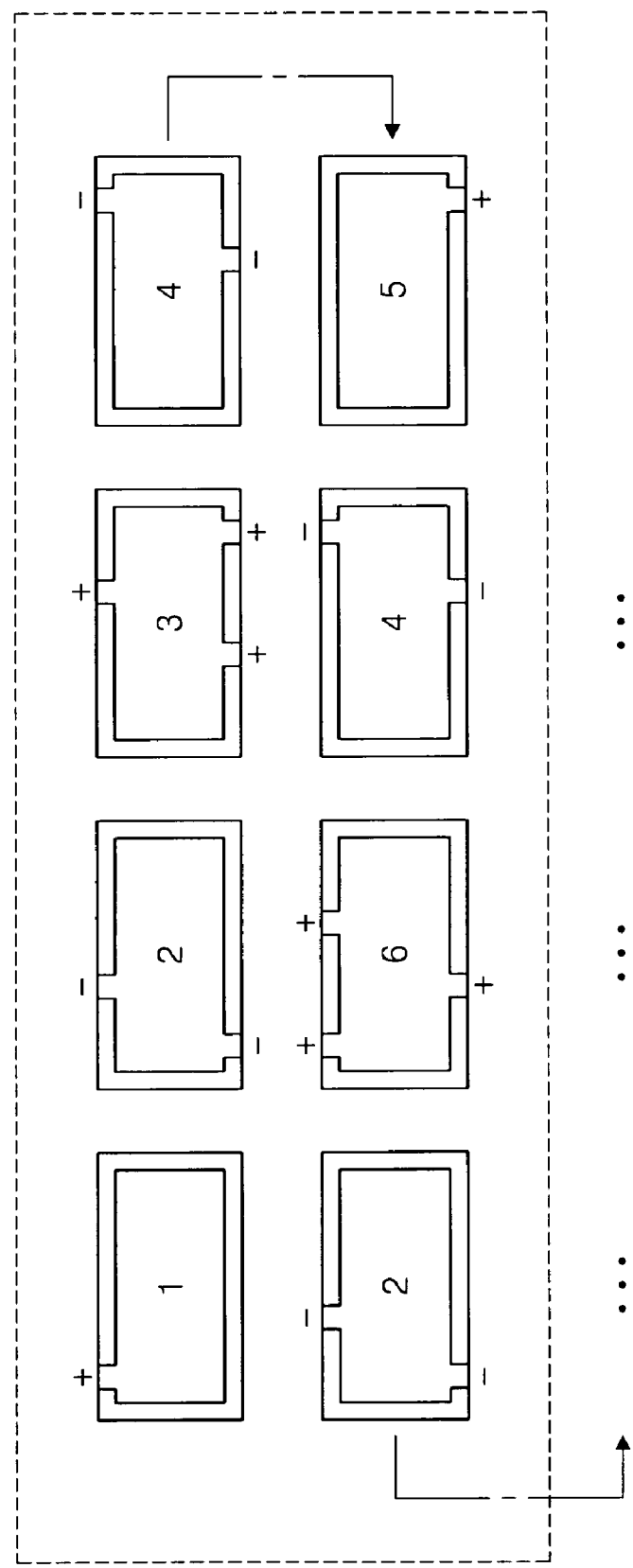
Figure 15:
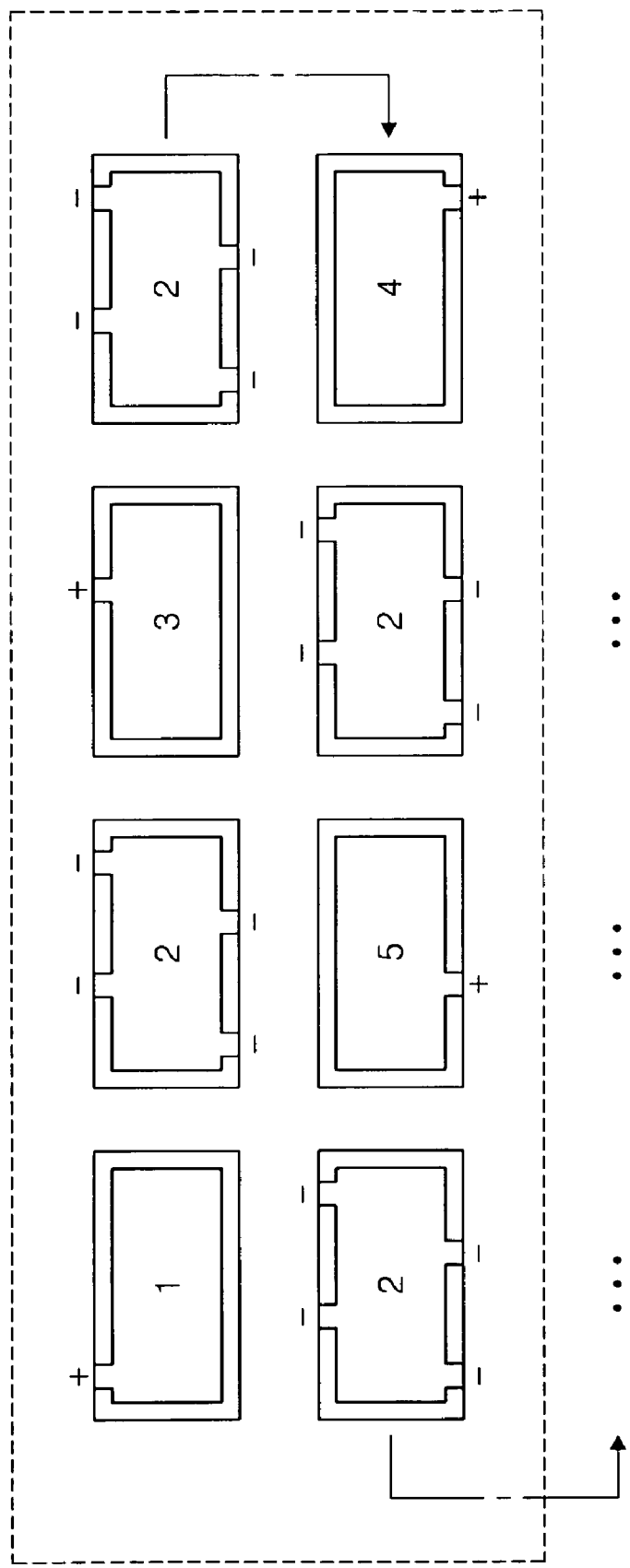
Figure 16:
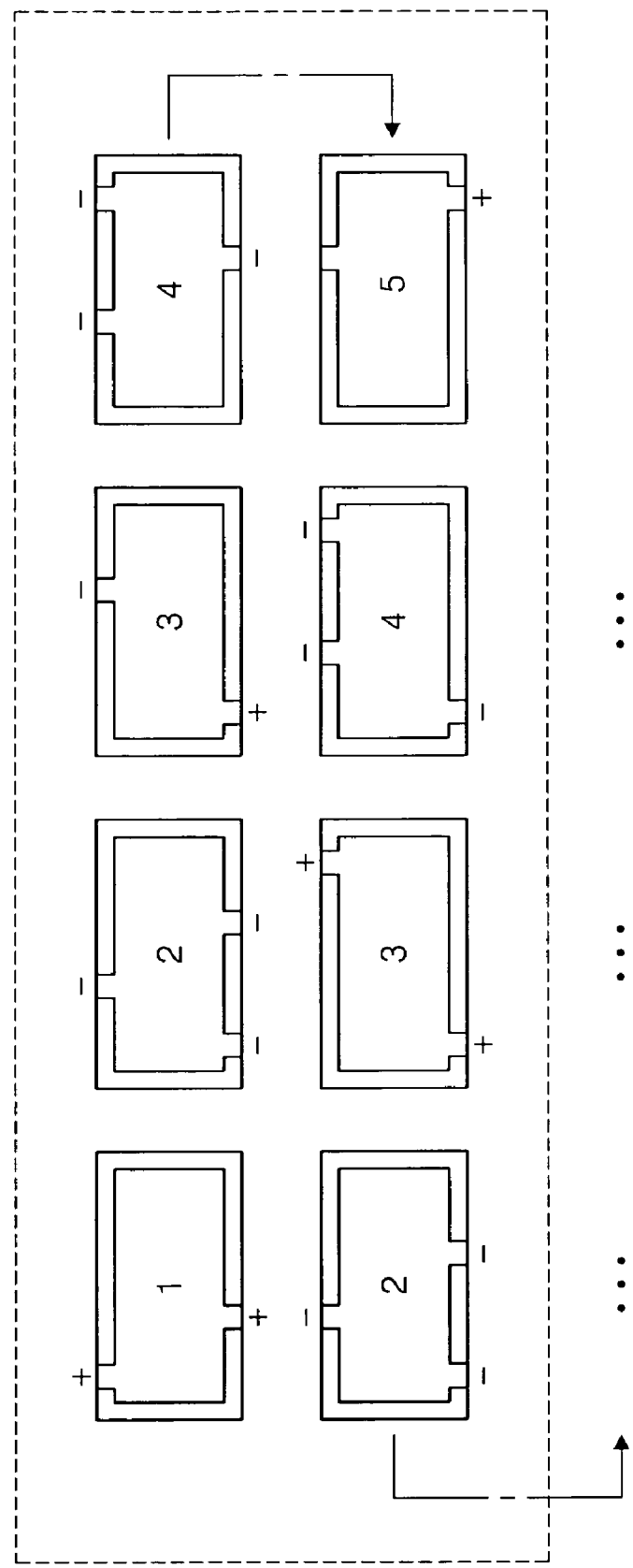
Figure 17:
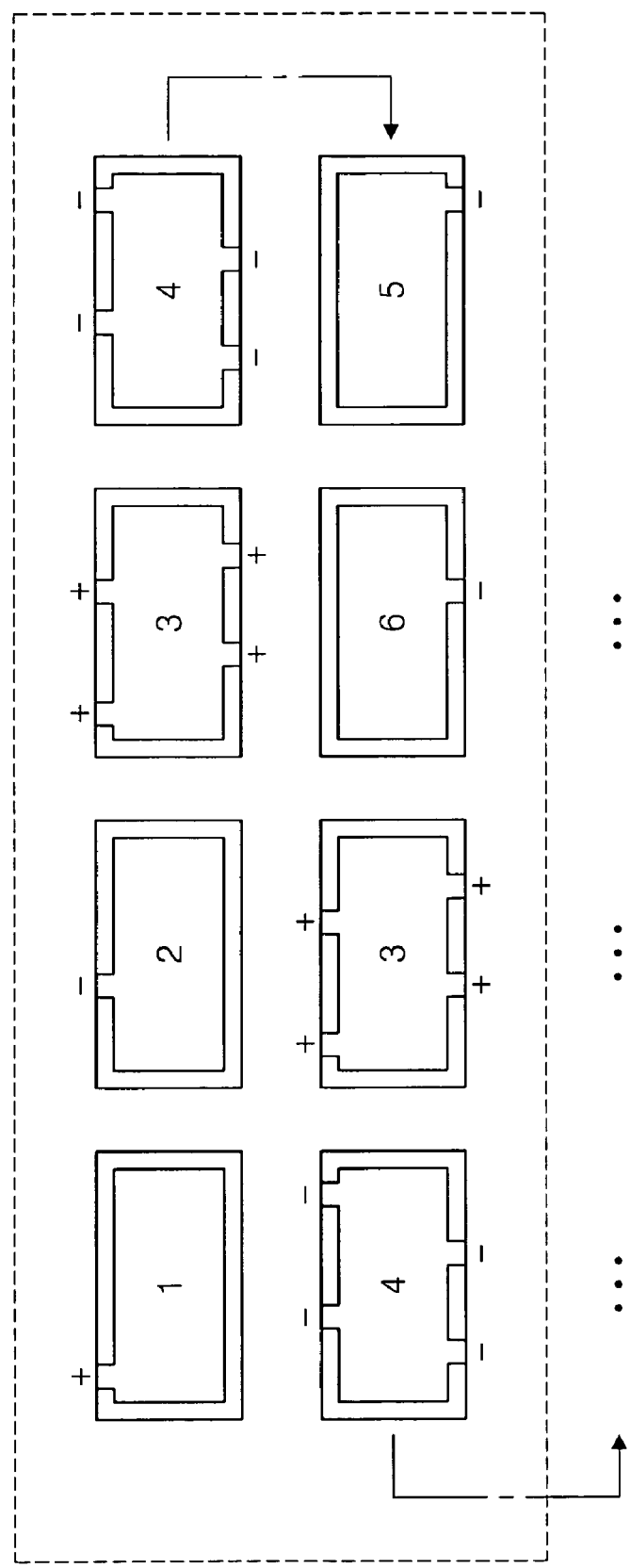
Figure 18:
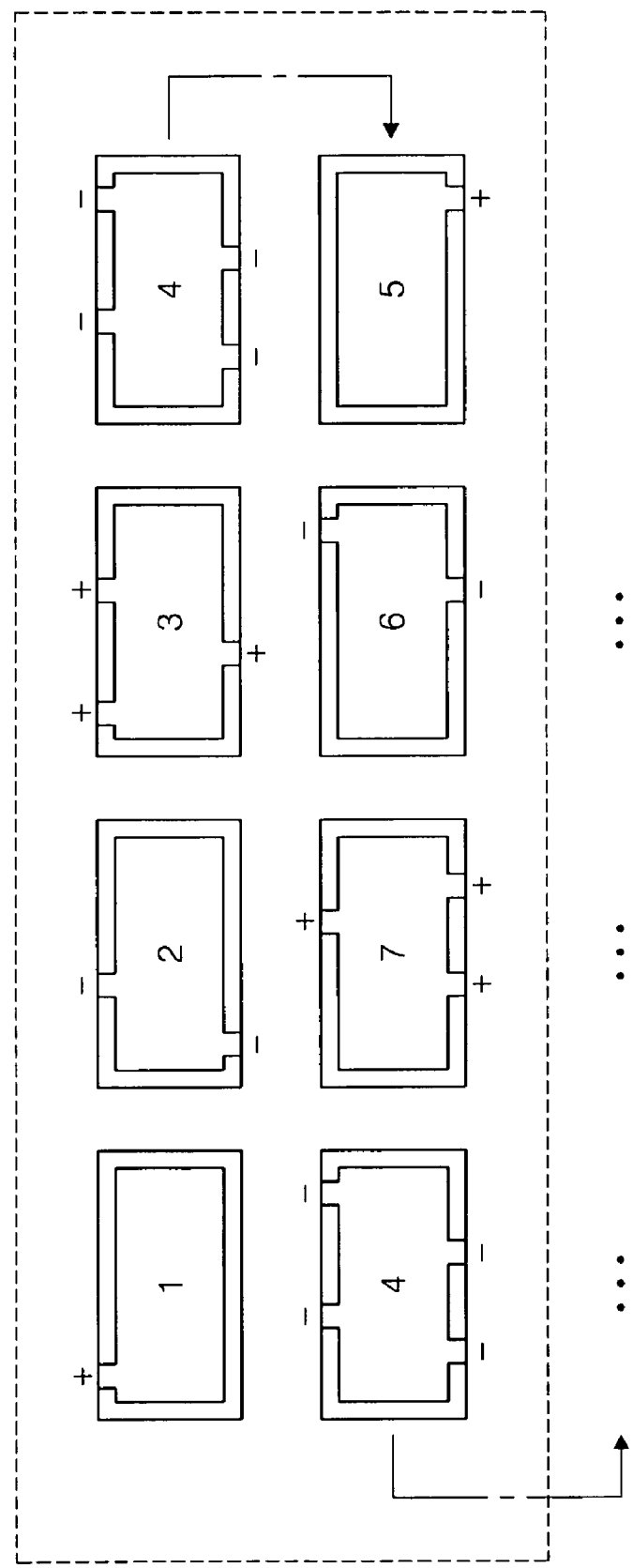
Figure 19:
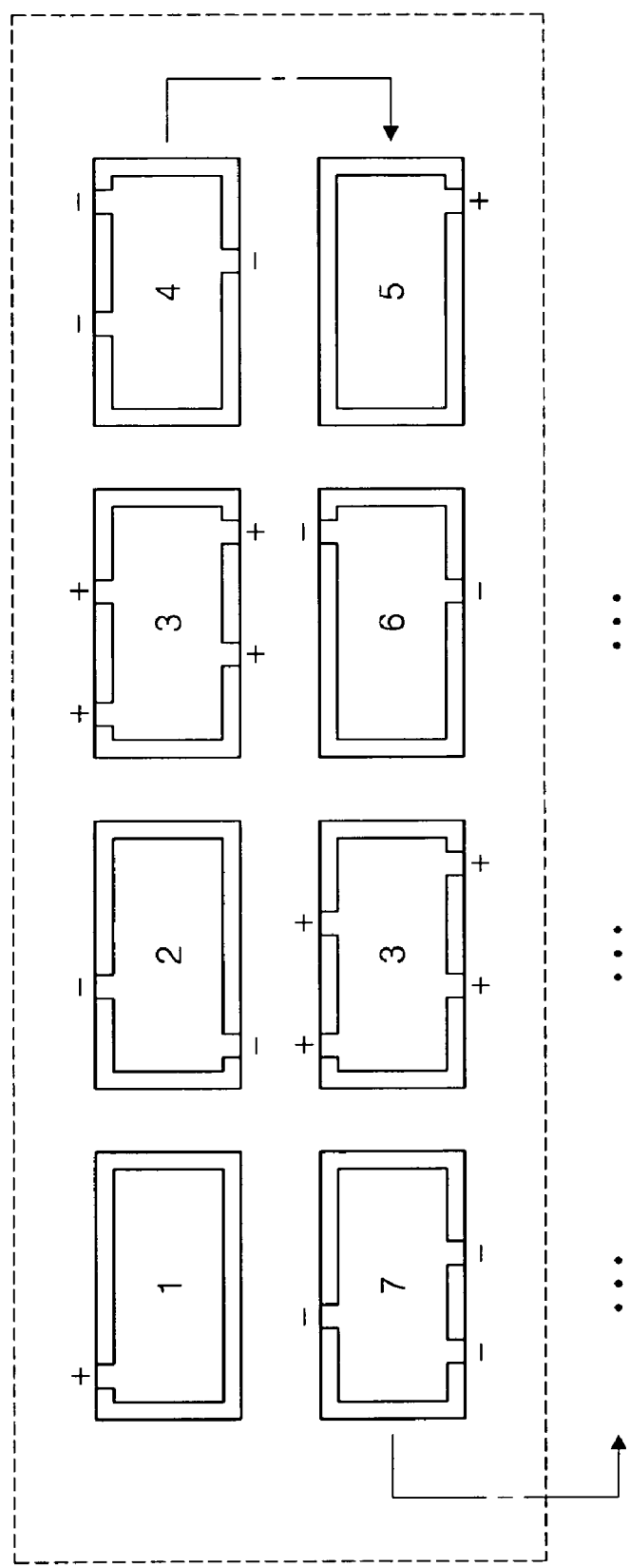
Figure 20:
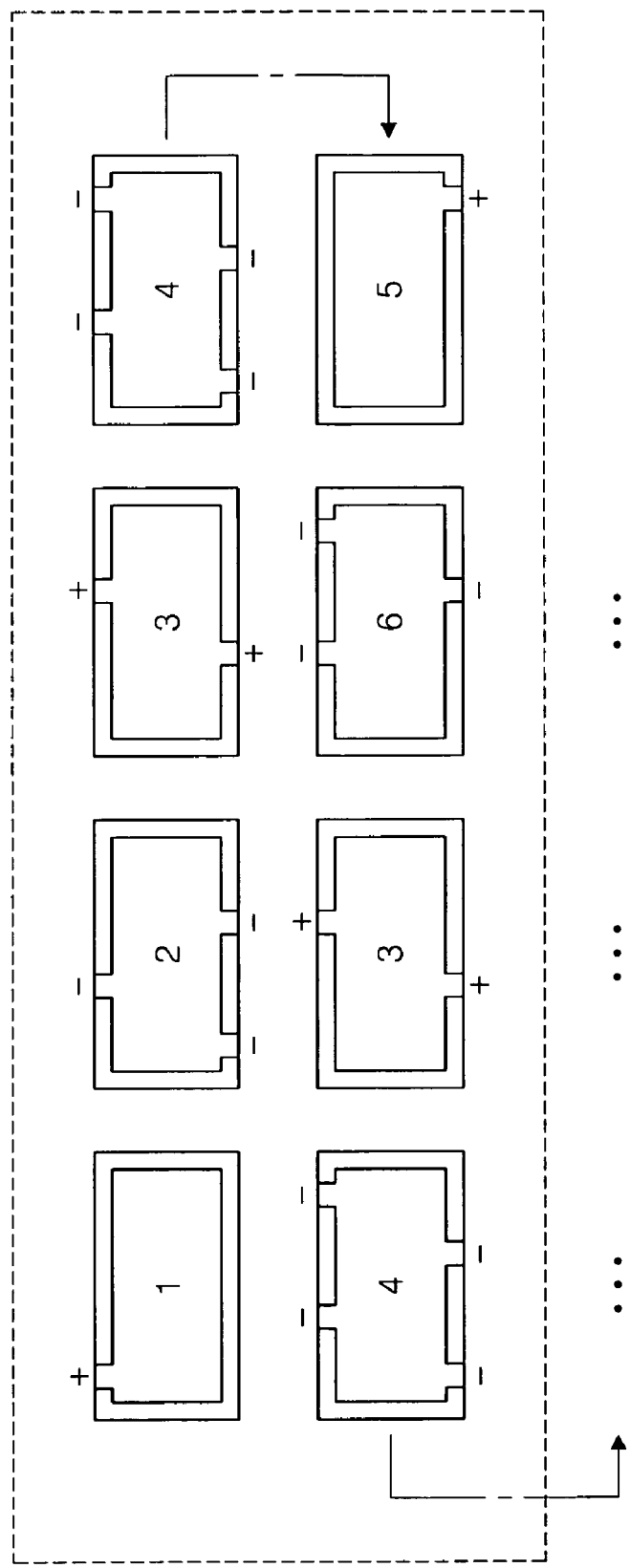
Figure 21:
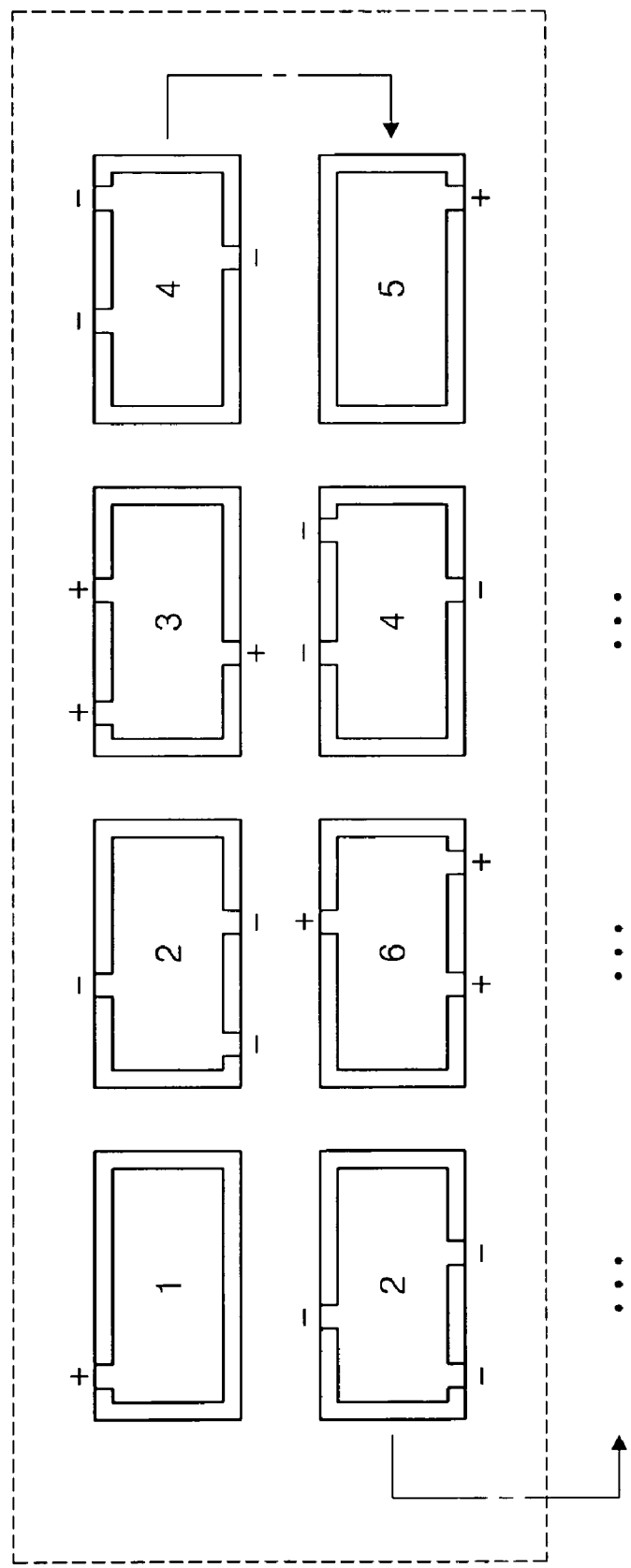

For example, in an internal electrode structure of FIG. 12, every eight successive internal electrodes constitute one block, and such blocks are stacked on top of each other. The eight internal electrodes have total seven electrode patterns 1, 2, 3, 4, 5, 6 and 7, and are disposed in the order of the electrode patterns 1, 2, 3, 4, 5, 6, 7 and 4. As shown in FIG. 12, an average value of the total number of leads of two vertically adjacent internal electrodes is (1+2+1+4+1+2+1+4)/4=4. The number of leads of each of the vertically adjacent internal electrodes is determined to correspond with the average value 'four', and then the leads of two vertically adjacent internal electrodes are disposed as adjacent as possible to each other. In FIGS. 13 and 14, the average number of the total number of leads of two vertically adjacent internal electrodes is four.

In FIGS. 15 through 23, an average value of the total number of leads of two vertically adjacent internal electrodes is five. Referring to FIG. 5, successively disposed eight internal electrodes constitute one block. Total five electrode patterns 1, 2, 3, 4 and 5 are included in each block.

Figure 22:
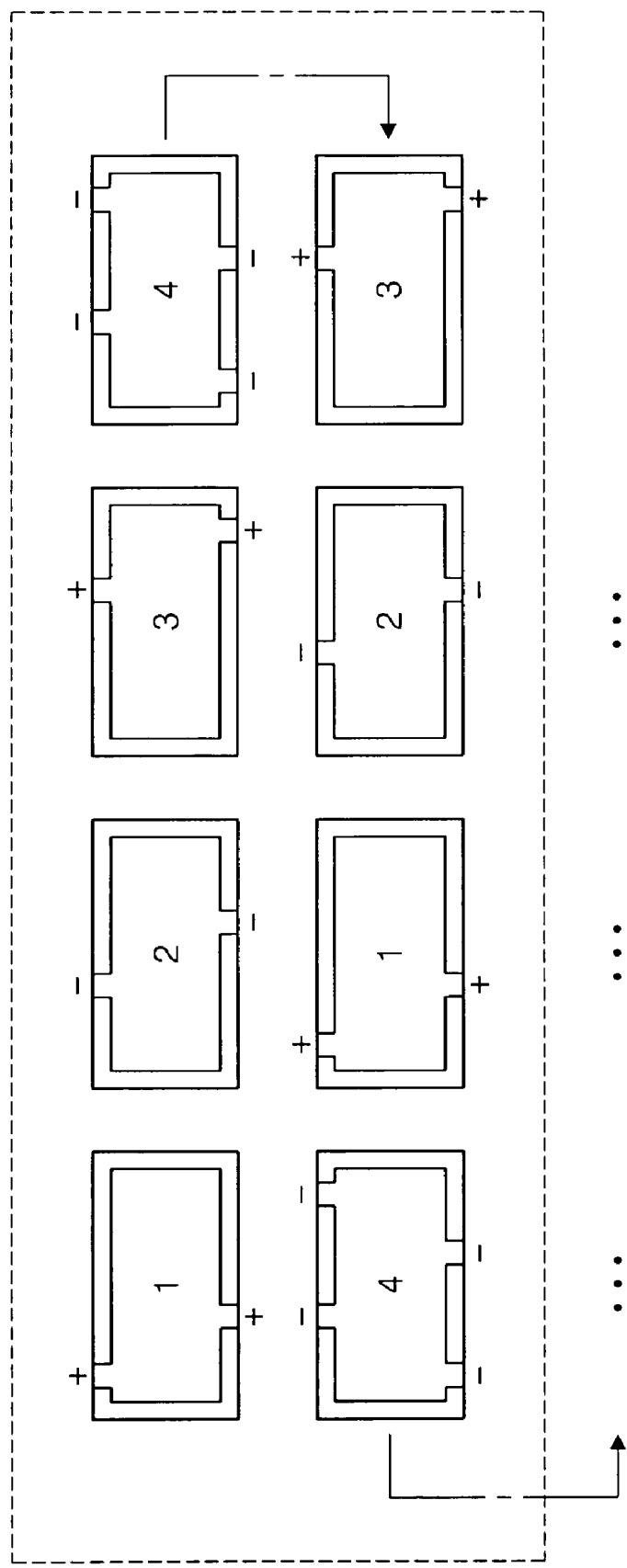
Figure 23:
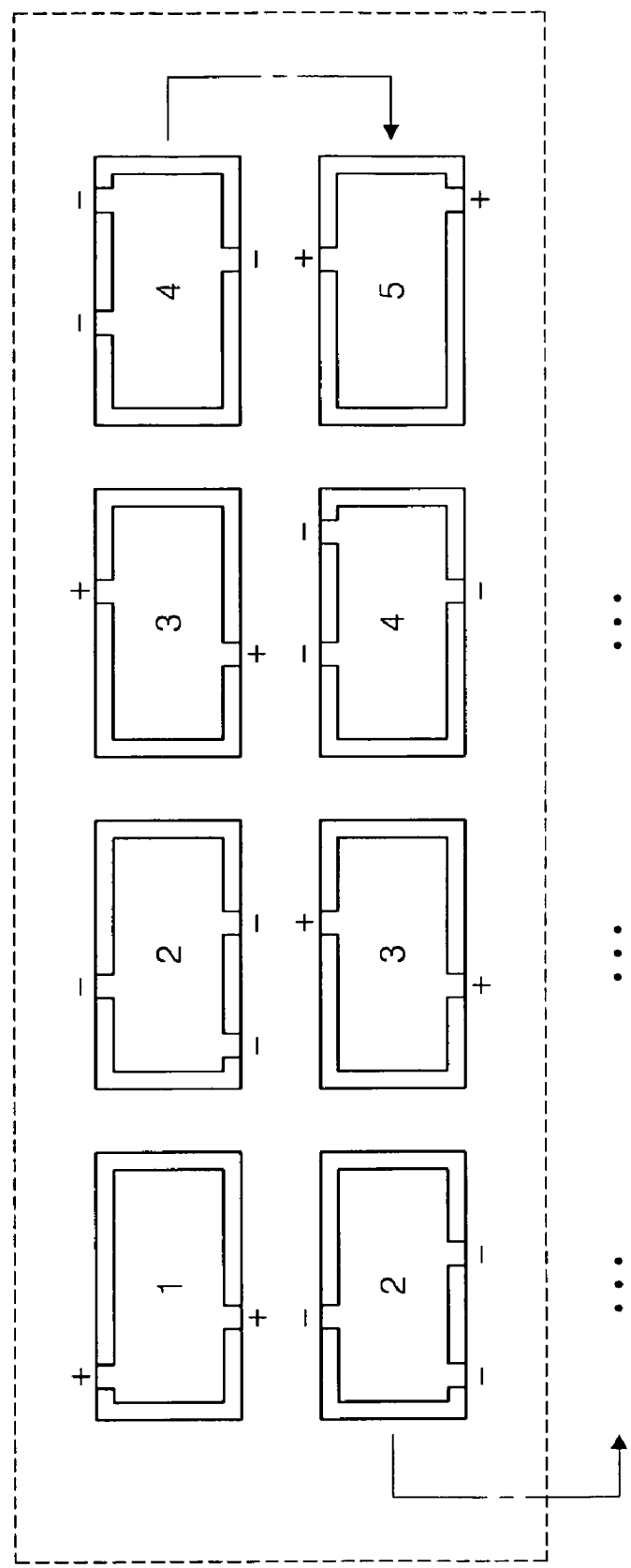

Referring to FIG. 22, eight successively disposed internal electrodes constitute one block. Total four electrode patterns 1, 2, 3 and 4 are included in each block.

Figure 24:
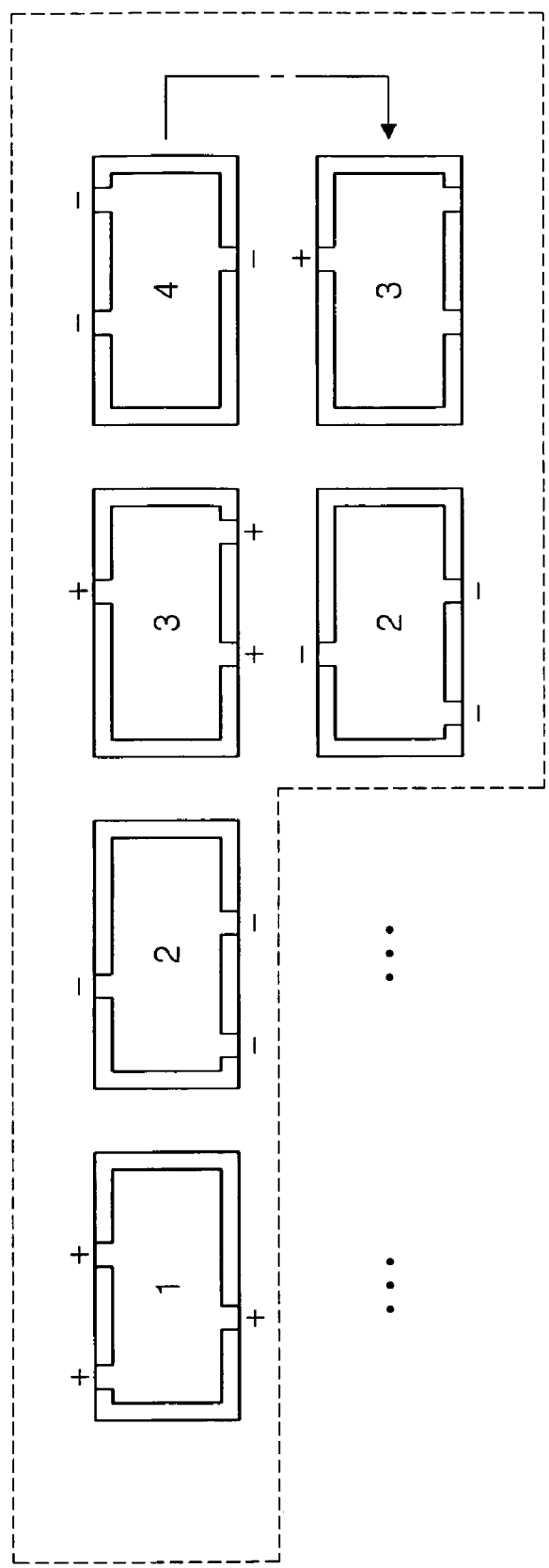

Referring to FIGS. 24 through 30, an average value of the total number of leads of two vertically adjacent internal electrodes is six. Referring to FIG. 24, six successively disposed internal electrodes constitute one block. Total four electrode patterns 1, 2, 3 and 4 are included in the block.

Figure 25:
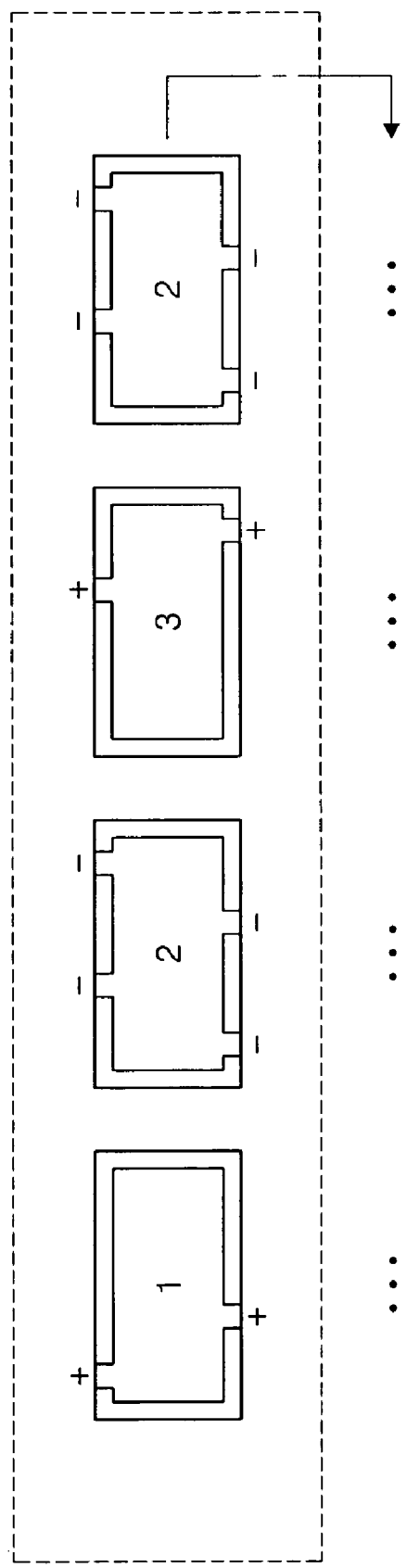
Figure 26:
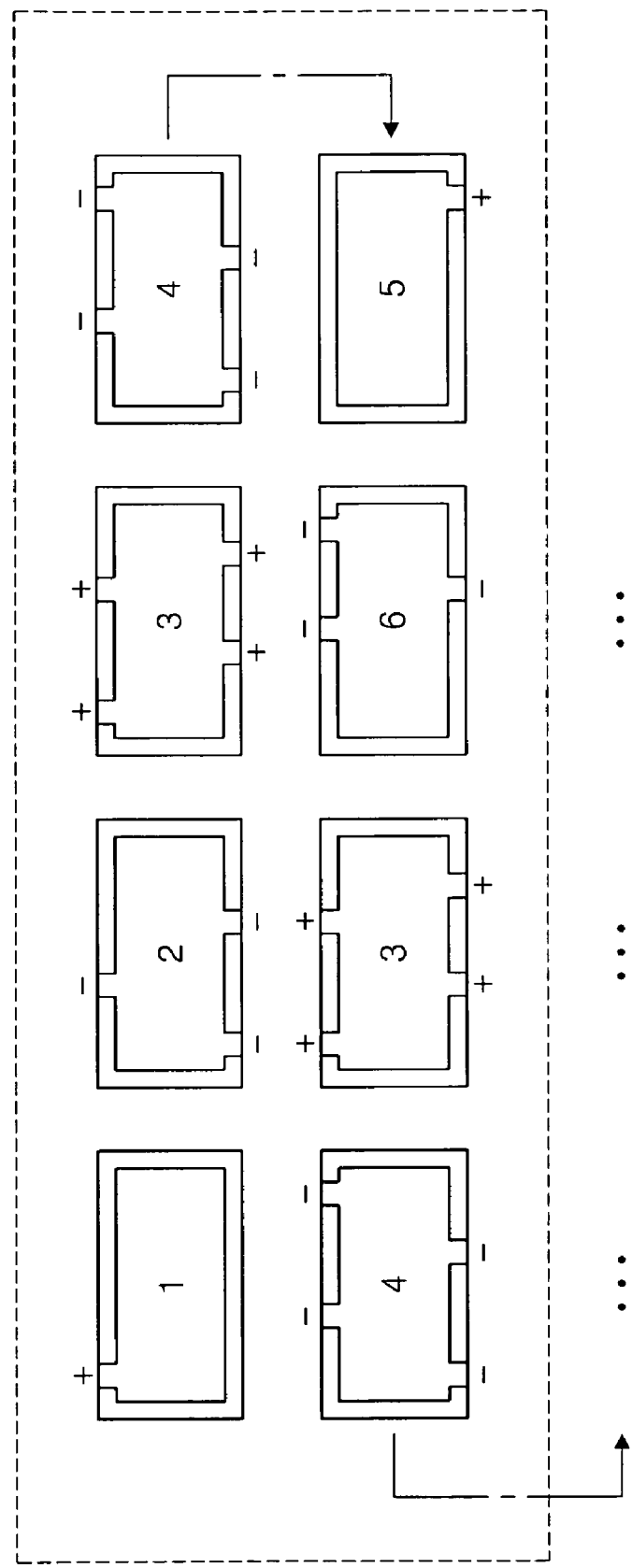
Figure 27:
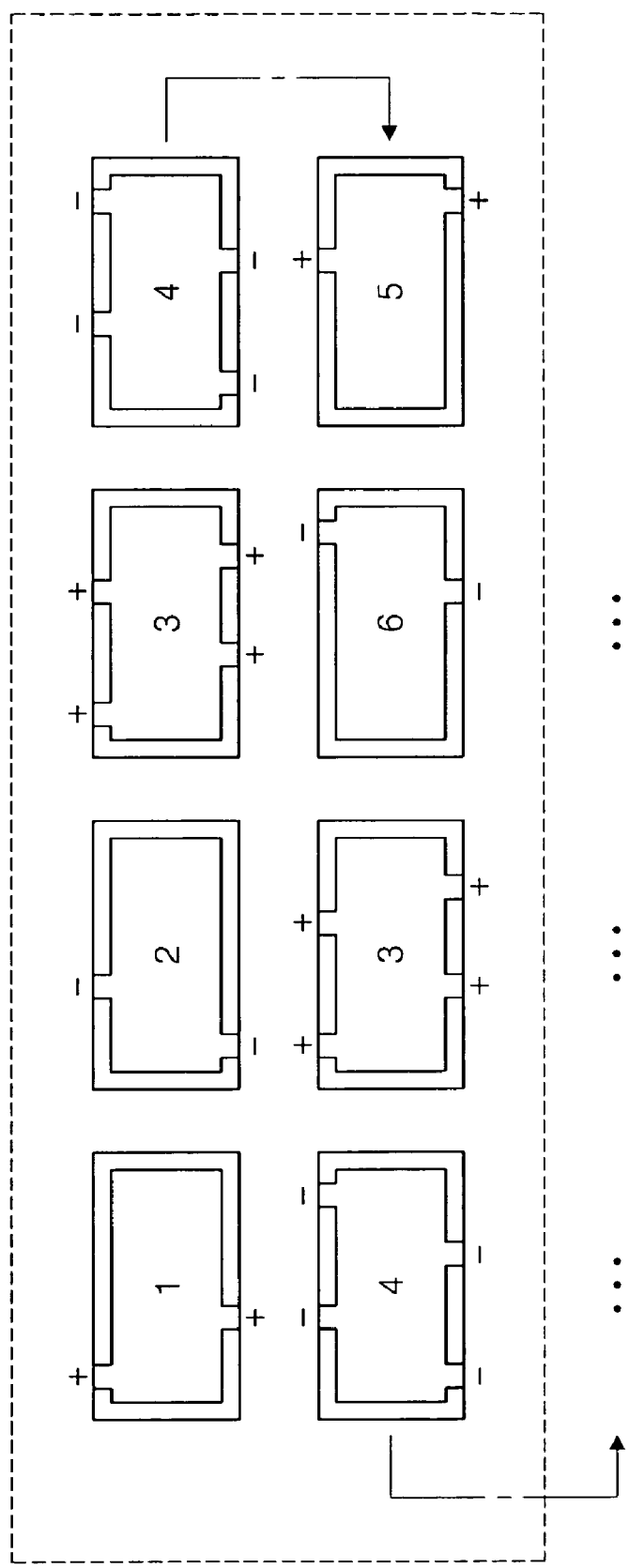
Figure 28:
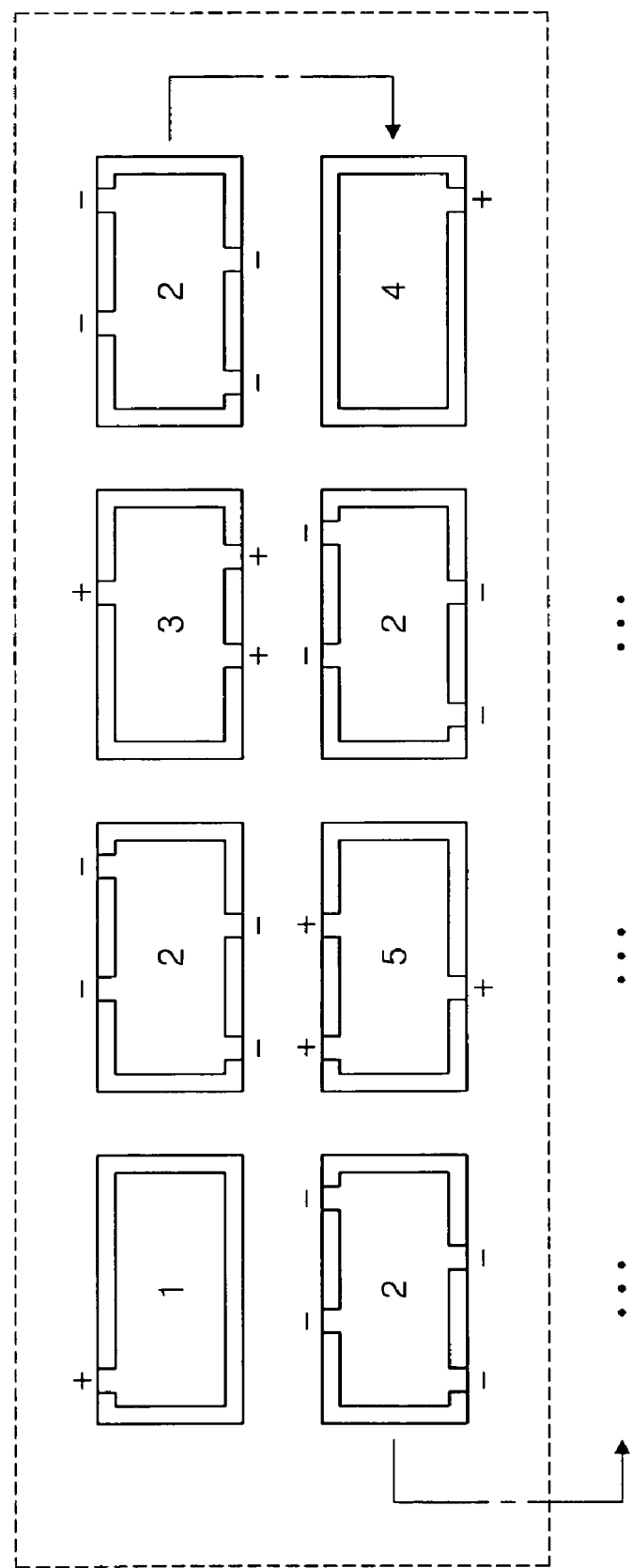
Figure 29:
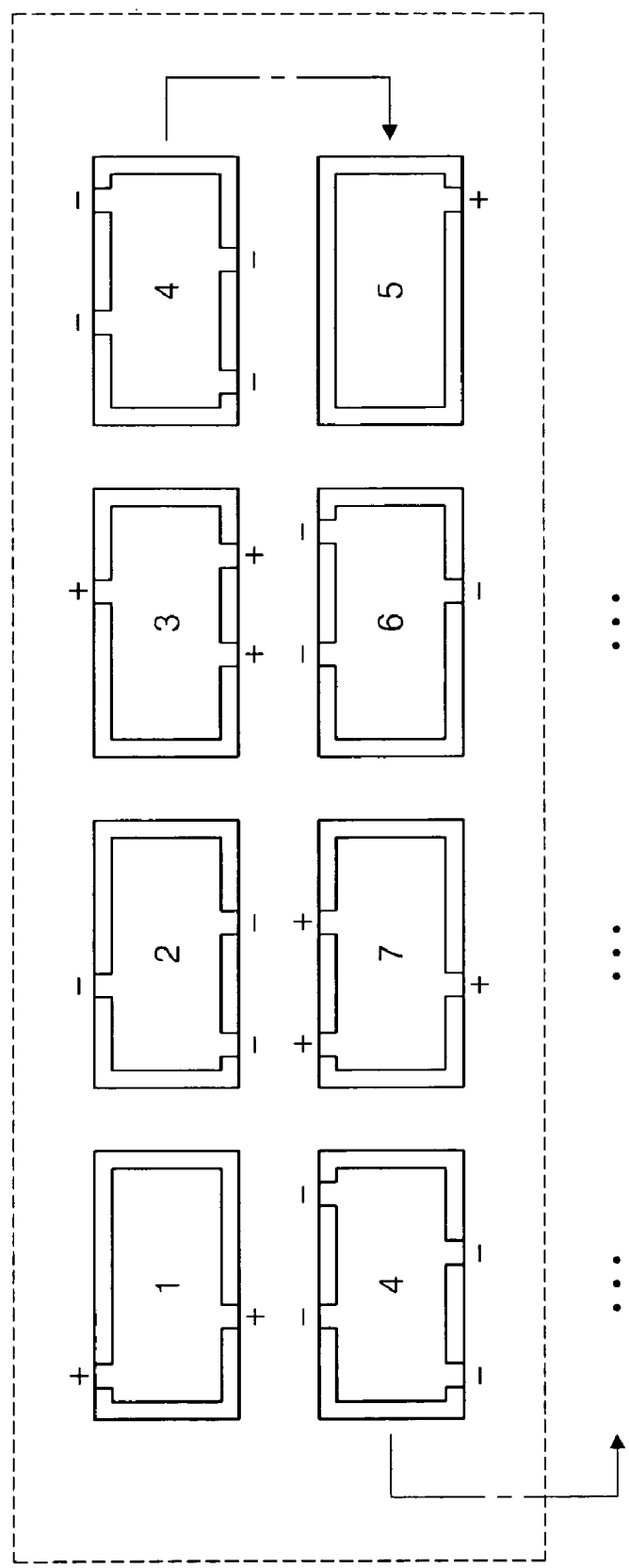
Figure 30:
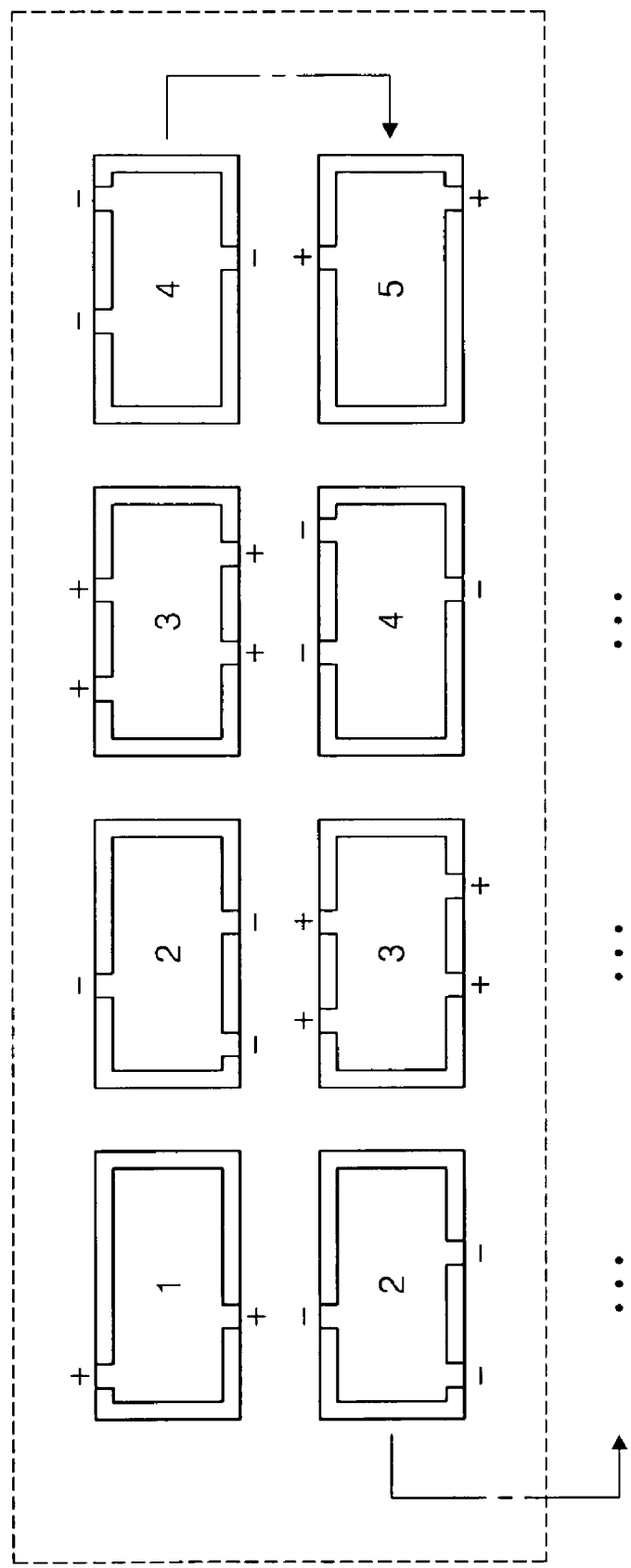

Referring to FIG. 25, four successively disposed internal electrodes constitute one block. Total three electrode patterns 1, 2 and 3 are included in the block.

Figure 31:
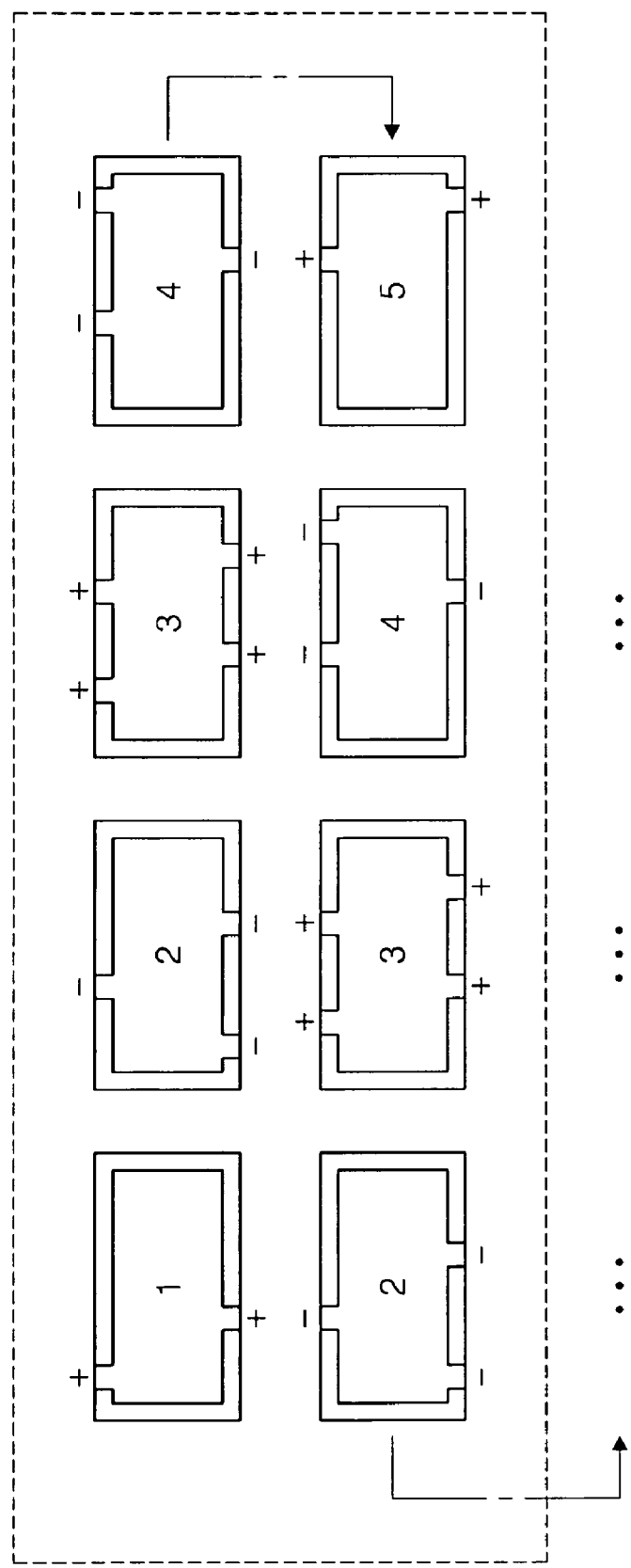
Figure 32:
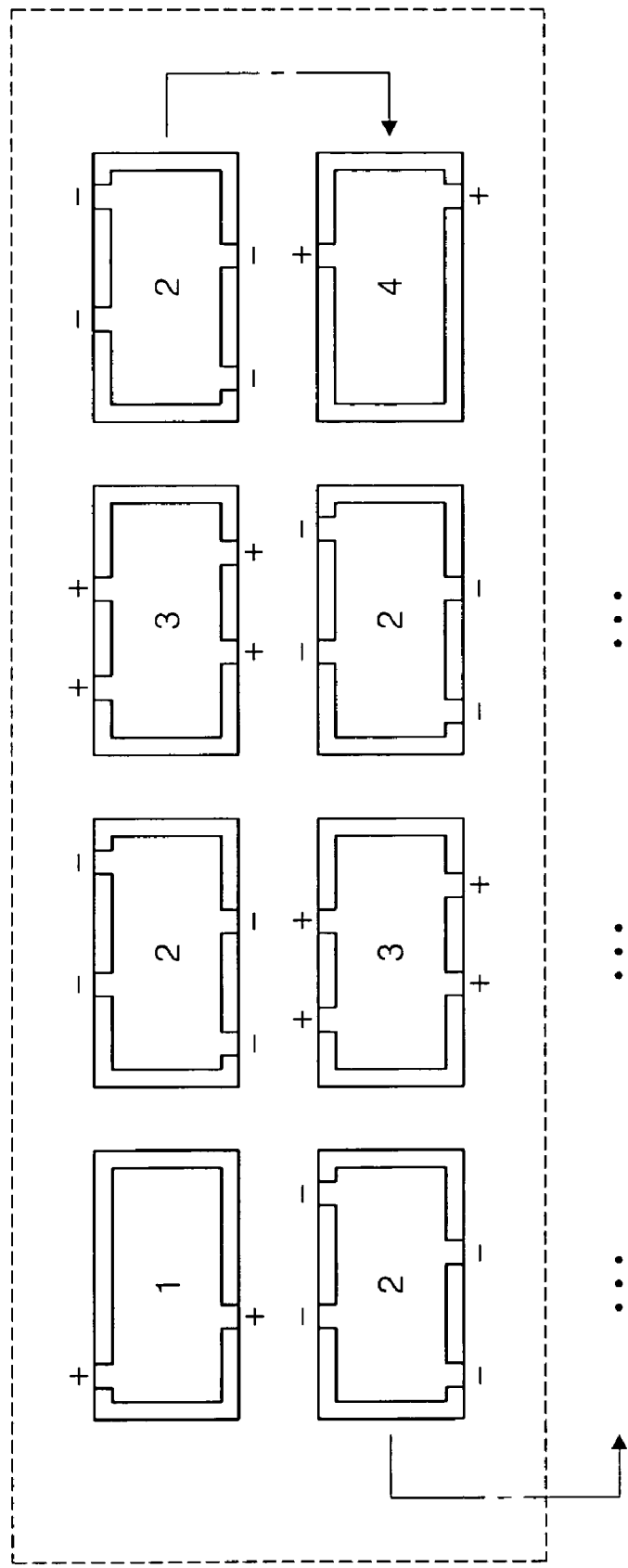
Figure 33:
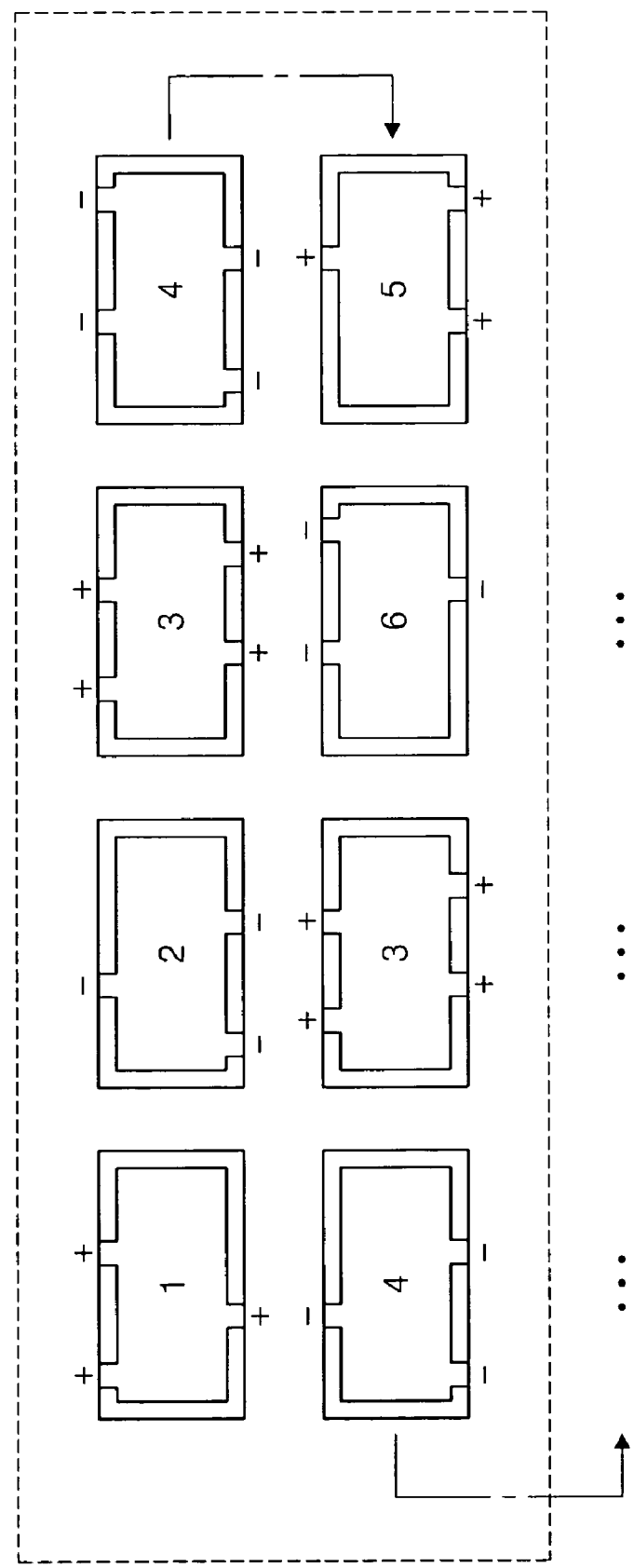
Figure 34:
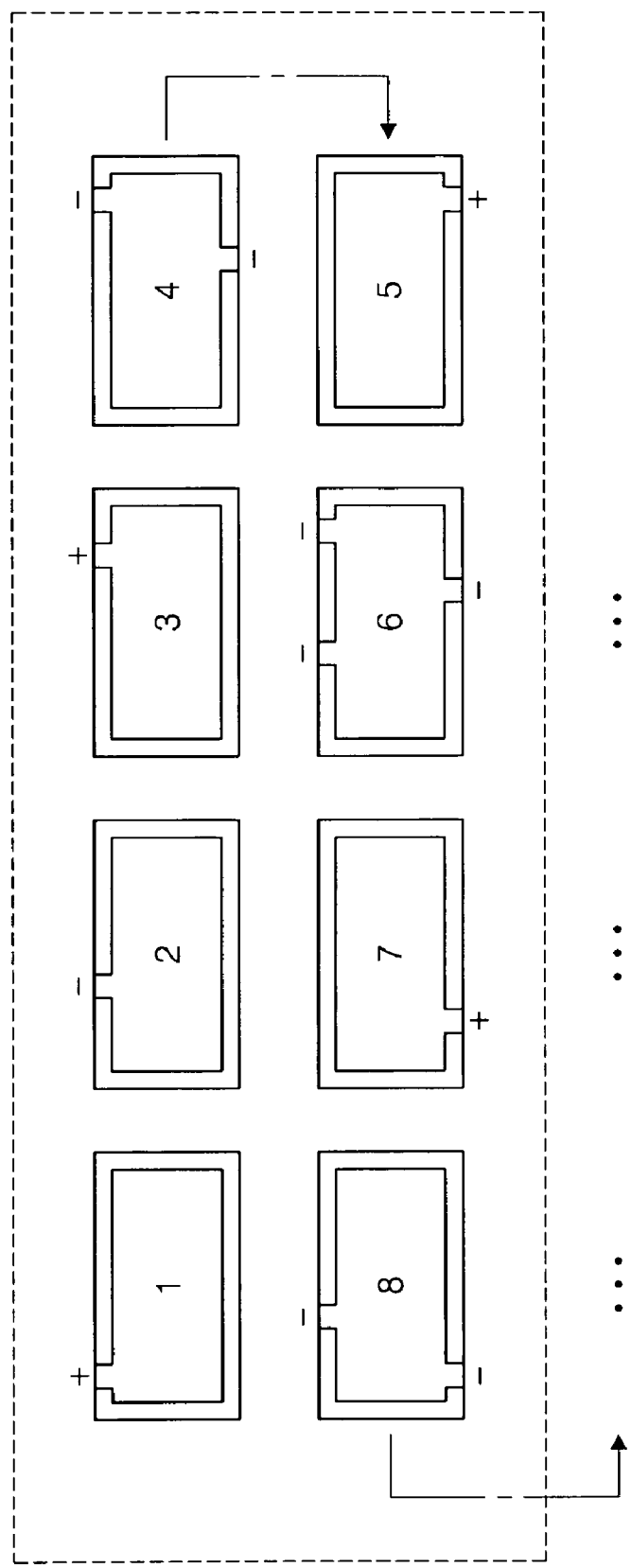
Figure 35:
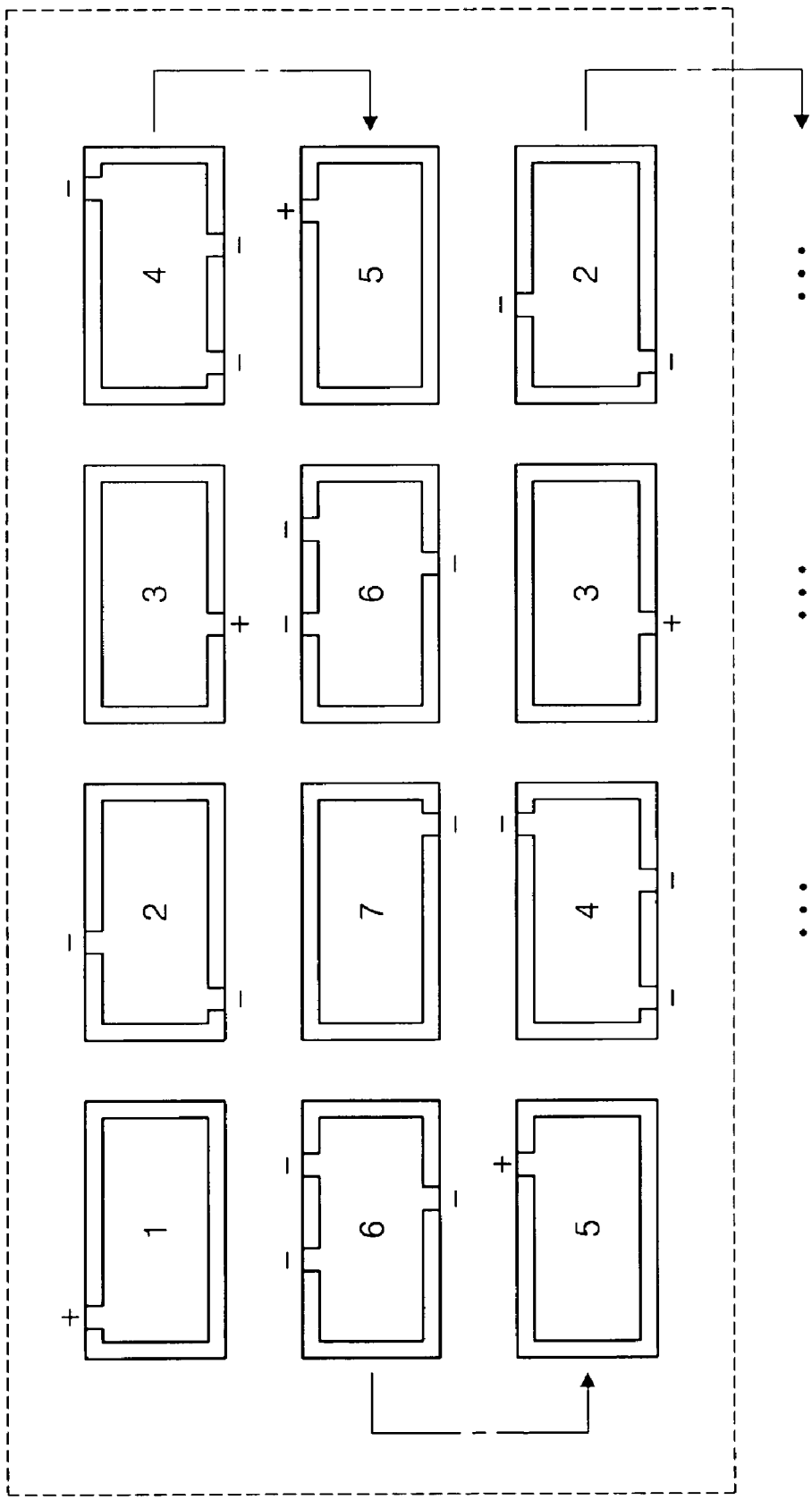
Figure 36:
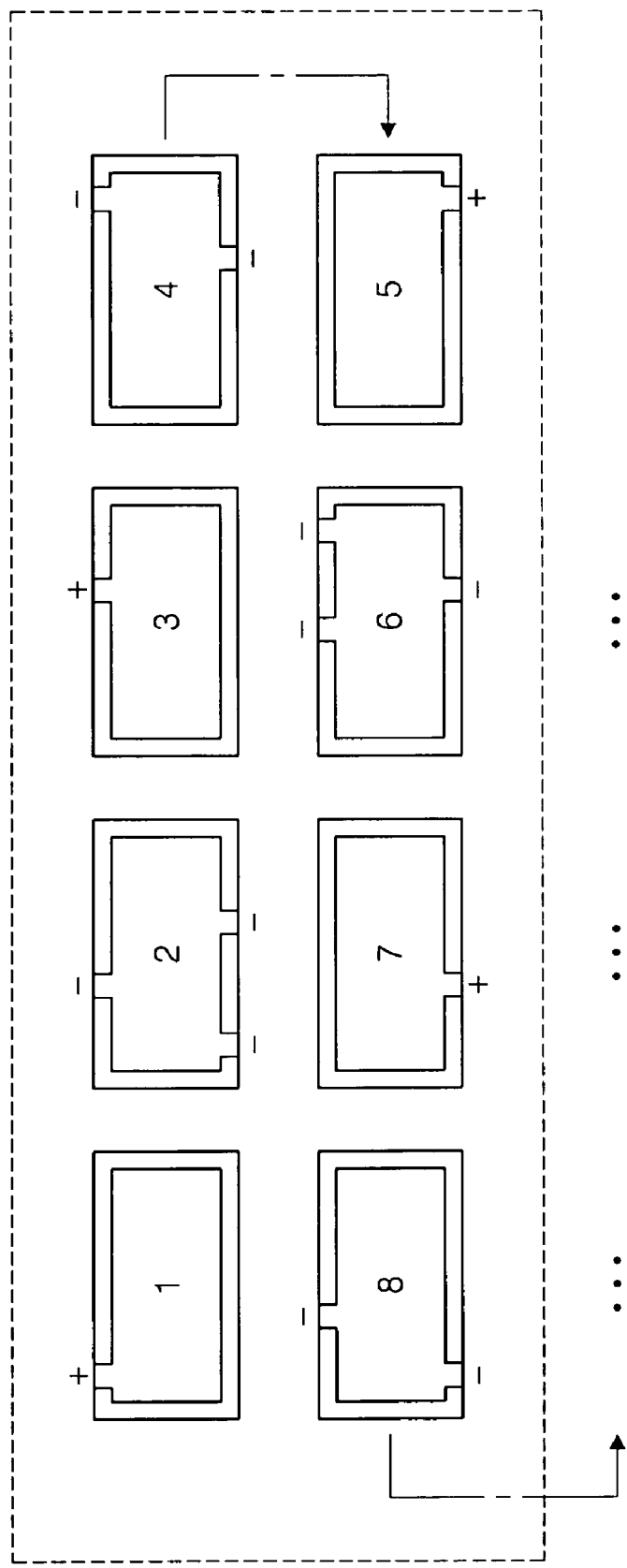
Figure 37:
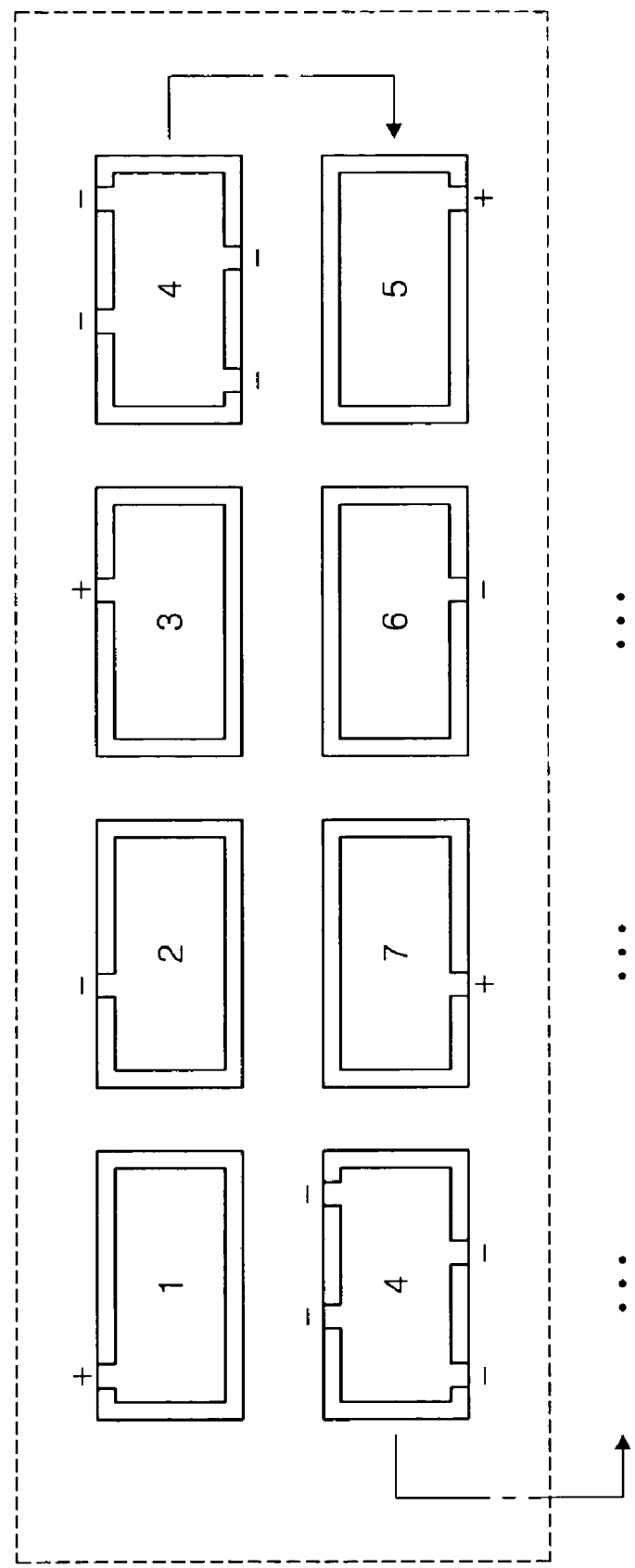
Figure 38:
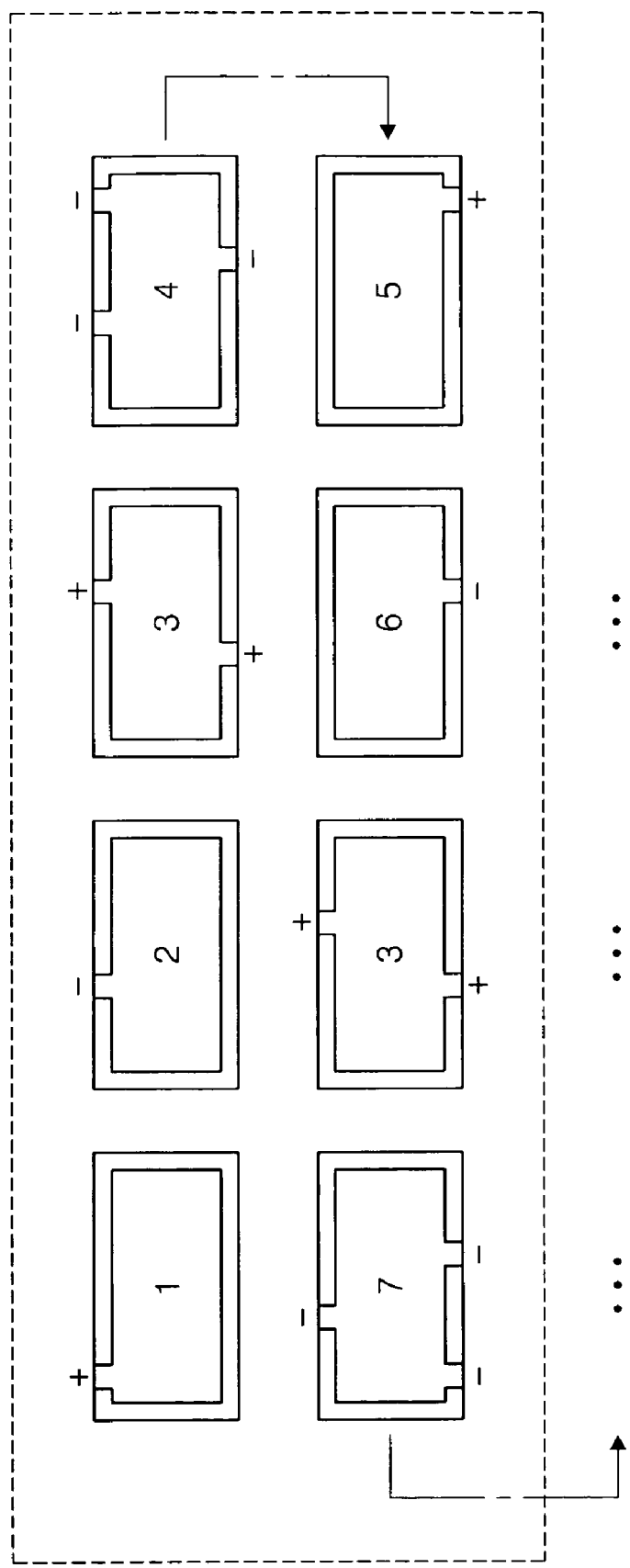
Figure 39:
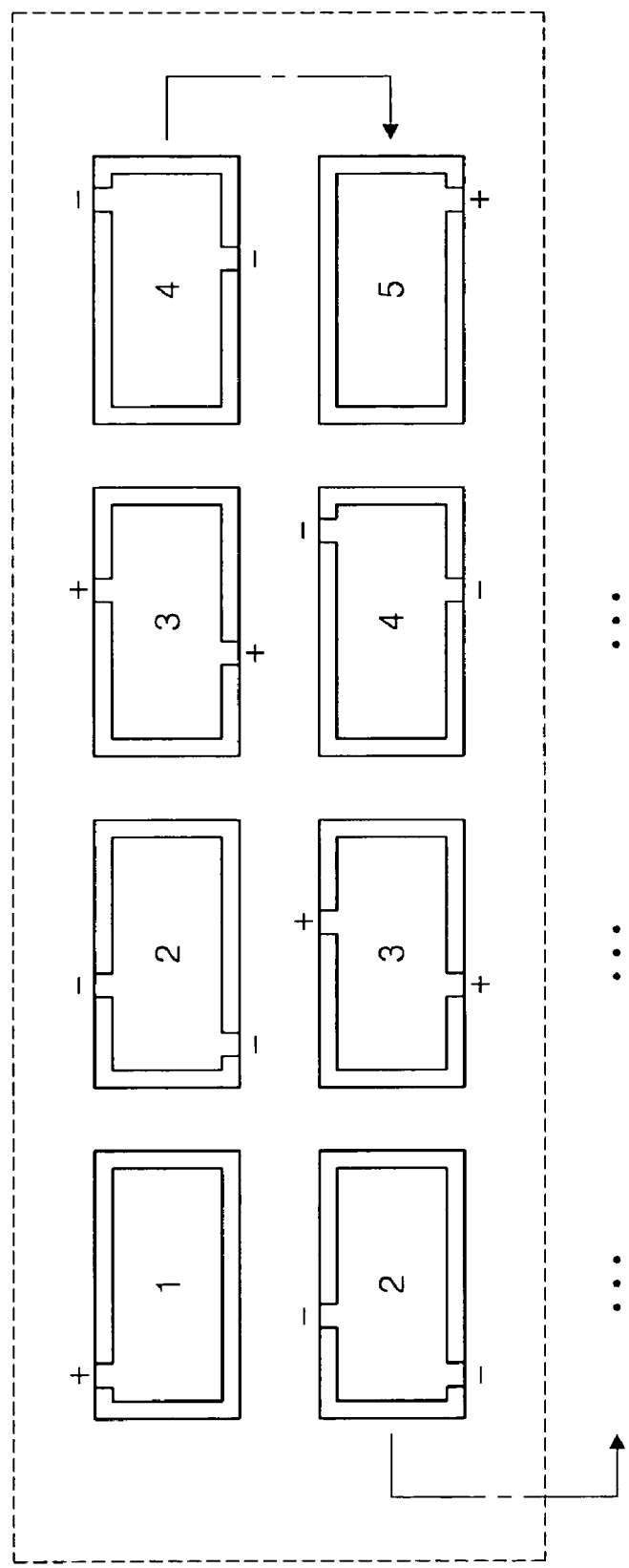
Figure 40:
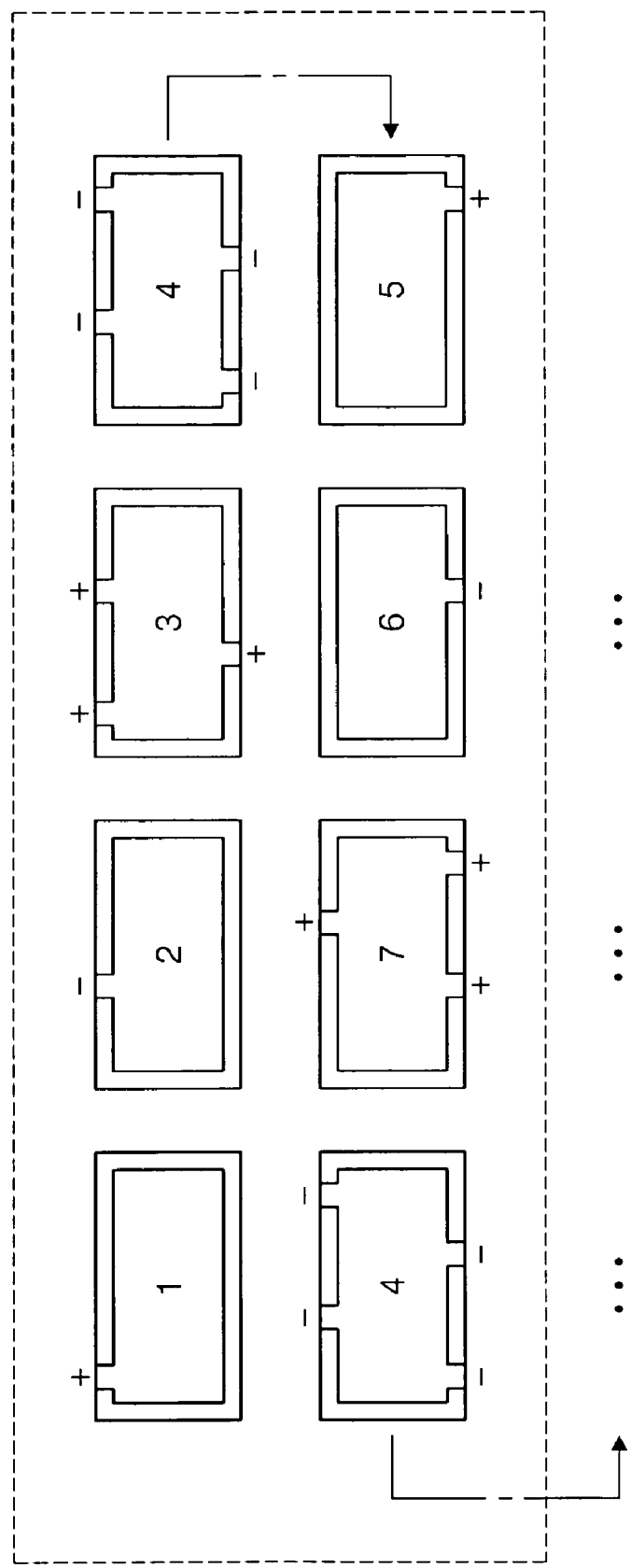
Figure 41:
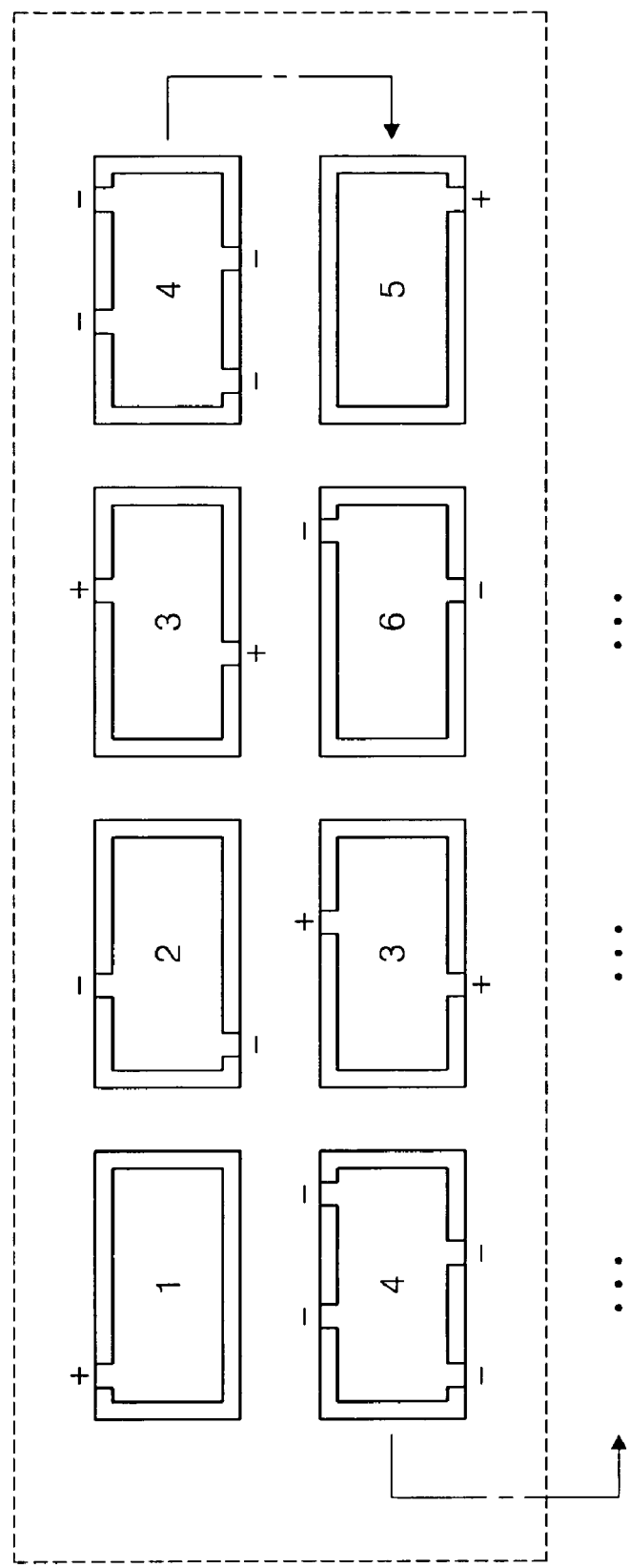
Figure 42:
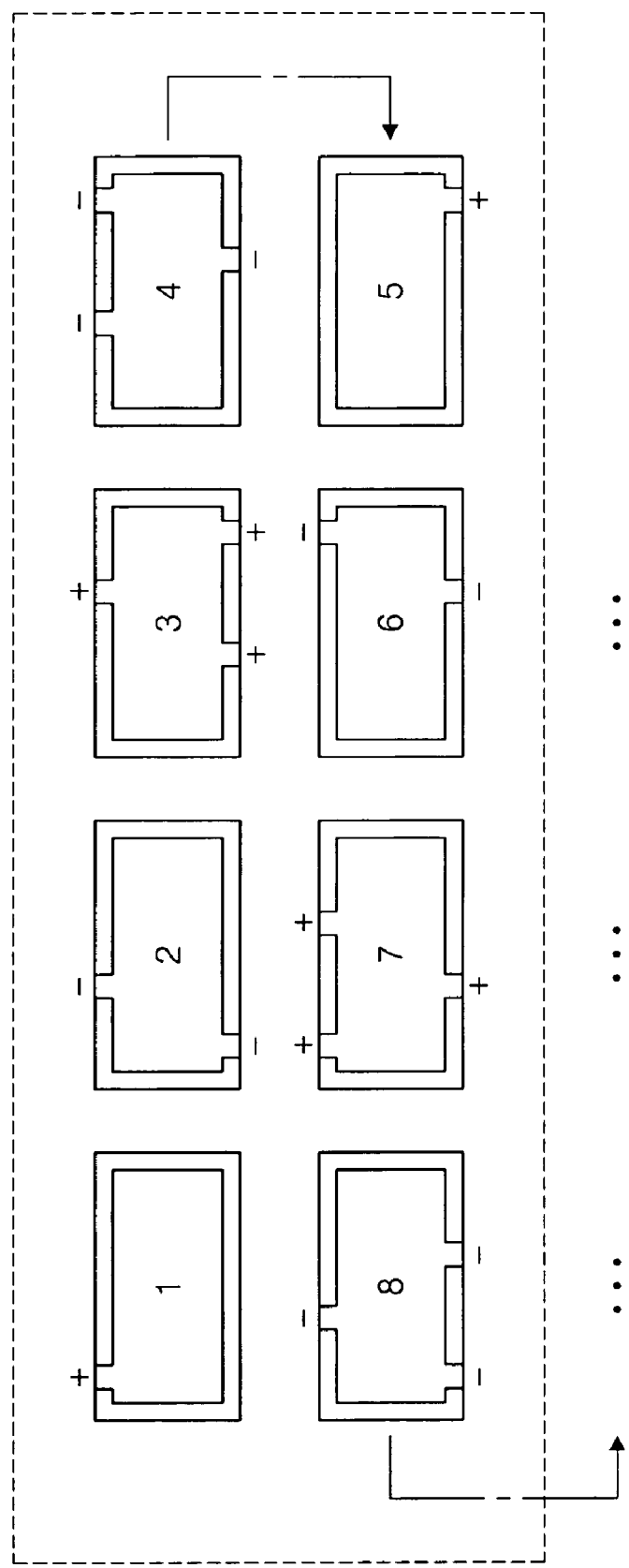
Figure 43:
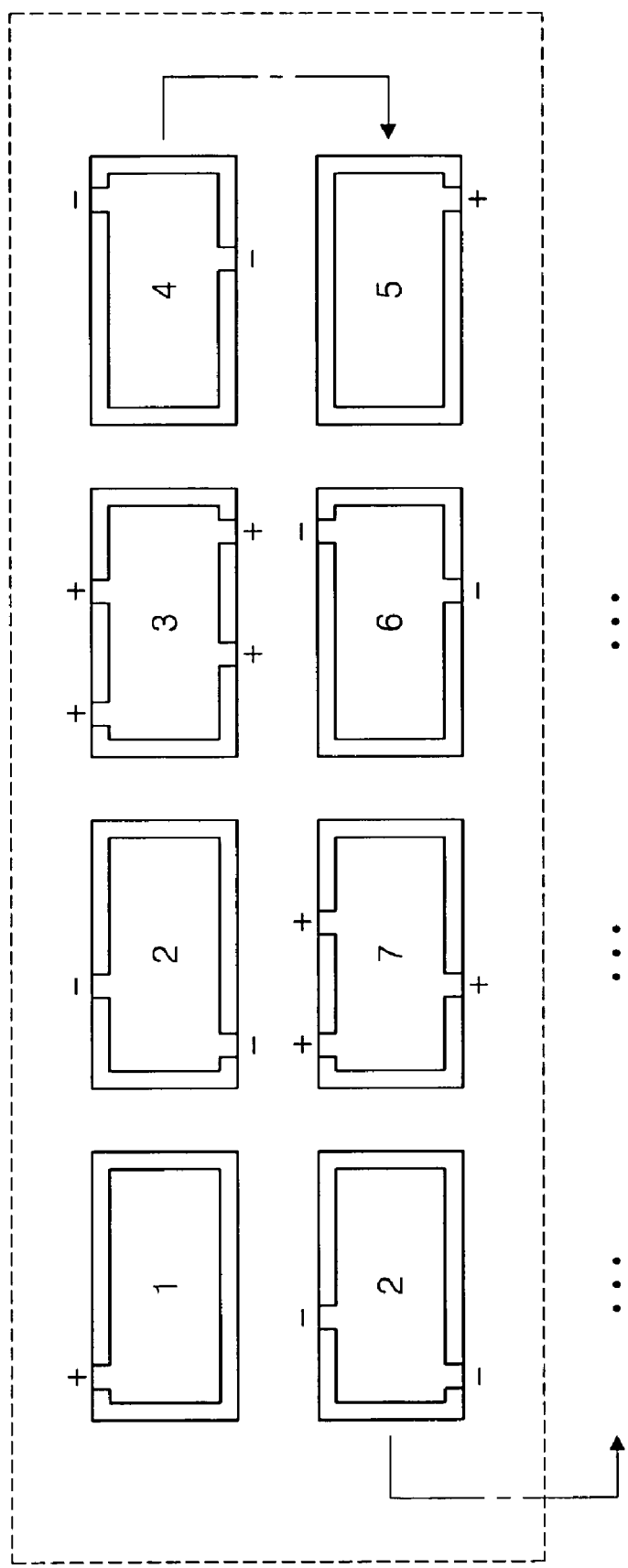
Figure 44:
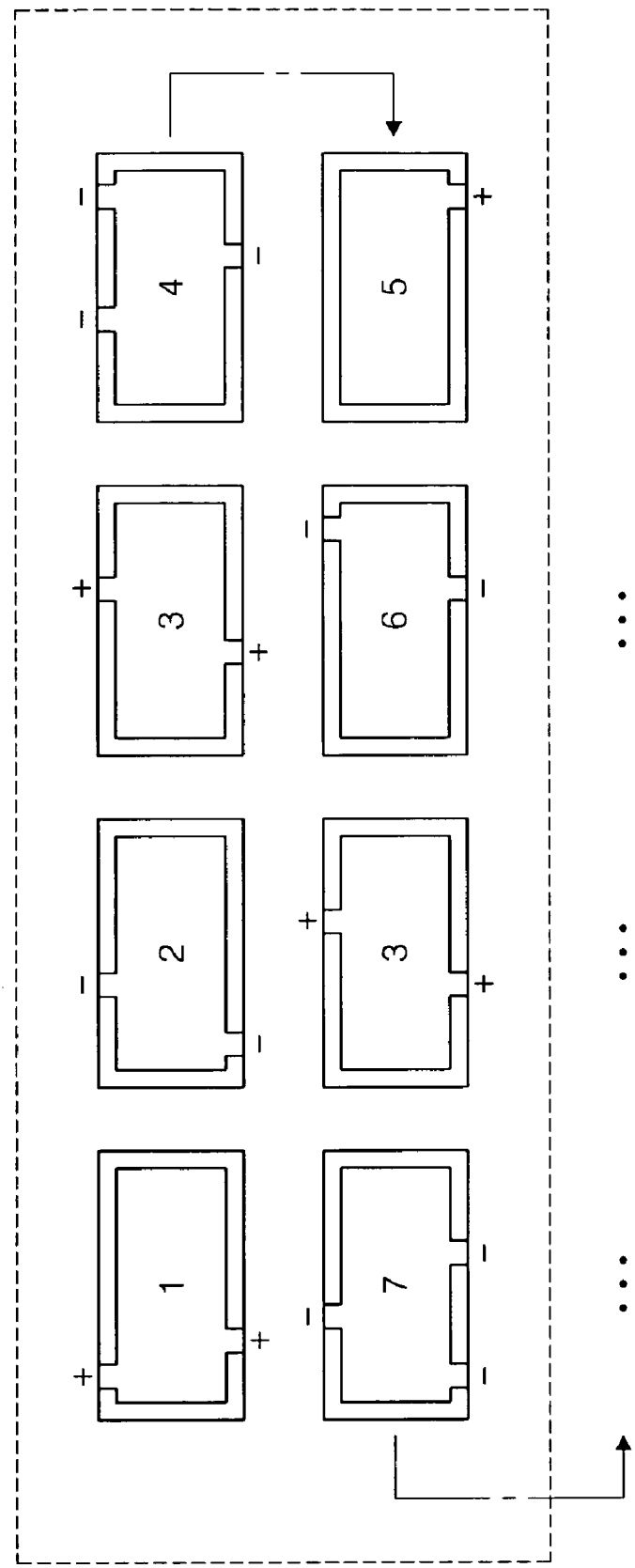
Figure 45:
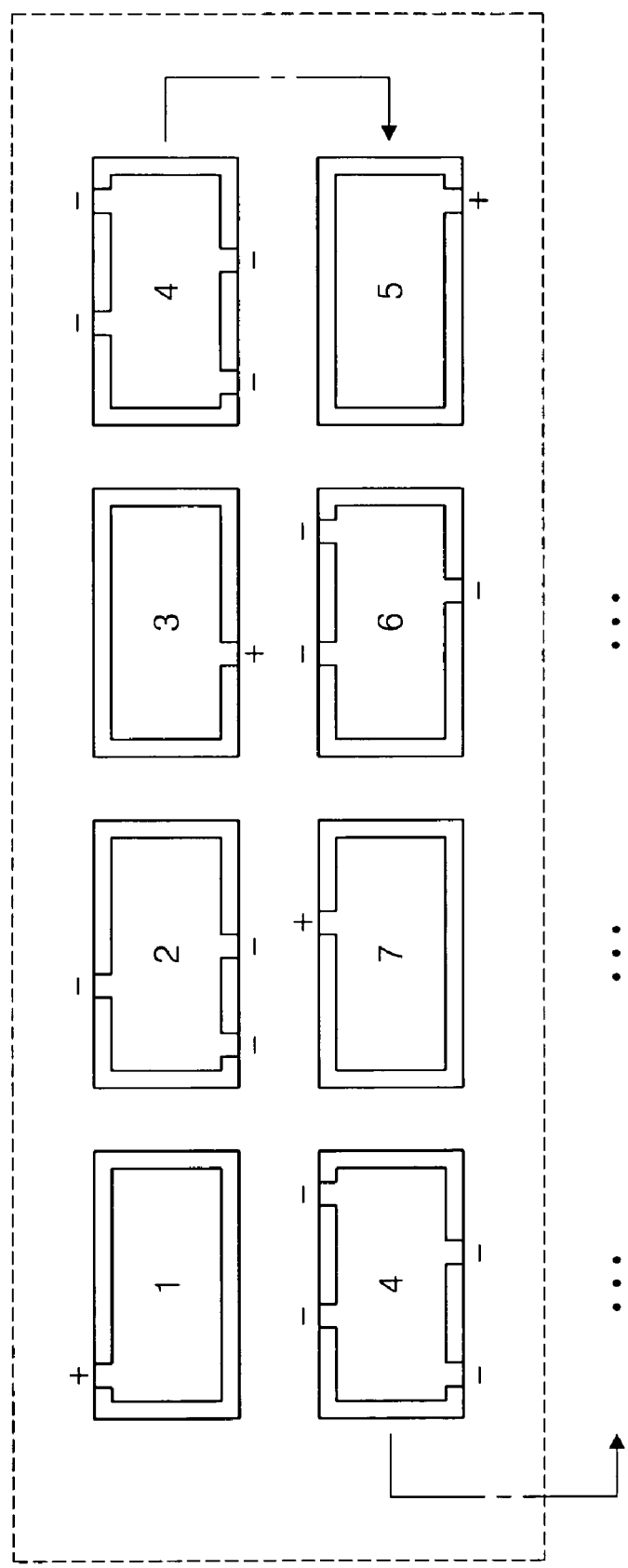
Figure 46:
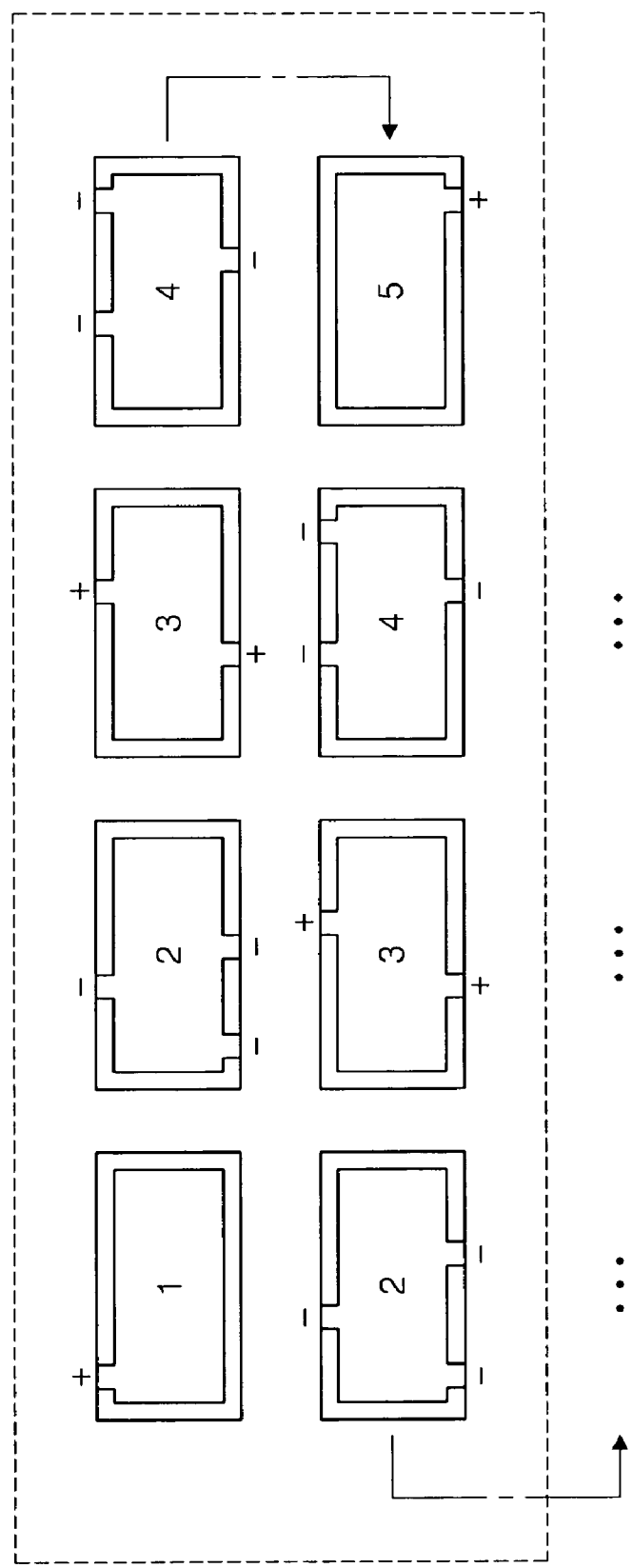
Figure 47:
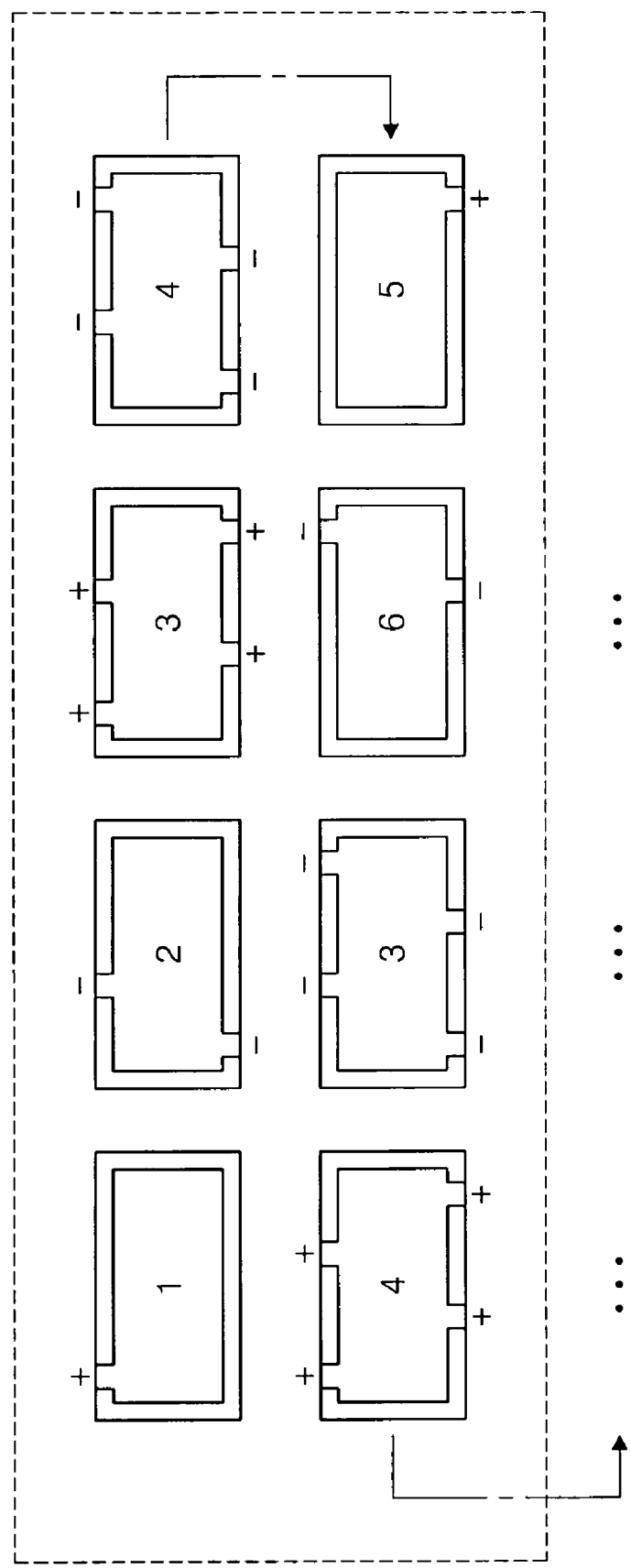
Figure 48:
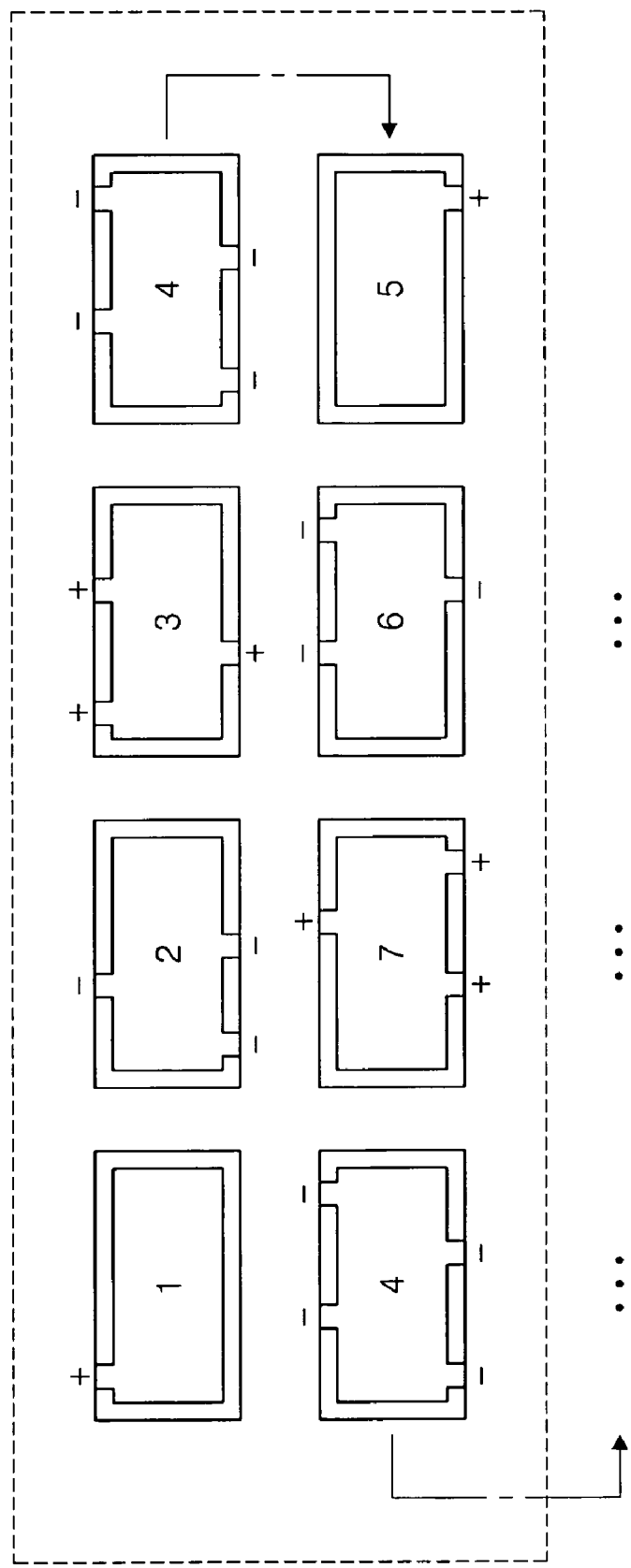
Figure 49:
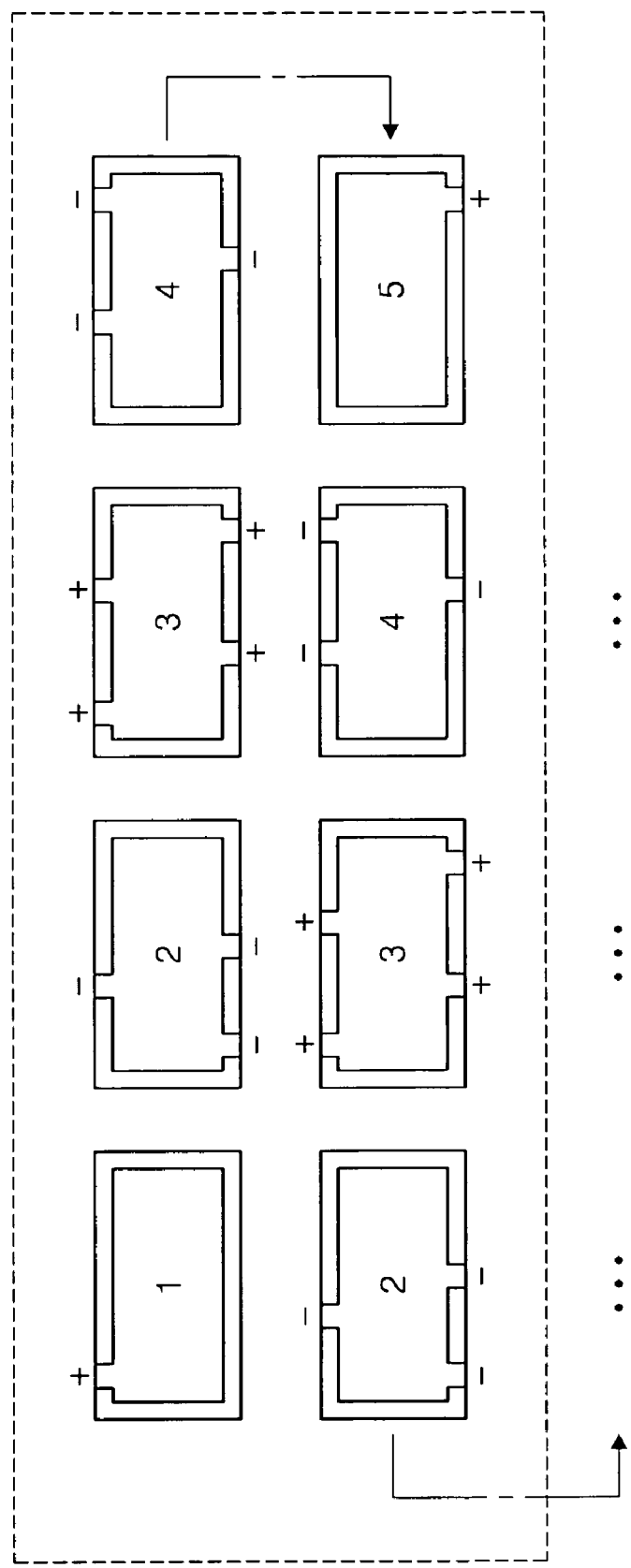
Figure 50:
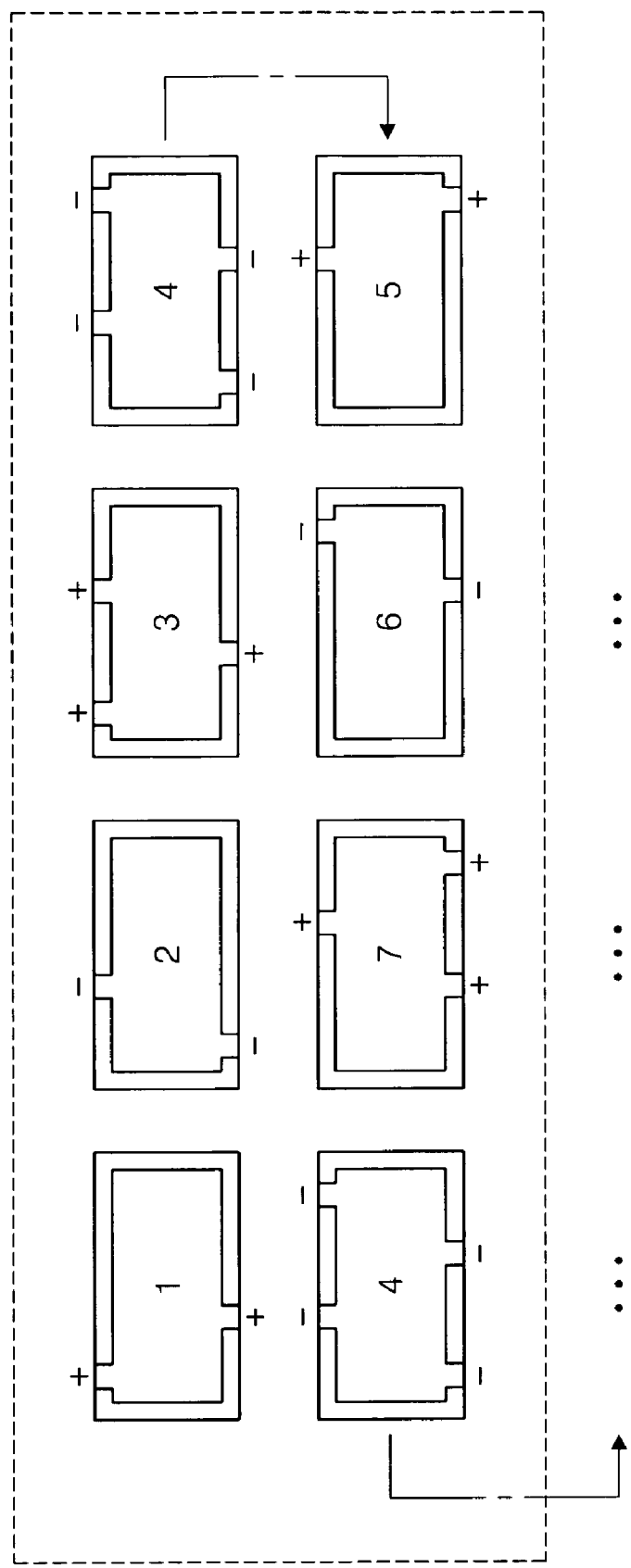
Figure 51:
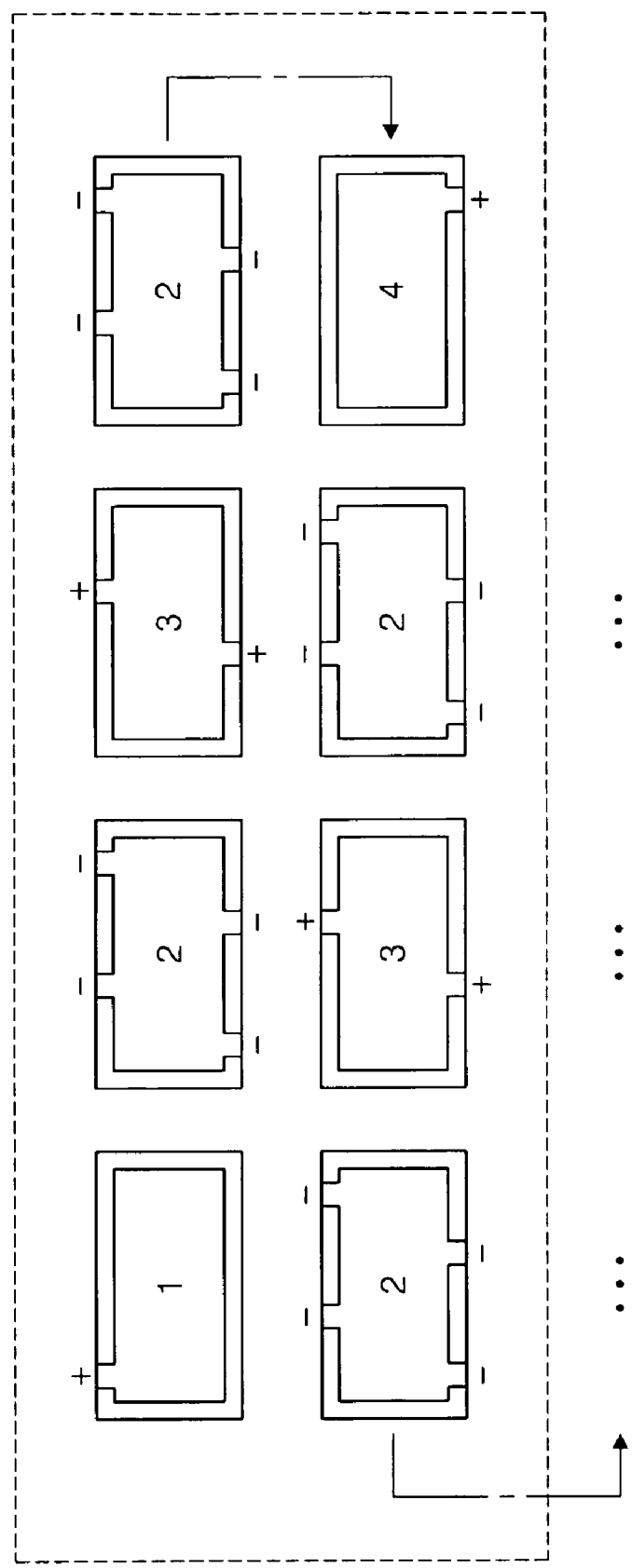
Figure 52:
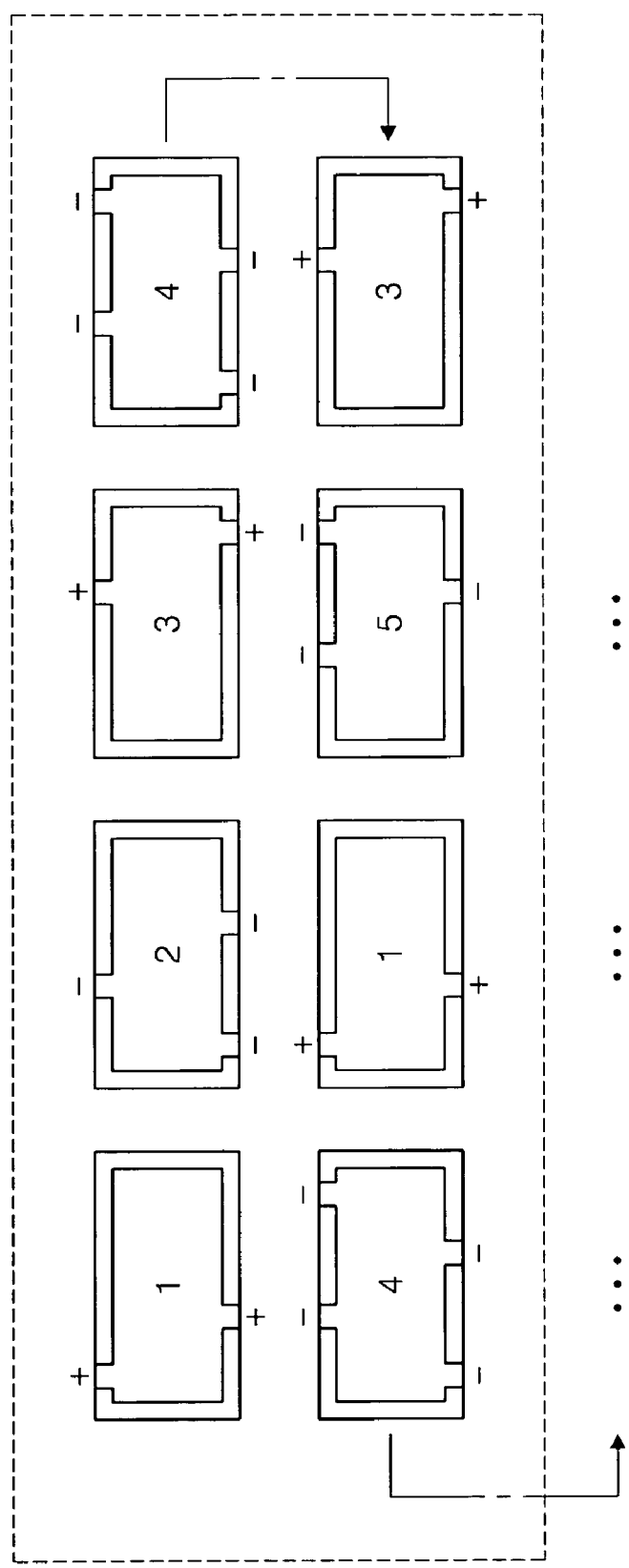
Figure 53:
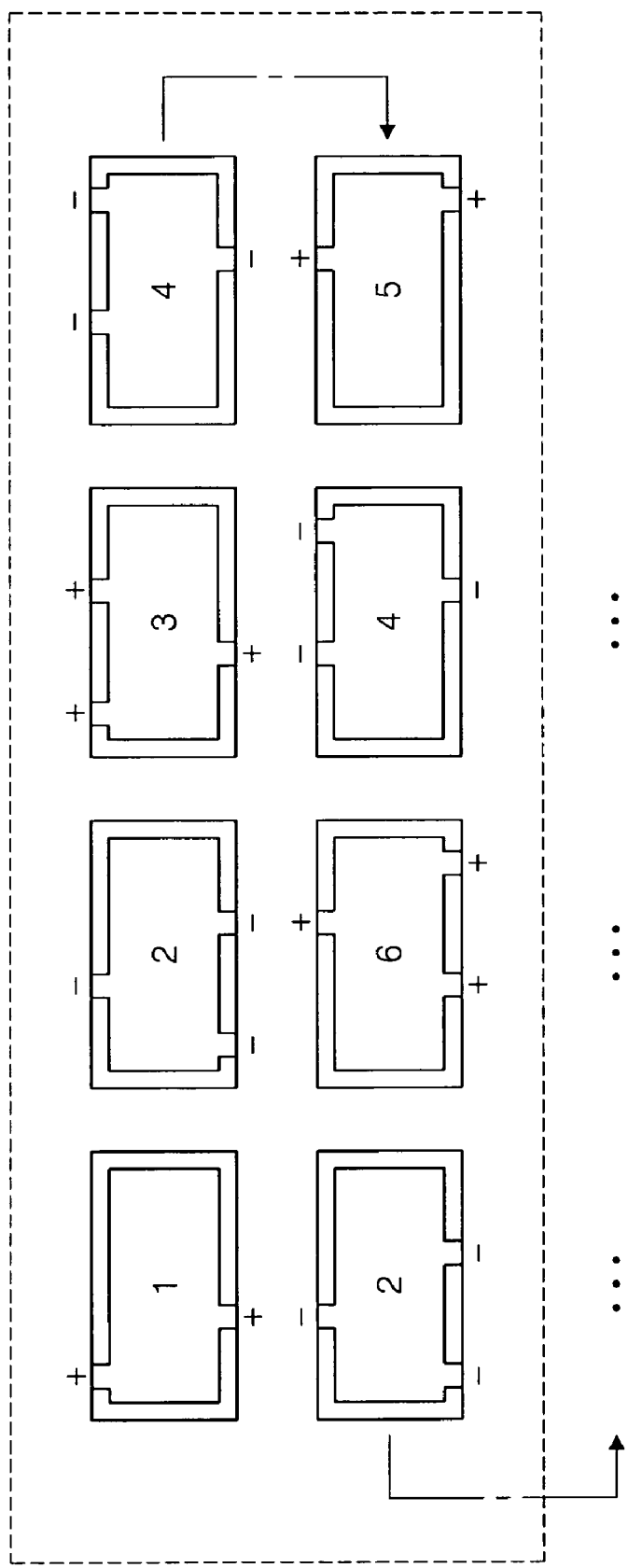
Figure 54:
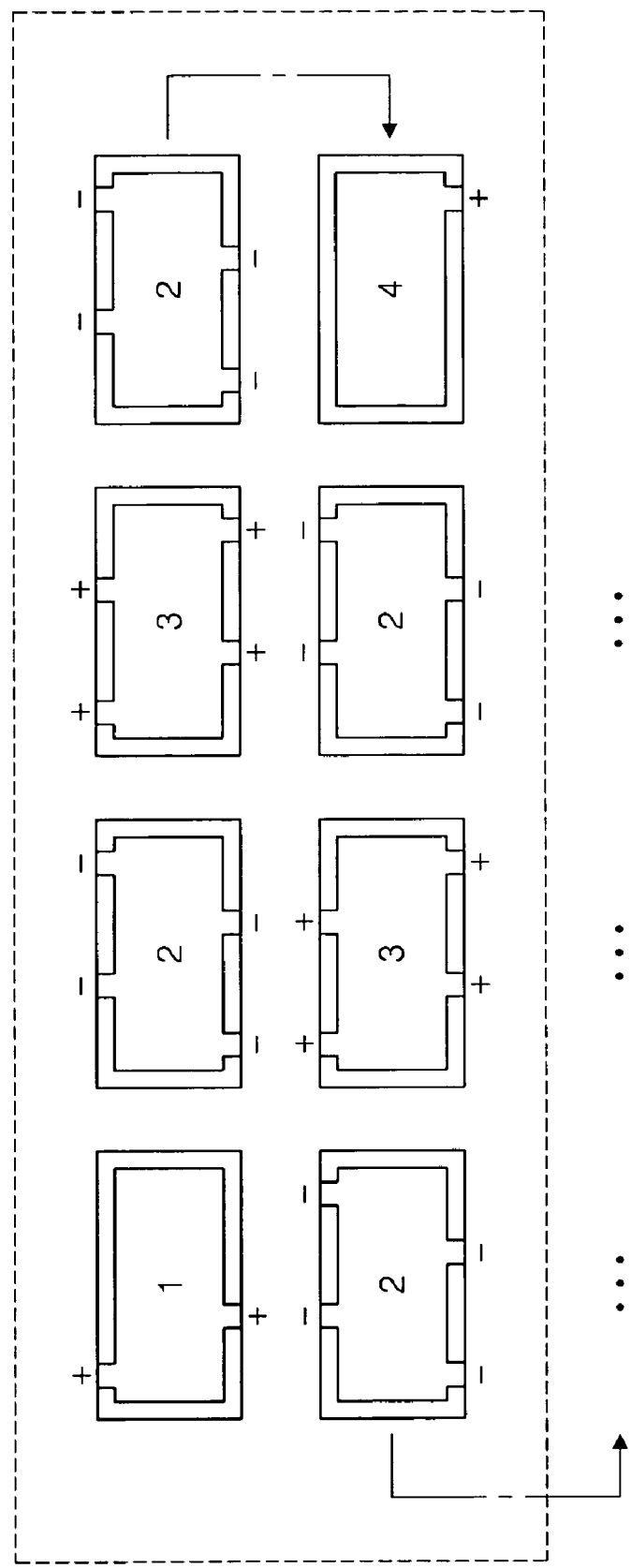
Figure 55:
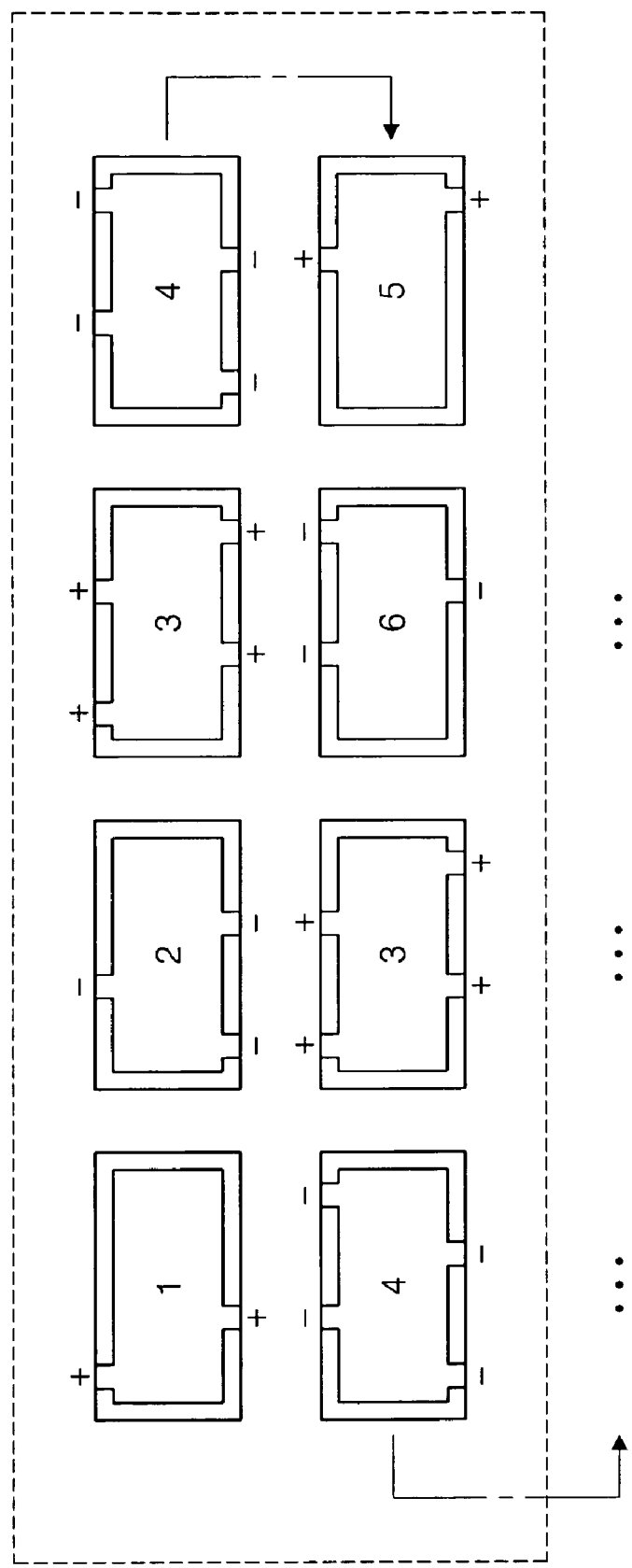
Figure 56:
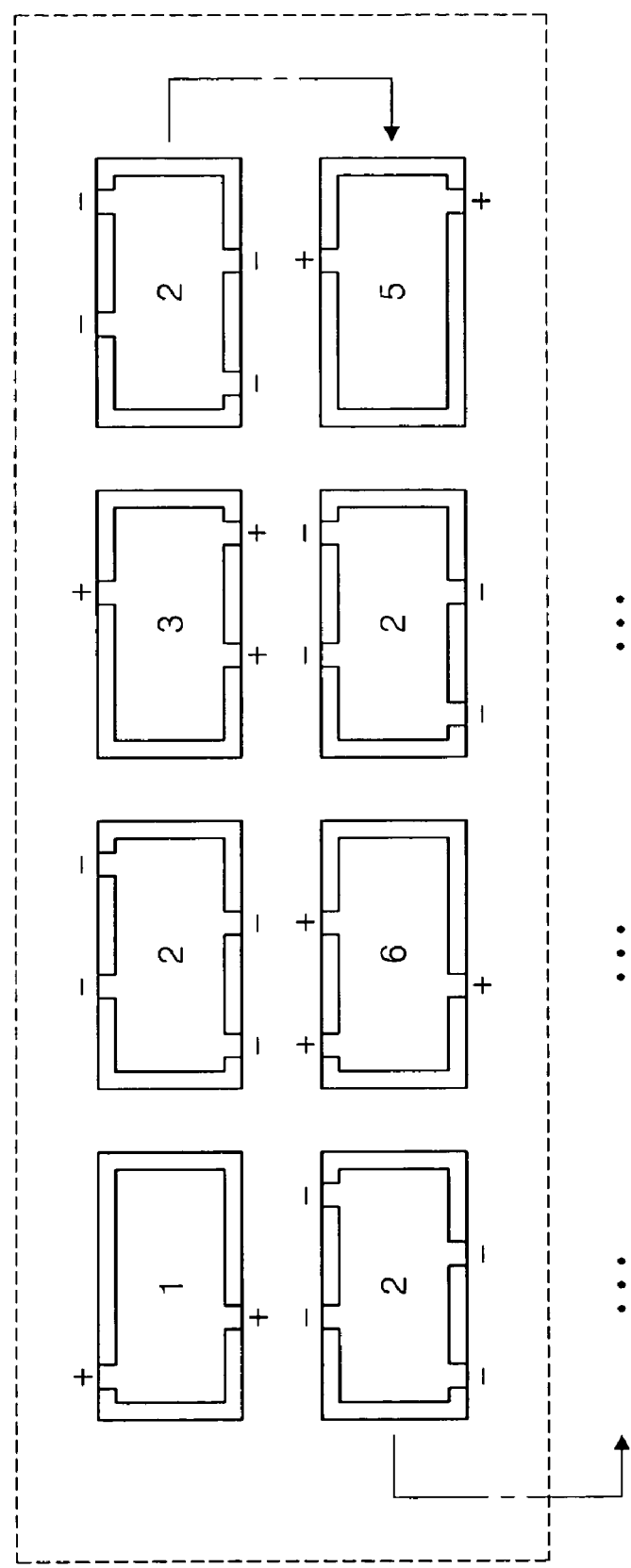
Figure 57:
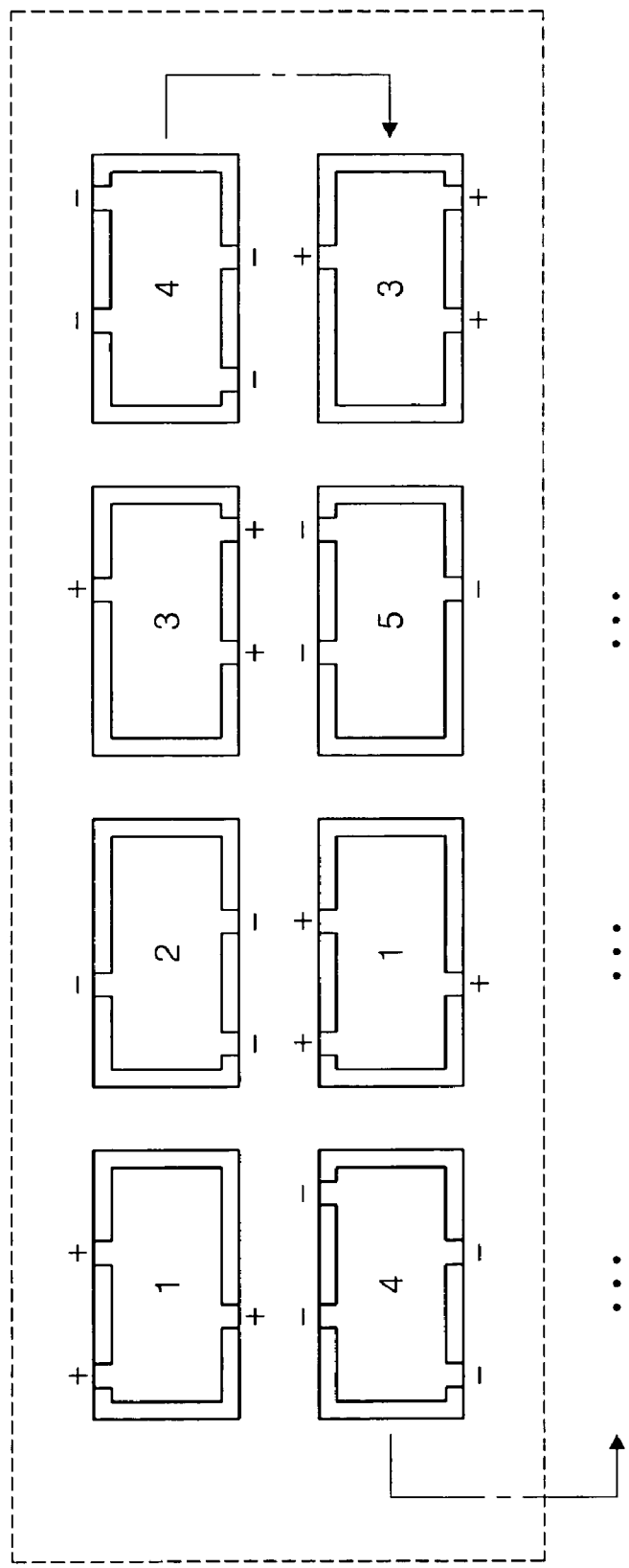
Figure 58:
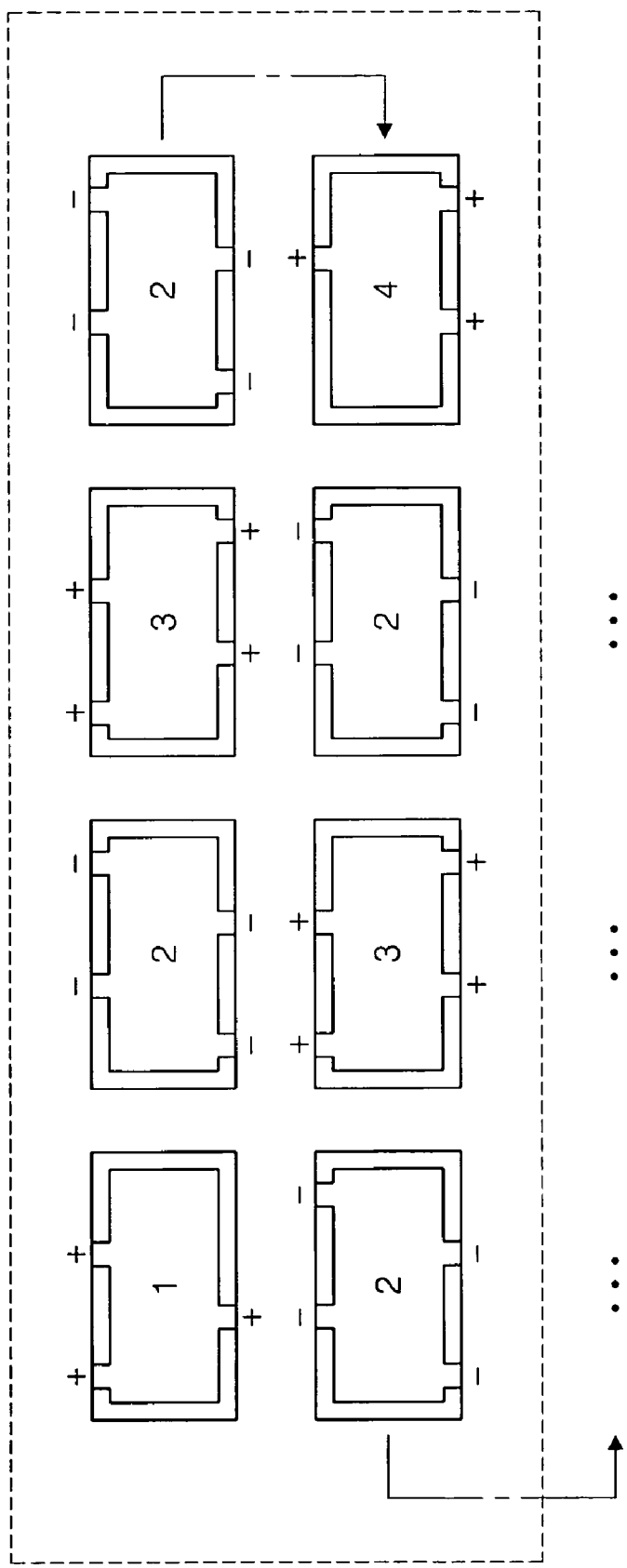

Referring to FIGS. 31 through 33, an average value of the total number of leads of two vertically adjacent internal electrodes is seven. In FIG. 34, an average value of the total number of leads of two vertically adjacent internal electrodes is 2.5. Referring to FIGS. 35 through 39, an average value of the total number of two vertically adjacent internal electrodes is 3.5. Referring to FIGS. 40 through 46, an average value of the total number of leads of two vertically adjacent internal electrodes is 4.5. Referring to FIGS. 47 through 53, an average value of the total number of leads of two vertically adjacent internal electrodes is 5.5. Referring to FIGS. 54 through 57, an average value of the total number of leads of two vertically adjacent internal electrodes is 6.5. Referring to FIG. 58, an average value of the total number of leads of two vertically adjacent internal electrodes is 7.5.

According to the embodiments of the present invention, ESR can be effectively controlled by setting an average value of the total number of leads of two vertically adjacent internal electrodes and controlling the number of leads of each internal electrode on the basis of the set average value. Also, low ESL can be implemented by making a distance between leads of opposite polarities as short as possible.

As described so far, according to the present invention, the ESR of a capacitor is controllable even up to a high level and low ESL can be implemented. Accordingly, the ESR can be lined up within a wide range to provide a PDN architect with a user-selectable ESR characteristic, and a power circuit can be stabilized.

While the present invention has been shown and described in connection with the exemplary embodiments, it will be apparent to those skilled in the art that modifications and variations can be made without departing from the spirit and scope of the invention as defined by the appended claims.

What is claimed is:

1. A method of implementing low equivalent series inductance (ESL) and controlled equivalent series resistance (ESR) of a multi-layer chip capacitor, the multi-layer chip capacitor comprising a plurality of internal electrodes each having first polarity or second polarity which is opposite to the first polarity, external electrodes and dielectric layers each disposed between the internal electrodes of the first polarity and the second polarity, wherein the internal electrodes having the first polarity and the internal electrodes having the second polarity are alternated at least once to form one or more blocks being stacked, the method comprising:

setting an average value of the total number of leads that are to be included in two adjacently disposed internal electrodes facing each other within the block to be smaller than the total number of the external electrodes of the multi-layer chip capacitor;

determining the number of leads of each of the internal electrodes within the block on the basis of the average value; and determining a lead location of each of the internal electrodes for which the number of leads has been determined, such that leads of adjacently disposed internal electrodes facing each other and respectively having the first polarity and the second polarity are disposed adjacent one another and are connected with external electrodes having first polarity and second polarity respectively.

2. The method of claim 1, further comprising:

setting an average value of the total number of leads of two adjacently disposed internal electrodes facing each other and having opposite polarities within another block;

determining the number of leads of each of the internal electrodes within another block; and determining a lead location of each of the internal electrodes for which the number of leads has been determined, such that leads of adjacently disposed internal electrodes facing each other within another block are disposed adjacent to one another.

3. The method of claim 1, wherein the multilayer chip capacitor further comprises at least six external electrodes connected to the internal electrodes through the leads.

4. The method of claim 1, wherein the multilayer chip capacitor is an eight-terminal multilayer chip capacitor comprising four external electrodes on each of two facing sides thereof.

5. The method of claim 1, wherein in the multilayer chip capacitor, four successively disposed internal electrodes form the block.

6. The method of claim 5, wherein the block comprises three electrode patterns.

7. The method of claim 1, wherein in the multilayer chip capacitor, six successively disposed internal electrodes form the block.

8. The method of claim 7, wherein the block comprises four or six electrode patterns.

9. The method of claim 1, wherein in the multilayer chip capacitor, eight successively disposed internal electrodes form the block.

10. The method of claim 9, wherein the block comprises four, five, six, seven or eight electrode patterns.

11. The method of claim 1, wherein in the multilayer chip capacitor, twelve successively disposed internal electrodes form the block.

12. The method of claim 11, wherein the block comprises seven electrode patterns.

13. The method of claim 1, further comprising selecting a resistive conducting material having specific conductivity, the resistive conducting material being used for an external electrode of the multilayer chip capacitor.

14. The method of claim 13, wherein the resistive conducting material is used as an inner layer of the external electrode contacting the internal electrode.

15. The method of claim 13, wherein the resistive conducting material is used as an intermediate layer disposed between an inner layer of the external electrode contacting the internal electrode and an outermost plating layer of the external electrode.

16. The method of claim 13, wherein the leads of adjacently disposed internal electrodes are disposed at the same side of respective internal electrodes.

* * * * *